US007275980B2

(12) United States Patent
Bonner et al.

(10) Patent No.: US 7,275,980 B2
(45) Date of Patent: *Oct. 2, 2007

(54) ABRASIVE ARTICLES WITH NOVEL STRUCTURES AND METHODS FOR GRINDING

(75) Inventors: Anne M. Bonner, Nashua, NH (US); Eric Bright, Fiskdale, MA (US); Edward L. Lambert, Westboro, MA (US); Dean S. Matsumoto, Worcester, MA (US); Xavier Orlhac, Holden, MA (US); David A. Sheldon, Millbury, MA (US)

(73) Assignee: Saint-Gobain Abrasives Technology Company, Worcester, MA (US)

( * ) Notice: Subject to any disclaimer, the term of this patent is extended or adjusted under 35 U.S.C. 154(b) by 212 days.

This patent is subject to a terminal disclaimer.

(21) Appl. No.: 10/510,541

(22) PCT Filed: Mar. 21, 2003

(86) PCT No.: PCT/US03/08936

§ 371 (c)(1),
(2), (4) Date: Oct. 7, 2004

(87) PCT Pub. No.: WO03/086703

PCT Pub. Date: Oct. 23, 2003

(65) Prior Publication Data

US 2006/0211342 A1    Sep. 21, 2006

Related U.S. Application Data

(63) Continuation-in-part of application No. 10/328,802, filed on Dec. 24, 2002, now Pat. No. 6,988,937, and a continuation-in-part of application No. 10/120,969, filed on Apr. 11, 2002, now Pat. No. 6,679,758.

(51) Int. Cl.
*B24B 1/00* (2006.01)
*B24B 11/00* (2006.01)
(52) U.S. Cl. .......................... 451/28; 451/527; 451/534
(58) Field of Classification Search .................. 451/28, 451/41, 526–550
See application file for complete search history.

(56) References Cited

U.S. PATENT DOCUMENTS

| 1,983,082 A | 12/1934 | Howe et al. |
| 2,194,472 A | 3/1940 | Jackson |

(Continued)

FOREIGN PATENT DOCUMENTS

GB           491659           9/1938

(Continued)

OTHER PUBLICATIONS

U.S. Appl. No. 10/145,367, by [inventor(s)], filed May 14, 2002.

*Primary Examiner*—Hadi Shakeri
(74) *Attorney, Agent, or Firm*—Neil F. Maloney

(57) ABSTRACT

Bonded abrasive tools, having novel porous structures that are permeable to fluid flow, comprise a relatively low volume percentage of abrasive grain and bond, and a relatively low hardness grade, but are characterized by excellent mechanical strength and grinding performance. Methods for making the abrasive tools utilizing agglomerated abrasive grain are described.

39 Claims, 4 Drawing Sheets

U.S. PATENT DOCUMENTS

| | | | |
|---|---|---|---|
| 2,216,728 A | 10/1940 | Benner et al. | |
| 3,048,482 A | 8/1962 | Hurst | |
| 3,916,584 A | 11/1975 | Howard et al. | |
| 3,955,324 A | 5/1976 | Lindstrom | |
| 3,982,359 A | 9/1976 | Elbel et al. | |
| 4,024,675 A | 5/1977 | Naidich et al. | |
| 4,239,503 A | 12/1980 | Harris et al. | |
| 4,311,489 A | 1/1982 | Kressner | |
| 4,393,021 A | 7/1983 | Eisenberg et al. | |
| 4,486,200 A | 12/1984 | Heyer et al. | |
| 4,541,842 A | 9/1985 | Rostoker | |
| 4,575,384 A | 3/1986 | Licht et al. | |
| 4,652,275 A | 3/1987 | Bloecher et al. | |
| 4,671,017 A | 6/1987 | Ideue et al. | |
| 4,799,939 A | 1/1989 | Bloecher et al. | |
| 5,039,311 A | 8/1991 | Bloecher | |
| 5,096,465 A | 3/1992 | Chen et al. | |
| 5,127,197 A | 7/1992 | Brukvoort et al. | |
| 5,129,189 A | 7/1992 | Wetscher | |
| 5,131,926 A | 7/1992 | Rostoker et al. | |
| 5,178,644 A | 1/1993 | Huzinec | |
| 5,203,886 A | 4/1993 | Sheldon et al. | |
| 5,273,558 A | 12/1993 | Nelson et al. | |
| 5,429,648 A | 7/1995 | Wu | |
| 5,489,204 A | 2/1996 | Conwell et al. | |
| 5,500,273 A | 3/1996 | Holmes et al. | |
| 5,607,489 A | 3/1997 | Li | |
| 5,649,984 A * | 7/1997 | Sigalas et al. | 51/293 |
| 5,651,729 A | 7/1997 | Benguerel | |
| 5,651,801 A | 7/1997 | Monroe et al. | |
| 5,738,695 A | 4/1998 | Harmer et al. | |
| 5,738,696 A | 4/1998 | Wu | |
| 5,738,697 A | 4/1998 | Wu et al. | |
| 5,849,052 A | 12/1998 | Barber, Jr. | |
| 5,863,308 A | 1/1999 | Qi et al. | |
| 5,975,988 A | 11/1999 | Christianson | |
| 6,074,278 A | 6/2000 | Wu et al. | |
| 6,086,467 A | 7/2000 | Imai et al. | |
| 6,086,648 A | 7/2000 | Rossetti, Jr. et al. | |
| 6,102,789 A * | 8/2000 | Ramanath et al. | 451/541 |
| 6,136,288 A | 10/2000 | Bauer et al. | |
| 6,217,413 B1 | 4/2001 | Christianson | |
| 6,319,108 B1 | 11/2001 | Adefris et al. | |
| 6,354,929 B1 | 3/2002 | Adefris et al. | |
| 6,361,403 B1 * | 3/2002 | Kuramochi et al. | 451/41 |
| 6,394,888 B1 | 5/2002 | Matsumoto et al. | |
| 6,702,650 B2 * | 3/2004 | Adefris | 451/41 |

FOREIGN PATENT DOCUMENTS

| | | |
|---|---|---|
| GB | 1228319 | 4/1971 |
| GB | 1418730 | 12/1975 |
| WO | 96/10471 | 4/1996 |
| WO | 98/03306 | 1/1998 |
| WO | 00/51788 | 9/2000 |
| WO | 01/04227 | 1/2001 |
| WO | 01/83166 A1 | 11/2001 |
| WO | 01/85393 A1 | 11/2001 |
| WO | 02/28802 A2 | 4/2002 |

* cited by examiner

ABRASIVE ARTICLES WITH NOVEL STRUCTURES AND METHODS FOR GRINDING

RELATED APPLICATIONS

This application is a continuation-in-part of U.S. Ser. No. 10/120,969, filed Apr. 11, 2002 (now U.S. Pat. No. 6,679, 758), and a continuation-in-part of U.S. Ser. No. 10/328,802, filed Dec. 24, 2002 (now U.S. Pat. No. 6,988,937). The entire contents of U.S. Ser. No. 10/120,969 and U.S Ser. No. 10/328,802 are hereby incorporated by reference.

BACKGROUND OF THE INVENTION

The invention relates to bonded abrasive articles or tools, such as grinding wheels, grinding segments, grinding discs and hones, having novel compositional structures, to methods of manufacturing such tools so as to create these novel tool structures, and to methods of grinding, polishing or surface finishing using such tools.

Bonded abrasive tools consist of rigid, and typically monolithic, three-dimensional, abrasive composites in the form of wheels, discs, segments, mounted points, hones and other tool shapes, having a central hole or other means for mounting onto a particular type of grinding, polishing or sharpening apparatus or machine. These composites comprise three structural elements or phases: abrasive grain, bond and porosity.

Bonded abrasive tools have been manufactured in a variety of 'grades' and 'structures' that have been defined according to practice in the art by the relative hardness and density of the abrasive composite (grade) and by the volume percentage of abrasive grain, bond and porosity within the composite (structure).

For nearly 70 years, tool grade and structure have been considered to be the most reliable predictors of bonded abrasive tool hardness, tool wear rate, grinding power demands, and manufacturing consistency. Grade and structure were first established as reliable manufacturing guidelines in U.S. Pat. No. 1,983,082, to Howe, et al. Howe describes a volumetric manufacturing method useful for overcoming the then persistent difficulties with inconsistent abrasive composite quality and inconsistent grinding performance. In this method, one selects the relative volumetric percentages of the three structural constituents to yield a tool with a targeted grade of hardness and other desired physical characteristics. Knowing the desired volume of the finished tool, the batch weights of abrasive grain and bond components needed to make the tool are calculated from the tool volume, the relative volumetric percentages and the material densities of the abrasive grain and bond components. In this manner it was possible to create a standard structure chart for a defined bond composition and, in subsequent manufacturing runs, to read relative volumetric percentages from the standard structure chart in order to manufacture bonded abrasive tools having a consistent hardness grade for a given volume percentage of abrasive grain, bond and porosity. It was observed that the grinding performance was consistent from one manufacturing batch to another when the grade and structure had been held constant.

For many grinding operations, controlling the amount and type of porosity in the composite, particularly porosity of a permeable, or an interconnected nature, has been shown to improve grinding efficiency and to protect the quality of the work-piece being ground from thermal or mechanical damage.

Any three-dimensional abrasive composite consists of the sum of the relative volume percentages of its three constituents: abrasive grain, bond and porosity. The sum of the volume percentages of these constituents must equal 100 volume percent; therefore, tools having a high percentage of porosity must have proportionally lower percentages of bond and/or abrasive grain. In manufacturing bonded abrasive tools, one can more easily achieve relatively high volume percentages of porosity (e.g., 40-70 volume %) in precision grinding tools, made with rigid, inorganic bond materials (e.g., vitrified or ceramic bonds) and relatively small grain sizes (e.g., Norton grit sizes 46-220 grit), than in rough grinding tools made with organic bond materials and relatively large grain sizes (e.g., Norton grit sizes 12-120 grit). Very porous abrasive composites made with larger grain sizes, higher volume percentages of grain and softer, organic bond materials have a tendency to slump or stratify during the intermediate molding and curing stages of manufacturing the grinding tool. For these reasons, commercially available bonded abrasive tools made with organic bond materials often are molded to contain no porosity, and typically contain no more than 30 volume % porosity. They seldom exceed 50 volume % porosity.

Natural porosity arising from packing of the abrasive grains and bond particles during pressure molding usually is insufficient to achieve high porosity in bonded abrasive tools. Porosity inducers, such as bubble alumina and naphthalene, may be added to abrasive and bond composite mixtures to enable pressure molding and handling of a porous uncured abrasive article and to yield an adequate volume percent porosity in the final tool. Some pore inducers (e.g., bubble alumina and glass spheres) will create closed cell porosity within the tool. Closed cell pore inducers added to achieve high porosity percentages prevent the formation of open channels or interconnected porosity, thus preventing or reducing fluid flow through the body of the tool, thereby tending to increase grinding forces and risk of thermal damage. Open cell pore inducers must be burnt out of the abrasive matrix (e.g., walnut shells and naphthalene), giving rise to various manufacturing difficulties.

Further, the densities of pore inducers, bond materials and abrasive grains vary significantly, making it difficult to control stratification of the abrasive mix during handling and molding, often resulting in a loss of homogeneity in the three-dimensional structure of the finished abrasive article. A uniform, homogeneous distribution of the three constituents of the abrasive composite have been considered a key aspect of consistent tool quality and, for grinding wheels, important in the safe operation of wheels at the high rotational speeds needed for grinding (e.g., over 4000 surface feet per minute (sfpm)).

The volume percent of interconnected porosity, or fluid permeability, has been found to be a more significant determinant of grinding performance of abrasive articles than mere volume percent porosity (see U.S. Pat. No. 5,738,696 to Wu). The interconnected porosity allows removal of grinding waste (swarf) and passage of cooling fluid within the wheel during grinding. The existence of interconnected porosity may be confirmed by measuring the permeability of the wheel to the flow of air under controlled conditions. U.S. Pat. No. 5,738,697 to Wu discloses high permeability grinding wheels having a significant amount of interconnected porosity (40-80%, by volume). These wheels are made from a matrix of fibrous particles having an aspect ratio of at least 5:1. The fibrous particles may be filamentary abrasive grain or ordinary, non-fibrous abrasive grains blended with various fibrous filler materials such as ceramic fiber, polyester fiber and glass fiber and mats and agglomerates constructed with the fiber particles.

It has now been discovered that bonded abrasive tools can be made with a relatively high percentage of porosity and a relatively low percentage of abrasive grain without sacrificing mechanical strength or resistance to tool wear, even though the hardness grade of the tool would predict relatively poor mechanical strength. For organic bonded abrasive tools it is now possible to manufacture tools at relative percentages of abrasive grain, bond and porosity that form structures unknown among commercial bonded abrasives tools. These novel structures include organic bonded abrasive tools wherein the continuous phase of the abrasive composite consists of the porosity constituent. In a preferred method for creating these novel structures, a majority of the abrasive grain has been agglomerated with a binding material prior to mixing, molding and thermally processing the bonded abrasive tool.

Agglomerated abrasive grains have been reported to improve grinding efficiency by mechanisms unrelated to the amount or character of the porosity of the bonded abrasive tool. Abrasive grain has been agglomerated for various purposes, principal among them to allow use of a smaller abrasive grain particle ('grit') size to achieve the same grinding efficiency as a larger abrasive grit size, or to yield a smoother surface finish on the workpiece being ground. In many instances abrasive grain has been agglomerated to achieve a less porous structure and a denser grinding tool, having more strongly bonded abrasive grains.

Very low porosity (e.g., less than about 5 volume % porosity) gear honing wheels have been made from reclaimed crushed vitrified bonded abrasive composites by bonding the composites in an epoxy resin. These 'Compound' gear honing wheels have been commercially available for a number of years (from Saint-Gobain Abrasives, GmbH, formerly Efesis Schleiftechnik GmbH, Gerolzhofen, Germany).

U.S. Pat. No. 2,216,728 to Benner discloses abrasive grain/bond aggregates made from any type of bond. The reason for using the aggregates is to achieve very dense wheel structures for retaining diamond or CBN grain during grinding operations. If the aggregates are made with a porous structure, then it is for the purpose of allowing the inter-aggregate bond materials to flow into the pores of the aggregates and fully densify the structure during firing. The aggregates allow the use of abrasive grain fines otherwise lost in production.

U.S. Pat. No. 3,982,359 to Elbel teaches the formation of resin bond and abrasive grain aggregates having hardness values greater than those of the resin bond used to bond the aggregates within an abrasive tool. Faster grinding rates and longer tool life are achieved in rubber bonded wheels containing the aggregates.

U.S. Pat. No. 4,799,939 to Bloecher teaches erodable agglomerates of abrasive grain, hollow bodies and organic binder and the use of these agglomerates in coated abrasives and bonded abrasives. Similar agglomerates are disclosed in U.S. Pat. No. 5,039,311 to Bloecher, and U.S. Pat. No. 4,652,275 to Bloecher, et al.

U.S. Pat. No. 5,129,189 to Wetshcer discloses abrasive tools having a resin bond matrix containing conglomerates, having 5-90 vol. % porosity, of abrasive grain, resin and filler material, such as cryolite.

U.S. Pat. No. 5,651,729 to Benguerel teaches a grinding wheel having a core and a discrete abrasive rim made from a resin bond and crushed agglomerates of diamond or CBN abrasive grain with a metal or ceramic bond. The stated benefits of the wheels made with the agglomerates include high chip clearance spaces, high wear resistance, self-sharpening characteristics, high mechanical resistance of the wheel and the ability to directly bond the abrasive rim to the core of the wheel. In one embodiment, used diamond or CBN bonded grinding rims are crushed to a size of 0.2 to 3 mm to form the agglomerates.

GB Pat. No.-A-1,228,219 to Lippert discloses conglomerates of grain and bond added to a rubber, elastic bond matrix. The bond holding the grain within the conglomerate can be ceramic or resin materials, but it must be more rigid than the elastic bond matrix.

U.S. Pat. No. 4,541,842 to Rostoker discloses coated abrasives and abrasive wheels made with aggregates of abrasive grain and a foamed mixture of vitrified bond materials with other raw materials, such as carbon black or carbonates, suitable for foaming during firing of the aggregates. The aggregate "pellets" contain a larger percentage of bond than grain on a volume percentage basis. Pellets used to make abrasive wheels are sintered at 900° C. (to a density of 70 lbs/cu. ft.; 1.134 g/cc) and the vitrified bond used to make the wheel is fired at 880° C. Wheels made with 16 volume % pellets performed in grinding at an efficiency level similar to that of comparative wheels made with 46 volume % abrasive grain. The pellets contain open cells within the vitrified bond matrix, with the relative smaller abrasive grains clustered around the perimeter of the open cells. A rotary kiln is mentioned for firing pre-agglomerated green aggregates that are later foamed and sintered to make the pellets.

U.S. Pat. No. 6,086,467 to Imai, et al, discloses grinding wheels contain abrasive grain and grain clusters of filler grain having a smaller size than the 25 abrasive grain. Vitrified bond may be used and the filler grain may be chromium oxide. The size of the grain clusters is ⅓ or more of the size of the abrasive grain. Benefits include controlled bond erosion and abrasive grain retention in low force grinding applications utilizing superabrasive grain wherein the superabrasive grain must be diluted to minimize grinding forces. Clusters of filler grain may be formed with wax. No sintering of the clusters is disclosed.

WO 01/85393 A1 to Adefris discloses a three-dimensional abrasive article made from abrasive composites, either shaped or irregular, arranged to have more than one monolayer of abrasive composites. The article may contain inter-composite porosity and intra-composite porosity. The composites include abrasive grains bonded in an inorganic or organic first matrix and the abrasive article is bonded with a second inorganic (metal or vitrified or ceramic) or organic binder material, to form an abrasive article having about 20 to 80 volume % porosity. The preferred article contains fine diamond abrasive grain held in a first and a second glass bond and the article is used to grind glass to a mirror finish.

A number of publications have described coated abrasive tools made with agglomerated abrasive grain. They include U.S. Pat. No. 2,194,472 to Jackson which discloses coated abrasive tools made with agglomerates of a plurality of relatively fine abrasive grain and any of the bonds normally used in coated or bonded abrasive tools. Inorganic composites of fine grit diamond, CBN and other thermally degradable abrasive grains in a matrix of metal oxide have been reported to be useful in coated abrasive tools (U.S. Pat. No. 3,916,584 to Howard, et al). U.S. Pat. No. 3,048,482 to Hurst discloses shaped abrasive micro-segments of agglomerated abrasive grains and organic bond materials in the form of pyramids or other tapered shapes. The shaped abrasive micro-segments are adhered to a fibrous backing and used to make coated abrasives and to line the surface of thin grinding wheels. U.S. Pat. No 4,311,489 to Kressner discloses agglomerates of fine (≦200 micron) abrasive grain and cryolite, optionally with a silicate binder, and their use in making coated abrasive tools. U.S. Pat. No. 5,500,273 to Holmes discloses precisely shaped particles or composites of abrasive grits and a polymeric binder formed by free radical polymerization. Similar shaped composites are described in U.S. Pat. No. 5,851,247 to Stoetzel, et al; U.S. Pat. No. 5,714,259 to Holmes, et al; and U.S. Pat. No. 5,342,419 to Hibbard, et al. U.S. Pat. No. 5,975,988, U.S. Pat. No. 6,217,413 B1 and WO 96/10471, all to Christianson, disclose coated abrasive articles include a backing and an organic bonded abrasive layer where the abrasive is present as shaped agglomerates in the shape of a truncated four-sided pyramid or cube.

U.S. Pat. No. 6,056,794 to Stoetzel, et al, discloses coated abrasive articles having a backing, an organic bond containing hard inorganic particles dispersed within it, and abrasive particle agglomerates bonded to the backing. The abrasive particles in the agglomerates and the hard inorganic particles in the organic bond are essential the same size. Agglomerates may be randomly or precisely shaped and they are made with an organic bond. The hard inorganic particles may be any of a number of abrasive grain particles.

U.S. Pat. No. 6,319,108 B1 to Adefris, et al, discloses an abrasive article comprising a rigid backing and ceramic abrasive composites made of abrasive particles in a porous ceramic matrix. The composites are held to the backing with a metal coating, such an electroplated metal. WO 01/83166 A1 to Mujumdar, et al, discloses glass grinding abrasive tools comprising diamond composites held to a backing with resin bond.

A number of patents disclose abrasive tools comprising resin or other organic binder composites of abrasive grain. Most of these tools are coated abrasive tools wherein a resin bond is employed to adhere the abrasive grain composites to a flexible backing. Occasionally metal binders or erodable particles are used in conjunction with the abrasive composites. Representative patents in this group include U.S. Pat. No. 5,078,753 to Broberg, et al; U.S. Pat. No. 5,578,098 to Gagliardi, et al; U.S. Pat. No. 5,127,197 to Brukvoort, et al.; U.S. Pat. No. 5, 318,604 to Gorsuch, et al.; U.S. Pat. No. 5,910,471 to Christianson, et al.; and U.S. Pat. No. 6,217, 413 to Christianson, et al.

U.S. Pat. No. 4,355,489 to Heyer discloses an abrasive article (wheel, disc, belt, sheet, block and the like) made of a matrix of undulated filaments bonded together at points of manual contact and abrasive agglomerates, having a void volume of about 70-97%. The agglomerates may be made with vitrified or resin bonds and any abrasive grain. U.S. Pat. No. 4,364,746 to Bitzer discloses abrasive tools comprising different abrasive agglomerates having different strengths. The agglomerates are made from abrasive grain and resin binders, and may contain other materials, such as chopped fibers, for added strength or hardness. U.S. Pat. No. 4,393, 021 to Eisenberg, et al, discloses a method for making abrasive agglomerates from abrasive grain and a resin binder utilizing a sieve web and rolling a paste of the grain and binder through the web to make worm-like extrusions. The extrusions are hardened by heating and then crushed to form agglomerates.

Notwithstanding this extensive body of knowledge regarding how to make abrasive articles with agglomerated grain and to eliminate or create tool porosity, until now, no one has successfully altered the basic composite structure of a three-dimensional, monolithic bonded abrasive tool with agglomerated grain such that tool grade and structure no longer predict grinding performance. No one has utilized agglomerated grain to make volume percent structure tools that were difficult or impossible to manufacture with ordinary abrasive grain in organic bonds. In particular, without sacrificing mechanical strength, tool life or tool performance, it has been found that relatively high volume percentages of porosity (e.g., above 30 volume %) may be achieved in bonded abrasive tools made with organic bonds. Significant alterations in elastic modulus and other physical properties of both inorganic and organic bonded tools now can be achieved in the tools of the invention.

In bonded abrasives made with organic bond materials, the bond materials have been considered to be the most important factor in altering the grade and structure to achieve appropriate or sufficient mechanical strength or rigidity. Quite surprisingly, the invention permits lower abrasive grain content tools to be made over a range of bond contents and used in grinding applications that demand high mechanical strength tools having resistance to premature wear (defined as tool structure wear that is more rapid than abrasive grain wear). In large contact area surface grinding applications, the tools of the invention actually perform in a manner superior to conventional tools made with higher bond and abrasive grain contents.

None of the prior art developments in agglomerated abrasive grain suggest the benefits in bonded abrasive tools of using certain, agglomerated abrasive grains within an organic or inorganic bond matrix to control the three-dimensional structure of the bonded abrasive tool. In particular, it is unexpected that these agglomerates could be adapted to tailor and to control the location and type of porosity and bond matrix within the structure of the tools of the invention.

SUMMARY OF THE INVENTION

The invention is a bonded abrasive tool, comprising a three-dimensional composite of (a) a first phase comprising 24-48 vol % abrasive grains bonded with 10-38 vol % organic bond material and less than 10 vol % porosity; and (b) a second phase consisting of 38-54 vol % porosity; wherein the second phase is a continuous phase within the composite, and the bonded abrasive tool has a minimum burst speed of 4000 sfpm (20.32 m/s).

The invention further includes bonded abrasive tools comprising a three-dimensional composite of (a) 2246 vol % abrasive grains bonded with 4-20 vol % inorganic bond material; and (b) 40-68 vol % interconnected porosity; wherein a majority of the abrasive grains are present as irregularly spaced clusters within the composite; the bonded abrasive tools have elastic modulus values that are at least 10% lower than elastic modulus values for otherwise identical tools having regularly spaced abrasive grains within a three-dimensional composite; and the bonded abrasive tools exhibit a minimum burst speed of 4000 sfpm (20.32 m/s).

The invention further includes a method for disc grinding, comprising the steps of:

(a) providing a bonded abrasive wheel, comprising a three-dimensional composite of (i) a first phase comprising 24-48 vol % abrasive grains bonded with 10-38 vol % organic bond material and less than 10 vol % porosity; and (ii) a second phase consisting of 38-54 vol % porosity; wherein the second phase is a continuous phase within the composite, and the bonded abrasive tool has a minimum burst speed of 4000 sfpm (20.32 m/s);

(b) mounting the bonded abrasive wheel on a surface grinding machine;

(c) rotating the wheel; and (d) bringing a grinding surface of the wheel into contact with a workpiece for a sufficient period of time to grind the workpiece; whereby the wheel removes workpiece material at an effective material removal rate, the grinding surface of the wheel remains substantially free of grinding debris and, after grinding has been completed, the workpiece is substantially free of thermal damage.

The invention further includes a method for creep feed grinding, comprising the steps of:

(a) providing a bonded abrasive wheel comprising a three-dimensional composite of (i) 22-46 vol % abrasive grains bonded with 4-20 vol % inorganic bond material; and (ii) 40-68 vol % interconnected porosity; and wherein a majority of the abrasive grains are present as irregularly spaced clusters within the composite; the bonded abrasive tool has an elastic modulus value that is at least 10% lower than the elastic modulus value of an otherwise identical tool having regularly spaced abrasive grains within a three-dimensional composite; and the bonded abrasive tool has a minimum burst speed of 4000 sfpm (20.32 m/s);

(b) mounting the bonded abrasive wheel on a creep feed grinding machine;

(c) rotating the wheel; and (d) bringing a grinding surface of the wheel into contact with a workpiece for a sufficient period of time to grind the work piece; whereby the wheel removes workpiece material at an effective material removal rate and, after grinding, the workpiece is substantially free of thermal damage.

DESCRIPTION OF THE PREFERRED EMBODIMENTS

Bonded Abrasive Tools

Figure 1:
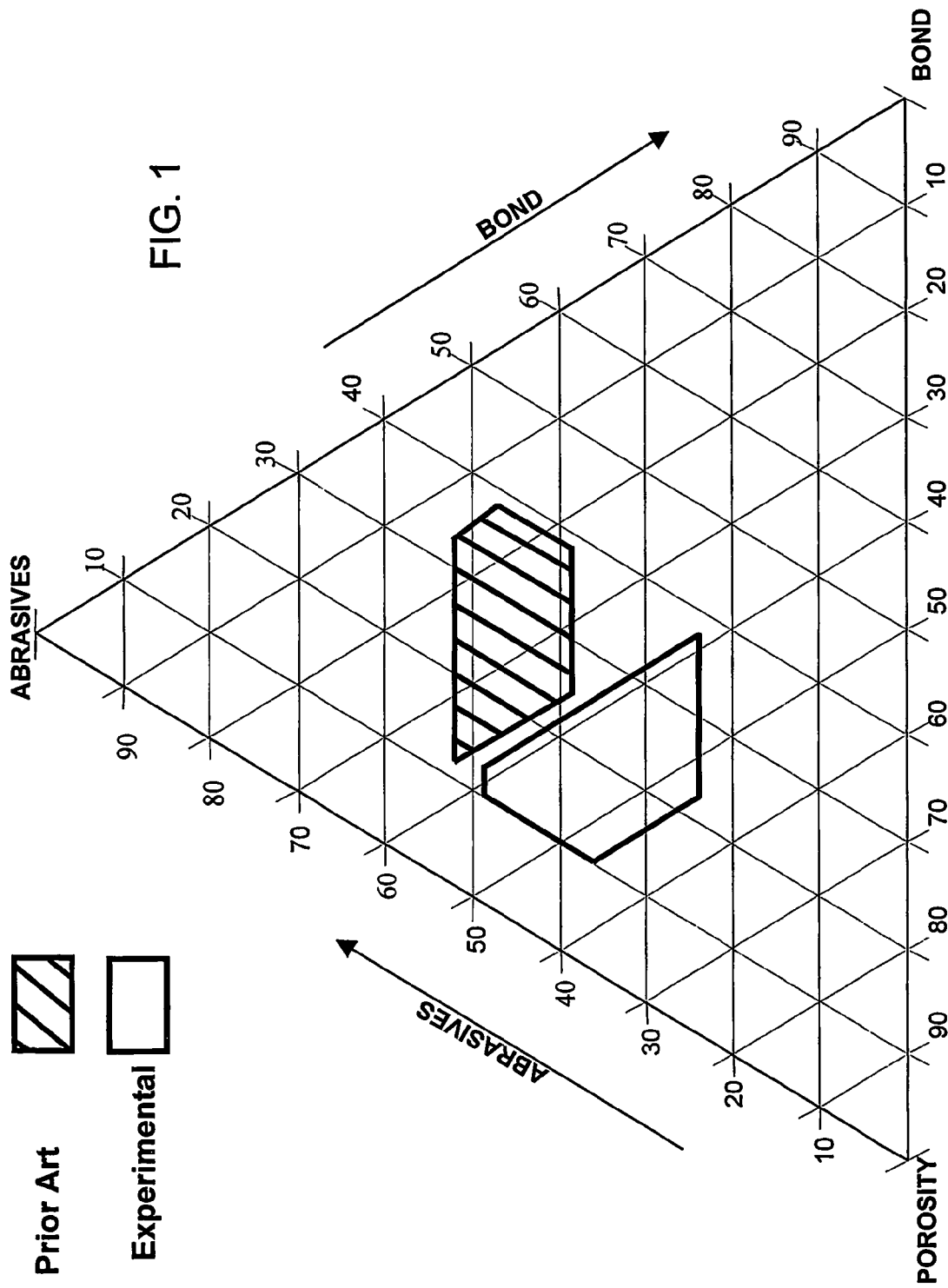
FIG. 1 is a ternary diagram contrasting the relative volumetric percentage composition structures of standard organic bonded abrasives tools to those of organic bonded abrasive tools of the invention.

The bonded abrasive tools of the invention (grinding wheels, grinding segments, grinding discs, grinding stones and hones, collectively referred to as tools or wheels) are characterized by a previously unknown combination of tool or wheel structure and physical properties. As used herein, the term "wheel structure" refers to the volume percentage of abrasive grain, bond and porosity contained in the grinding wheel. Wheel hardness "grade" refers to the letter designation given to the wheel's behavior in a grinding operation. For a given bond type, grade is a function of the wheel porosity, grain content and certain physical properties, such as cured density, elastic modulus and sand blast penetration (the latter is more typical of vitrified bonded wheels). The "grade" of the wheel predicts how resistant to wear the wheel will be during grinding and how hard the wheel will grind, i.e., how much power will be needed to use the wheel in a given grinding operation. The letter designation for wheel grade is assigned according to a Norton Company grade scale known in the art, wherein the softest grades are designated A and the hardest grades are designated Z. See, e.g., U.S. Pat. No. 1,983,082, Howe, et al. By matching wheel grades, one skilled in the art usually can substitute a new wheel specification for a known wheel and predict that the new wheel will perform in a manner similar to the known wheel.

In a significant and unexpected departure from these practices, the tools of the invention are characterized by alterations in their three-dimensional, monolithic composite structures, in particular, in the amount and the character of the porosity constituent, such that tool grade and structure no longer predict grinding performance.

When made with an organic bond, the tools of the invention can be formulated to yield volume percent structures (e.g., porosity above 30 volume %) that were difficult or impossible to manufacture by prior art methods. These novel structures can be made without sacrificing mechanical strength, tool life or tool performance. In a preferred method, these structures are manufactured with an abrasive grain mixture wherein a majority of the abrasive grain is in the form of agglomerates of abrasive grain with an organic binding material, an inorganic binding material, or a mixture of the two.

When made with an inorganic bond, the tools of the invention can be formulated to yield identical volume percent structures (see FIG. 3) to conventional tools, but at a significantly lower, i.e., at least 10% lower elastic modulus value and often as much as 50% lower elastic modulus value, without any effective loss in mechanical strength. Notwithstanding this drop in stiffness, the tools of the invention exhibit commercially acceptable burst speed values and significantly better material removal rates in certain grinding operations. In a preferred method, these structures are manufactured with an abrasive grain mixture wherein a majority of the abrasive grain is in the form of agglomerates of abrasive grain with an inorganic binding material.

FIGS. 1-5 illustrate the novel structures of the tools of the invention. FIG. 1 is a ternary diagram marked with two zones defining two sets of wheels (prior art wheels and experimental wheels of the invention) made with organic bond material. The prior art wheels and the inventive wheels are equally suitable for commercial use in high contact, precision, surface or line grinding operations, such as disc or roll grinding. The conventional wheels have volume % structures within a zone bounded by 38 to 52 vol % grain, 12 to 38 vol % bond and 15 to 37 vol % porosity. In contrast, the wheels of the invention have structures within a zone bounded by 24 to 48 vol % grain, 10 to 38 vol % bond and 38 to 54 vol % porosity. One can see the inventive wheels are made with significantly less abrasive grain than the conventional wheels and contain relatively small amounts of bond and relatively large amounts of porosity. What cannot be seen from the diagram is that the inventive wheels lie in a region on the ternary diagram where prior art manufacturing methods could not be used to make grinding wheels. The prior art techniques failed as the three-dimensional composite structure slumped during thermal processing, collapsing the areas of porosity, or as the prior art wheels lacked sufficient mechanical strength for safe use in grinding operations.

Figure 2:
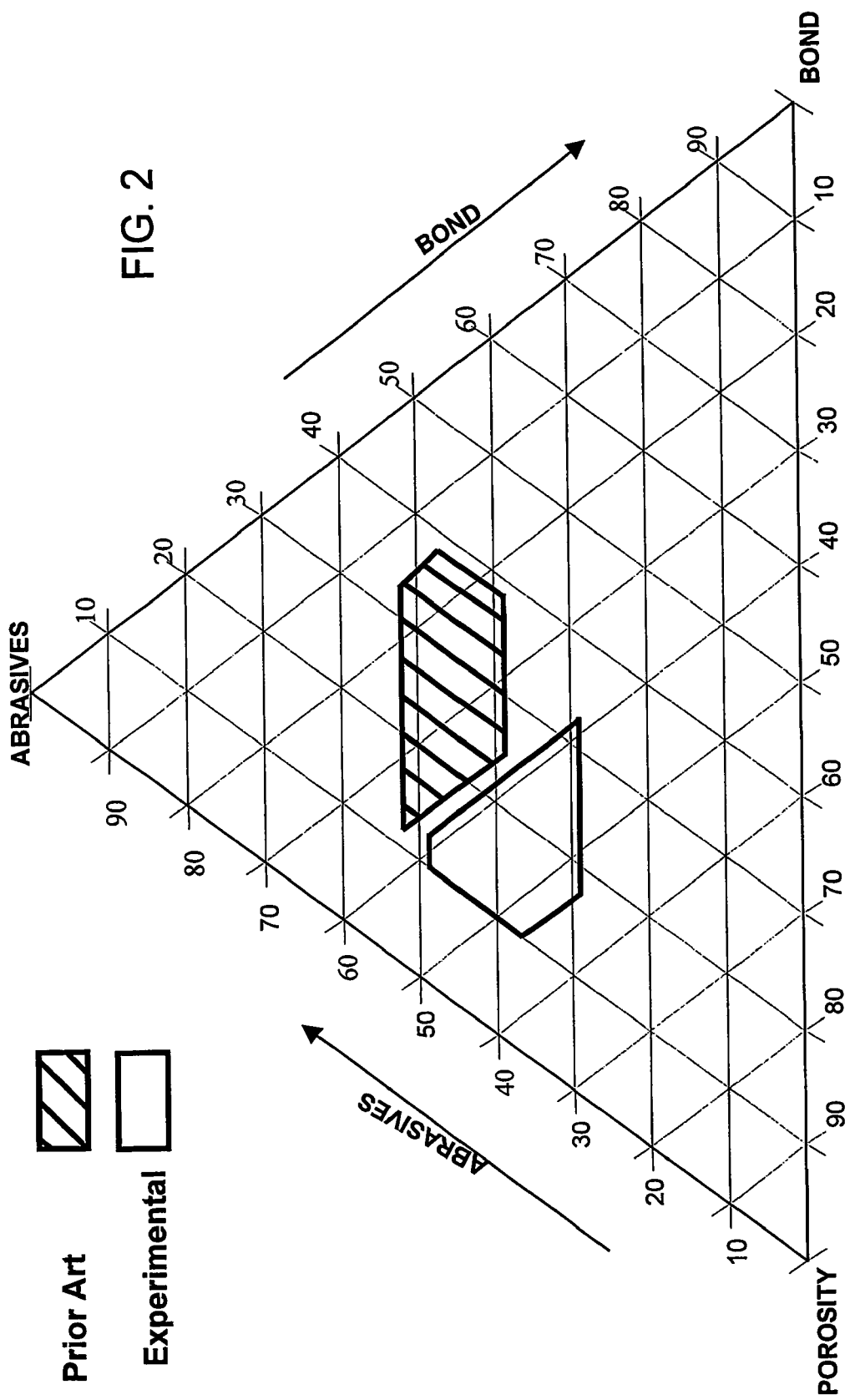
FIG. 2 is a ternary diagram contrasting the relative volumetric percentage composition structures of standard organic bonded abrasives tools to those of organic bonded abrasive tools of the invention made with abrasive grain agglomerates containing inorganic binding materials.

FIG. 2 is a ternary diagram illustrating two sets of wheels (prior art wheels and experimental wheels of the invention) designed for commercial use in continuous line contact area grinding operations, such as roll grinding. The prior art wheels are made with organic bond material and the wheels of the invention are made with organic bond material and abrasive grain agglomerates containing inorganic binding materials. The wheels of the invention are vastly superior to the conventional wheels in all operational parameters of roll grinding operations. The conventional wheels again have structures within a zone bounded by 38 to 53 vol % grain, 12 to 38 vol % bond and 15 to 37 vol % porosity. In contrast, the wheels of the invention have structures within a zone bounded by 28 to 48 vol % grain, 10 to 33 vol % bond (the sum of organic bond in the wheel and inorganic binding material in the agglomerates) and 38 to 53 vol % porosity. One can see the inventive wheels can be made with significantly less abrasive grain and significantly more porosity than the conventional wheels. What cannot be seen from the diagram is that the inventive wheels are characterized by much softer grades than the conventional wheels and lower elastic modulus values than conventional wheels (when compared at equivalent volume percent bond material), but they exhibit significantly better grinding efficiency in terms of wheel life, material removal rate and vibration or wheel chatter resistance.

Figure 3:
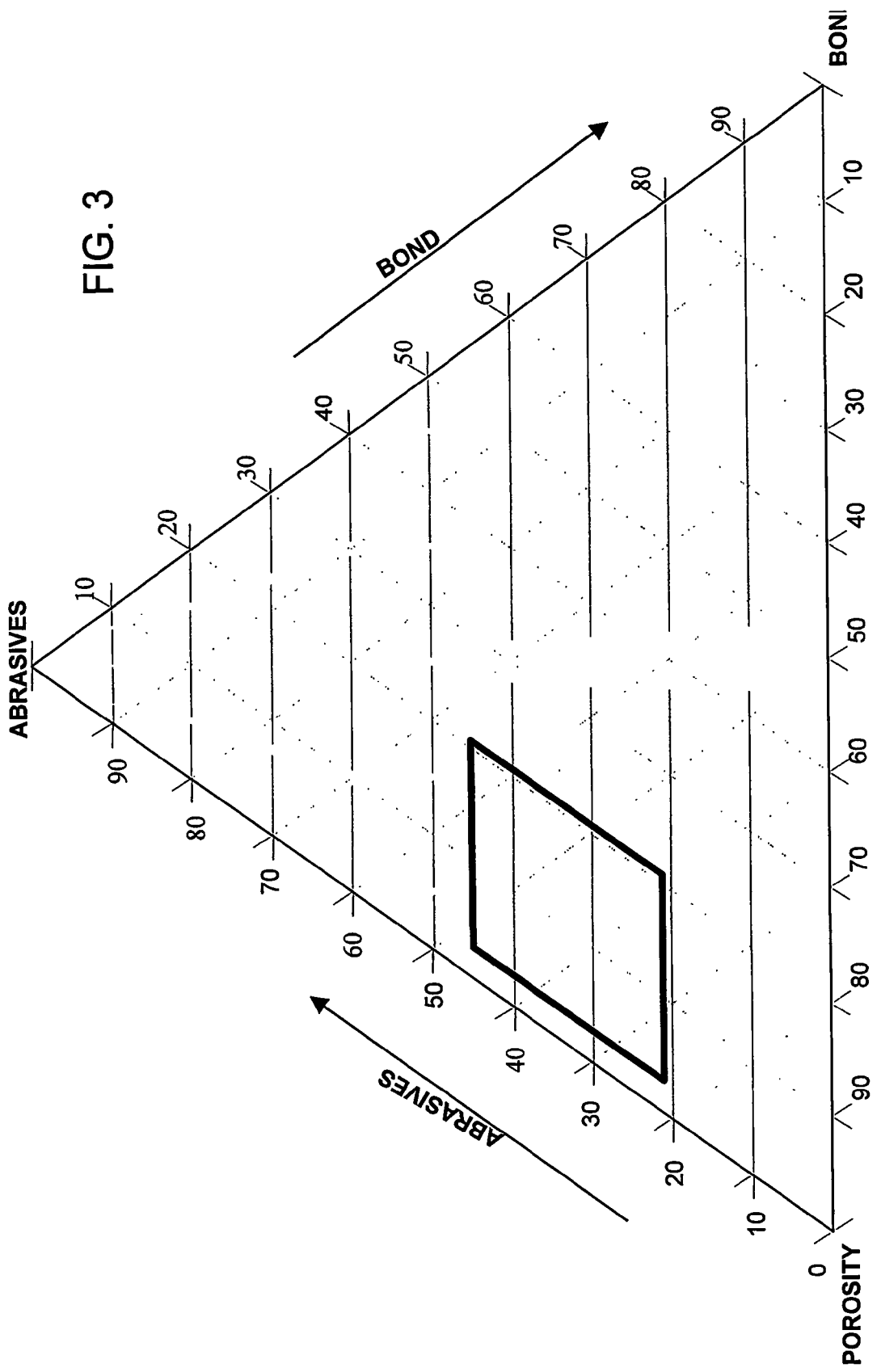
FIG. 3 is a ternary diagram illustrating the range of volumetric percentage composition structures of standard inorganic bonded abrasives tools wherein those of inorganic bonded abrasive tools of the invention made with abrasive grain agglomerates containing inorganic binding materials and an inorganic bond are characterized by significantly lower elastic modulus values, but equivalent wheel burst speed values relative to the standard tools.

FIG. 3 is a ternary diagram illustrating two sets of wheels (prior art wheels and experimental wheels of the invention) made with inorganic bond material, both appropriate for commercial use in high contact area surface grinding operations, such as creep feed grinding. The prior art wheels and the inventive wheels both have structures within a zone bounded by 22 to 46 vol % grain, 4 to 21 vol % bond and 35 to 77 vol % porosity. What cannot be seen from the diagram is that, at an identical volume % structure, the inventive wheels have a softer grade and lower elastic modulus value than the conventional wheels, yet the inventive wheels exhibit significantly better grinding performance in terms of material removal rate and workpiece quality.

Figure 4:
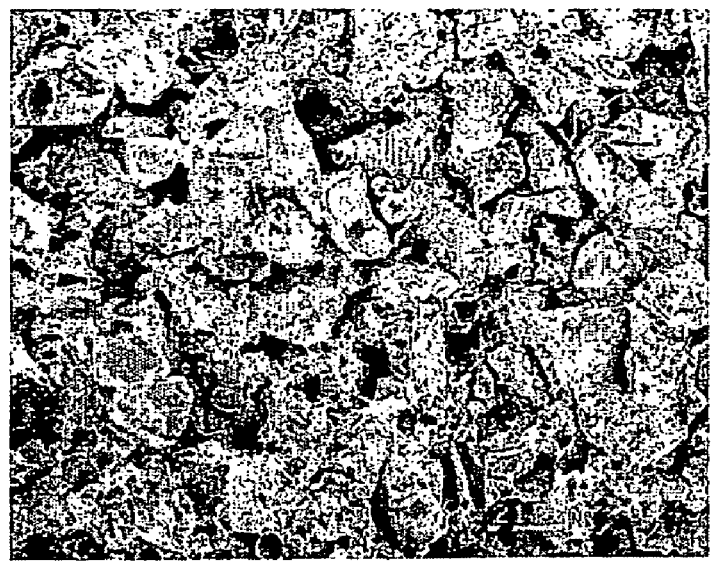
FIG. 4 is a photomicrograph of the surface of a standard bonded abrasive tool made with an organic bond, illustrating a uniform distribution of the three constituents of the abrasive composite.
Figure 5:
FIG. 5 is a photomicrograph of the surface of a bonded abrasive tool of the invention made with an organic bond, illustrating non-uniform distribution of the three constituents of the abrasive composite, porosity (darker areas) as a continuous phase within the composite and a reticulated network of abrasive grain anchored within the organic bond material.

FIGS. 4-5 illustrate the change in the amount and character of the porosity of the inventive tools relative to conventional tools. It can be seen from FIGS. 4 (prior art) and 5 (inventive) that the porosity (darker areas) in the abrasive composite of the inventive wheel is a continuous phase of interconnected channels. The abrasive grain and bond appear as a reticulated network in which abrasive grain is anchored in the organic bond materials. In contrast, the conventional wheels have a substantially uniform structure wherein porosity is hardly visible and clearly present as a discontinuous phase.

In a similar fashion, it has been observed for inorganic bonded tools of the invention that the porosity in the abrasive composite comprises interconnected porosity. The abrasive grains of the inventive wheels are clustered and spaced in an irregular fashion, in contrast to the regular and uniform grain spacing in comparable prior art wheels made with the same type of inorganic bond and grain materials. All constituents of the prior art wheels appear to be spaced in a uniform and homogenous manner across the surface of the wheel, whereas all constituents of the inventive wheel are irregularly spaced and the structure is not homogenous. As would be expected from an inorganic bond (e.g., vitrified bond) tool and the relatively small abrasive grit sizes typically used in such a tool, compared with the organic bond and larger grit sizes illustrated in FIG. 5, porosity channels and the network of abrasive grain and bond are visually less distinct in the inorganic bond tools than the organic bond tools.

Various material properties of the bonded abrasive tools have been identified as being related to the novel composite structures disclosed herein, including mechanical strength, elastic modulus and density.

Mechanical strength properties determine whether a composite can be used as a bonded abrasive tool in a commercial grinding operation. Because most bonded abrasive tools are used in the form of abrasive grinding wheels, mechanical strength is predicted by wheel burst speed testing wherein the wheel is mounted on a arbor within a protective chamber and then rotated at increasing speeds until the composite fails and the wheel bursts apart. The burst speed may be converted into a tensile stress failure point by known equations (e.g., *Formulas for Stress and Strain*, Raymond J. Roark, McGraw-Hill, 1965). For example, if one assumes a rotating disk with a center hole, failure occurs at the hole where the tensile stress is at a maximum.

σ=tensile stress or burst strength (psi)
R=wheel radius (in)
ρ=wheel density (lbs/in³)
r=hole radius (in)
ω=angular velocity (radians/sec)
k=constant (386.4)
υ=Poisson's ratio ( 0.2)

$$\sigma = \frac{1}{4} \times \left(\frac{\rho \times \omega^2}{k}\right)((3+\upsilon) \times R^2 + (1-\upsilon) \times r^2)$$

Applying these relationships to a grinding wheel example, for a 36×4×12 inch (91.4×10.2×30.5 cm) roll grinding wheel with density of 0.053 lbs/in³ (1.46 g/cc) (containing 30% abrasive+22% bond+48% pores by volume), if this wheel had a measured burst speed of 4,000 sfpm (20.32 m/s), then:

$$\text{angular velocity} = 4{,}000 \ \frac{\text{ft}}{\text{min}} = 44.4 \ \frac{\text{radians}}{\text{sec}}$$

$$\sigma = \frac{1}{4} \times \left(\frac{0.053 \times 44.4^2}{386.4}\right)((3+0.2) \times 36^2 + (1-0.2) \times 12^2) = 288 \ psi$$

If the burst speed were twice as high (8,000 sfpm (40.64 m/s) or 88.8 radians/sec), then tensile stress σ=1153 psi at the point where the composite undergoes mechanical failure.

Thus, 'mechanical strength' is defined herein as the wheel burst speed in surface feet per minute (or meters per second) for grinding wheels and, if the bonded abrasive tool is not a wheel, as the measured tensile stress at the point where the composite undergoes complete mechanical failure.

Another material property relevant to the bonded abrasive tools of the invention is the density of the tool. The organic bonded tools of the invention, as one might expect from the volume percent compositions of their novel structures, are less dense than comparable conventional tools typically used in any given grinding operation. The organic bonded tools are characterized by density of less than 2.2 g/cc, more preferably less than 2.0 g/cc, and most preferably less than 1.8 g/cc. As such, for a given grinding application (e.g., disc grinding steel cylinders) they are about 20 to 35% less dense, and on average about 30% less dense, than comparable conventional tools used in the same application.

The inorganic bonded tools of the invention are characterized by comparable or slightly lower densities relative to the densities of comparable conventional tools. For example, inner diameter grinding wheels of a conventional type generally have a density of about 1.97 to 2.22 g/cc, while comparable tools of the invention range from about 1.8 to 2.2 g/cc. The densities of creep feed grinding wheels of the invention and comparable conventional wheels both range from about 1.63 to 1.99 g/cc.

However, for the inorganic bonded tools of the invention, the elastic modulus values are significantly lower, at least 10%, preferably at least 25% and most preferably 50% lower than values for comparable conventional tools. For inner diameter grinding wheels, the elastic modulus of the tools of the invention ranges from 25 to 50 GPa (values were determined with a Grindosonic™ machine, by the method described in J. Peters, "Sonic Testing of Grinding Wheels" *Advances in Machine Tool Design and Research*, Pergamon Press, 1968) in contrast to comparative tool elastic modulus values that typically range from 28 to 55 GPa. Likewise for creep feed wheels, the elastic modulus values for the tools of the invention ranges from 12 to 36 GPa, in contrast to comparative tool elastic modulus values that typically range from 16 to 38 GPa. Likewise for tool room wheels (surface grinding of hardened metal tools) the elastic modulus of the tools of the invention ranges from 12 to 30 GPa, in contrast to comparative tool elastic modulus values that typically range from 16 to 35 GPa. In general, for a selected grinding application, the higher the grade of comparable conventional tool needed for that application, the greater the downward shift in elastic modulus value of the inorganic bonded tool of invention that delivers equal or better performance in that application. It follows that for a selected grinding application, the higher the volume % abrasive grain in a comparable conventional tool needed for that application, the greater the downward shift in elastic modulus value of the inorganic bonded tool of invention that delivers equal or better performance in that application.

The bonded abrasive tools of the invention have an unusually porous structure of interconnected porosity, making the tool permeable to fluid flow and the porosity, in effect, becoming a continuous phase within the abrasive composite. The amount of interconnected porosity is determined by measuring the fluid permeability of the tool according to the method of U.S. Pat. No. 5,738,696. As used herein, Q/P=the fluid permeability of an abrasive tool, where Q means flow rate expressed as cc of air flow, and P means differential pressure. The term Q/P represents the pressure differential measured between the abrasive tool structure and the atmosphere at a given flow rate of a fluid (e.g., air). This relative permeability Q/P is proportional to the product of the pore volume and the square of the pore size. Larger pore sizes are preferred. Pore geometry and abrasive grain size are other factors affecting Q/P, with larger grit size yielding higher relative permeability.

The abrasive tools useful in the invention are characterized by higher fluid permeability values than comparable prior art tools. As used herein, "comparable prior art tools" are those tools made with the same abrasive grain and bond materials at the same porosity, grain and bond volume percentages as those of the invention. In general, abrasive tools of the invention have fluid permeability values of about 25 to 100% higher than the values of comparable prior art abrasive tools. The abrasive tools preferably are characterized by fluid permeability values at least 10% higher, more preferably at least 30% higher, than those of comparable prior art tools.

Exact relative fluid permeability parameters for particular agglomerate sizes and shapes, bond types and porosity levels may be determined by the practitioner by applying D'Arcy's Law to empirical data for a given type of abrasive tool.

The porosity within the abrasive wheel arises from the open spacing provided by the natural packing density of the tool components, particularly the abrasive agglomerates, and, optionally, by adding a minor amount of conventional pore inducing media. Suitable pore inducing media includes, but is not limited to, hollow glass spheres, hollow spheres or beads of plastic material or organic compounds, foamed glass particles, bubble mullite and bubble alumina, and combinations thereof. The tools may be manufactured with open-cell porosity inducers, such as beads of naphthalene, walnut shells, or other organic granules that burn out during firing of the tool to leave void spaces within the tool matrix, or they may be manufactured with closed cell, hollow pore inducing media (e.g., hollow glass spheres). Preferred abrasive tools either do not contain added pore inducer media, or contain a minor amount (i.e., less than 50 volume %, preferably less than 20 volume % and most preferably less than 10 volume % of the tool porosity) of added pore inducer media. The amount and type of added pore inducer must be effective to yield an abrasive tool with a porosity content of which at least 30%, by volume, is interconnected porosity.

The bonded abrasive tools of the invention having these material properties and structural characteristics preferably are made by a process wherein a majority of the abrasive grain has been agglomerated with a binding material before the tool components are mixed molded and thermally cured to form an abrasive composite. These abrasive grain agglomerates may be made with inorganic binding materials or with organic binding materials.

Abrasive Agglomerates Made with Organic Binding Materials

Agglomerates made with organic binding materials that are useful in the invention are three-dimensional structures or granules, including cured composites of abrasive grain and binding material. Any of the thermosetting, polymeric binding materials commonly used in the abrasive tool industry as bonds for organic bonded abrasives, coated abrasives, and the like are preferred. Such materials include phenolic resin materials, epoxy resin materials, phenol formaldehyde resin materials, urea formaldehyde resin materials, melamine formaldehyde resin materials, acrylic resin materials, rubber modified resin compositions, filled compositions and combinations thereof. The agglomerates made with organic binding material have a loose packing density (LPD) of $\leq 1.5$ g/cc, preferably less than 1.3 g/cc, an average dimension of about 2 to 10 times the average abrasive grit size or about 200 to 3000 micrometers, and a porosity content of about 1 to 50%, preferably 5 to 45% and most preferably 10 to 40%, by volume.

A major portion (i.e., at least 50 volume %) of the porosity within the agglomerates is present as porosity that is permeable to the flow of liquid phase organic bond material into the agglomerates during thermal curing of the molded, bonded abrasive tools of the invention.

The abrasive grain useful in agglomerates made either with organic or inorganic binding materials may include one or more of the abrasive grains known for use in abrasive tools, such as the alumina grains, including fused alumina, sintered and sol gel sintered alumina, sintered bauxite, and the like, silicon carbide, alumina-zirconia, aluminoxynitride, ceria, boron suboxide, garnet, flint, diamond, including natural and synthetic diamond, cubic boron nitride (CBN), and combinations thereof. Any size or shape of abrasive grain may be used. For example, the grain may include some (e.g., less than 10 volume % of the total abrasive grain in the tool) elongated sintered sol gel alumina grains having a high aspect ratio of the type disclosed in U.S. Pat. No. 5,129,919. Grain sizes suitable for use herein range from regular abrasive grits (e.g., greater than 60 and up to 7,000 microns) to microabrasive grits (e.g., 0.5 to 60 microns), and mixtures of these sizes. For a given abrasive grinding operation, it may be desirable to agglomerate an abrasive grain with a grit size smaller than an abrasive grain (non-agglomerated) grit size normally selected for this abrasive grinding operation. For example, agglomerated 80 grit size abrasive may be substituted for 54 grit abrasive, agglomerated 100 grit for 60 grit abrasive and agglomerated 120 grit for 80 grit abrasive. As used herein, the 'grit' size refers to abrasive grain size on the Norton Company grit scale.

Abrasive Agglomerates Made with Inorganic Binding Materials

Agglomerates made with inorganic binding materials that are useful in the invention are three-dimensional structures or granules, including sintered porous composites of abrasive grain and ceramic or vitrified binding material. The agglomerates have a loose packing density (LPD) of ≦1.6 g/cc, an average dimension of about 2 to 20 times the average abrasive grit size, and a porosity of about 30 to 88%, preferably 30 to 60%, by volume. The abrasive grain agglomerates preferably have a minimum crush strength value of 0.2 MPa.

The preferred sintered agglomerate size for typical abrasive grains ranges from about 200 to 3,000, more preferably 350 to 2,000, most preferably 425 to 1,000 micrometers in average diameter. For microabrasive grain, preferred sintered agglomerate size ranges from 5 to 180, more preferably 20 to 150, most preferably 70 to 120 micrometers in average diameter.

The abrasive grain is present at about 10 to 65 volume %, more preferably 35 to 55 volume %, and most preferably 48 to 52 volume % of the agglomerate.

Binding materials useful in making the agglomerates preferably include ceramic and vitrified materials, preferably of the sort used as bond systems for vitrified bonded abrasive tools. These vitrified bond materials may be a pre-fired glass that has been ground into powder (a frit), or a mixture of various raw materials such as clay, feldspar, lime, borax, and soda, or a combination of fritted and raw materials. Such materials fuse and form a liquid glass phase at temperatures ranging from about 500 to 1400° C. and wet the surface of the abrasive grain to create bond posts upon cooling, thus holding the abrasive grain within a composite structure. Examples of suitable binding materials for use in the agglomerates are given in Table 2, below. Preferred binding materials are characterized by a viscosity of about 345 to 55,300 poise at 1180° C., and by a melting temperature of about 800 to 1,300° C. However, depending upon the tools' intended uses and desired properties, the agglomerates may be made with one or more inorganic materials selected from the group consisting of vitrified bond materials, ceramic bond materials, glass-ceramic bond materials, inorganic salt materials and metallic bond materials, and combinations thereof.

In a preferred embodiment, the binding material is a vitrified bond composition comprising a fired oxide composition of 71 wt % $SiO_2$ and $B_2O_3$, 14 wt % $Al_2O_3$, less than 0.5 wt % alkaline earth oxides and 13 wt % alkali oxides.

In another preferred embodiment, the binding material may be a ceramic material, including, but not limited to, silica, alkali, alkaline-earth, mixed alkali and alkaline-earth silicates, aluminum silicates, zirconium silicates, hydrated silicates, aluminates, oxides, nitrides, oxynitrides, carbides, oxycarbides and combinations and derivatives thereof. In general, ceramic materials differ from glassy or vitrified materials in that the ceramic materials comprise crystalline structures. Some glassy phases may be present in combination with the crystalline structures, particularly in ceramic materials in an unrefined state. Ceramic materials in a raw state, such as clays, cements and minerals, may be used herein. Examples of specific ceramic materials suitable for use herein include, but are not limited to, silica, sodium silicates, mullite and other alumino silicates, zirconia-mullite, magnesium aluminate, magnesium silicate, zirconium silicates, feldspar and other alkali-alumino-silicates, spinels, calcium aluminate, magnesium aluminate and other alkali aluminates, zirconia, zirconia stabilized with yttria, magnesia, calcia, cerium oxide, titania, or other rare earth additives, talc, iron oxide, aluminum oxide, bohemite, boron oxide, cerium oxide, alumina-oxynitride, boron nitride, silicon nitride, graphite and combinations of these ceramic materials.

Certain of these ceramic binding materials (e.g., sodium silicate) do not require thermal processing to form abrasive grain agglomerates. A solution of the binding material may be added to the abrasive grain and the resulting mixture dried to tack the grains together as agglomerates.

The inorganic binding material is used in powdered form and may be added to a liquid vehicle to insure a uniform, homogeneous mixture of binding material with abrasive grain during manufacture of the agglomerates.

A dispersion of organic binders is preferably added to the powdered inorganic binding material components as molding or processing aids. These binders may include dextrins, starch, animal protein glue, and other types of glue; a liquid component, such as water, solvent, viscosity or pH modifiers; and mixing aids. Use of organic binders improves agglomerate uniformity, particularly the uniformity of the binding material dispersion on the grain, and the structural quality of the pre-fired or green agglomerates, as well as that of the fired abrasive tool containing the agglomerates. Because the binders burn off during firing of the agglomerates, they do not become part of the finished agglomerate nor of the finished abrasive tool.

An inorganic adhesion promoter may be added to the mixture to improve adhesion of the binding materials to the abrasive grain as needed to improve the mix quality. The inorganic adhesion promoter may be used with or without an organic binder in preparing the agglomerates.

The inorganic binding material is present at about 0.5 to 15 volume %, more preferably 1 to 10 volume %, and most preferably 2 to 8 volume % of the agglomerate.

The density of the inorganic binding material agglomerates may be expressed in a number of ways. The bulk density of the agglomerates may be expressed as the LPD. The relative density of the agglomerates may be expressed as a percentage of initial relative density, or as a ratio of the relative density of the agglomerates to the components used to make the agglomerates, taking into account the volume of interconnected porosity in the agglomerates.

The initial average relative density, expressed as a percentage, may be calculated by dividing the LPD ($\rho$) by a theoretical density of the agglomerates ($\rho_0$), assuming zero porosity. The theoretical density may be calculated according to the volumetric rule of mixtures method from the weight percentage and specific gravity of the binding material and of the abrasive grain contained in the agglomerates. For the sintered inorganic agglomerates of the invention, a maximum percent relative density is 50 volume %, with a maximum percent relative density of 30 volume % being more preferred.

The relative density may be measured by a fluid displacement volume technique so as to include interconnected porosity and exclude closed cell porosity. The relative density is the ratio of the volume of the sintered inorganic agglomerates measured by fluid displacement to the volume of the materials used to make the sintered inorganic agglomerates. The volume of the materials used to make the agglomerate is a measure of the apparent volume based on the quantities and packing densities of the abrasive grain and binder material used to make the agglomerates. For the inorganic sintered agglomerates, a maximum relative density of the agglomerates preferably is 0.7, with a maximum relative density of 0.5 being more preferred.

Method of Manufacture of Abrasive Agglomerates

The agglomerates may be formed by a variety of techniques into numerous sizes and shapes. These techniques may be carried out before, during or after firing the initial ("green") stage mixture of grain and binding material. The preferred step of heating the mixture to cause the binding material to melt and flow, thus adhering the binding material to the grain and fixing the grain in an agglomerated form may be referred to herein as curing, firing, calcining or sintering. Any method known in the art for agglomerating mixtures of particles may be used to prepare the abrasive agglomerates.

In a first embodiment of the process used herein to make agglomerates with organic binding materials, the initial mixture of grain and binding material is agglomerated before curing the mixture so as to create a relatively weak mechanical structure referred to as "green agglomerates."

To carry out the first embodiment, the abrasive grain and binding materials may be agglomerated in the green state by a number of different techniques, e.g., in a pan pelletizer, and then fed into an oven at 140-200° C. for thermal curing. The green agglomerates may be placed onto a tray or rack and oven cured, with or without tumbling, in a continuous or batch process. A thermal treatment may be carried out in a fluidized bed apparatus by feeding green agglomerated grain into the bed. An infrared or UV cure may be carried out on a vibratory table. Combinations of these processes may be employed.

The abrasive grain may be conveyed into a mixing pan, mixed with the organic binding materials, then wetted with a solvent to adhere the binding material to the grain, screened for agglomerate size, and then cured in an oven or rotary dryer apparatus.

Pan pelletizing may be carried out by adding grain to a mixer bowl, and metering a liquid component containing the binding material (e.g., water, or organic binder and water) onto the grain, with mixing, to agglomerate them together.

A solvent may be sprayed onto a mixture of the grain and binding material to coat the grain with binding material while mixing, and then the coated grain may be recovered to form agglomerates.

A low-pressure extrusion apparatus may be used to extrude a paste of grain and binding material into sizes and shapes which are dried to form agglomerates. A paste may be made of the binding materials and grain with an organic binder solution and extruded into elongated particles with the apparatus and method disclosed in U.S. Pat. No. 4,393,021.

In a dry granulation process, a sheet or block made of abrasive grain imbedded in dispersion or paste of the binding material may be dried and then a roll compactor may be used to break the composite of grain and binding material.

In another method of making green or precursor agglomerates, the mixture of the organic binding material and the grain may be added to a molding device and the mixture molded to form precise shapes and sizes, for example, in the manner disclosed in U.S. Pat. No. 6,217,413 B1.

In a second embodiment of the process useful herein for making agglomerates, a simple mixture of the grain and the organic binding material is fed into a rotary calcination apparatus. The mixture is tumbled at a predetermined rpm, along a predetermined incline with the application of heat. Agglomerates are formed as the binding material mixture heats, melts, flows and adheres to the grain. The firing and agglomeration steps are carried out simultaneously at controlled rates and volumes of feeding and heat application. In a preferred method, the agglomeration process is carried out by the methods described in related priority patent application, U.S. Ser. No. 10/120,969, filed Apr. 11, 2002.

When agglomerating abrasive grain with lower temperature curing (e.g., about from about 145 to about 500° C.) binding materials, an alternative embodiment of this rotary kiln apparatus may be used. The alternative embodiment, a rotary dryer, is equipped to supply heated air to the discharge end of the tube to heat the green agglomerated abrasive grain mixture and cure the binding material, bonding it to the grain. As used herein, the term "rotary calcination kiln" includes such rotary dryer devices.

Agglomerates of abrasive grain with inorganic binding materials may be carried out by the methods described in related priority patent application, U.S. Ser. No. 10/120,969, filed Apr. 11, 2002, and by the methods described in the Examples herein.

Abrasive Tools Made with Abrasive Agglomerates

The bonded abrasive tools made with agglomerates include abrasive grinding wheels, segmented wheels, discs, hones, stones and other rigid, monolithic, or segmented, shaped abrasive composites. The abrasive tools of the invention preferably comprise about 5 to 70 volume %, more preferably 10 to 60 volume %, most preferably 20 to 52 volume % abrasive grain agglomerates based on total abrasive composite volume. From 10 to 100 volume %, preferably 30 to 100 volume %, and at least 50 volume %, of the abrasive grain in the tool is in the form of a plurality (e.g., 2 to 40 grains) of abrasive grains agglomerated together with binding material.

The tools of the invention optionally may contain added secondary abrasive grains, fillers, grinding aids and pore inducing media, and combinations of these materials. The total volume % abrasive grain in the tools (agglomerated and non-agglomerated grain) may range from about 22 to about 48 volume %, more preferably from about 26 to about 44 volume %, and most preferably from about 30 to about 40 volume % of the tool.

The density and hardness of the abrasive tools are determined by the selection of the agglomerates, type of bond and other tool components, the porosity content, together with the size and type of mold and selected pressing process. The bonded abrasive tools preferably have a density of less than 2.2 g/cc, more preferably less than 2.0 g/cc, and most preferably less than 1.8 g/cc.

When a secondary abrasive grain is used in combination with the abrasive agglomerates, the secondary abrasive grains preferably provide from about 0.1 to about 90 volume % of the total abrasive grain of the tool, and more preferably, from about 0.1 to about 70 volume %, most preferably 0.1 to 50 volume %. Suitable secondary abrasive grains include, but are not limited to, various aluminum oxides, sol gel alumina, sintered bauxite, silicon carbide, alumina-zirconia, aluminoxynitride, ceria, boron suboxide, cubic boron nitride, diamond, flint and garnet grains, and combinations thereof.

Preferred abrasive tools of the present invention are bonded with an organic bond. Any of the various bonds known in the art of making abrasive tools may be selected for use herein. Examples of suitable bonds and bond filler materials may be found in U.S. Pat. Nos. 6,015,338; 5,912,216; and 5,611,827, the contents of which are hereby incorporated by reference. Suitable bonds include phenolic resins of various types, optionally with a cross-linking agent such as hexa-methylene tetramine, epoxy resin materials, polyimide resin materials, phenol formaldehyde, urea formaldehyde and melamine formaldehyde resin materials, acrylic resin materials and combinations thereof. Other thermosetting resin compositions also may be used herein.

Organic binders or solvents may be added to powdered bond components, as molding or processing aids. These binders may include furfural, water, viscosity or pH modifiers and mixing aids. Use of binders often improves wheel uniformity and the structural quality of the pre-fired or green pressed wheel and the cured wheel. Because most of the binders are evaporated during curing, they do not become part of the finished bond or abrasive tool.

Organic bonded abrasive tools of the invention may comprise about 10 to 50 volume %, more preferably 12 to 40 volume %, and most preferably 14 to 30 volume % bond. The bond is situated within the three-dimensional abrasive composite such that a first phase of abrasive grains and bond comprises less than 10 volume % porosity, and preferably less than 5 volume % porosity. This first phase appears within the composite matrix of the organic bonded abrasive tools as a reticulated network of abrasive grain anchored within the organic bond material. In general, it is desirable to have a first phase within the three-dimensional composite that as fully dense as can be achieved within the limitations of the materials and the manufacturing processes.

Together with the abrasive grain agglomerates and the bond, these tools comprise about 38 to 54 volume % porosity, this porosity being a continuous phase including at least 30 volume % of interconnected porosity. Preferred organic bonded abrasive tools may comprise 24 to 48 volume % abrasive grain, 10 to 38 volume % organic bond and 38 to 54 volume % porosity.

These organic bonded tools have a minimum burst speed of 4000 sfpm (20.32 m/s), preferably 6000 sfpm (30.48 m/s).

In a preferred embodiment, the organic bonded abrasive tools may comprise, as a first phase, 26-40 vol % abrasive grains bonded with 10-22 vol % organic bond material and less than 10 vol % porosity, and a second phase consisting of 38-50 vol % porosity.

When made with agglomerates of grain and organic binding materials, the organic bonded abrasive tools may comprise, as a first phase, 24-42 vol % abrasive grains bonded with 18-38 vol % organic bond material and less than 10 vol % porosity, and a second phase consisting of 38-54 vol % porosity.

When made with agglomerates of grain and inorganic binding materials, the organic bonded abrasive tools may comprise, as a first phase, 28 to 48 vol % grain bonded with 10 to 33 vol % bond (the sum of organic bond in the wheel and inorganic binding material in the agglomerates) and a second phase consisting of 38 to 53 vol % porosity. The tool preferably comprises a minimum of 1 vol % inorganic binder material, and most preferably comprises 2 to 12 vol % inorganic binder material. Such tools preferably have a maximum elastic modulus value of 10 GPa and a minimum burst speed of 6000 sfpm (30.48 m/s). When evaluated on the Norton Company grade scale, these abrasive tools have a hardness grade between A and H, and that hardness grade is at least one grade softer than that of an otherwise identical conventional tool made with abrasive grains that have not been agglomerated together with an inorganic binder material.

Optionally, the organic bonded abrasive tool includes a mixture of a plurality of grains agglomerated together with an inorganic binder material and a plurality of grains agglomerated together with an organic binder material.

When made with an inorganic bond and agglomerates of grain and inorganic binding materials, the bonded abrasive tools may comprise a three-dimensional composite of (a) 22-46 vol % abrasive grains bonded with 4-20 vol % inorganic bond material; and (b) 40-68 vol % interconnected porosity; wherein a majority of the abrasive grains are present as irregularly space clusters within the composite. These bonded abrasive tools have elastic modulus values that are at least 10% lower than elastic modulus values for otherwise identical conventional tools having regularly spaced abrasive grains within a three-dimensional composite and they exhibit a minimum burst speed of 4000 sfpm (20.32 m/s), preferably 6000 (30.48 m/s). Preferred inorganic bonded abrasive tools comprise 22-40 vol % abrasive grains bonded with 8-20 vol % inorganic bond material, and 40-68 vol % interconnected porosity.

In a preferred embodiment, the inorganic bonded abrasive tools comprise 34-42 vol % abrasive grains bonded with 6-12 vol % inorganic bond material, and 46-58 vol % interconnected porosity. These tools are made with a vitrified bond material, are substantially free of high aspect ratio abrasive grains and fillers, and the tools are molded and fired without adding porosity inducing materials during manufacturing. The preferred vitrified bonded abrasive tools are wheels having a hardness grade between A and M on the Norton Company grade scale, and the hardness grade is at least one grade softer than that of an otherwise identical conventional tool having regularly spaced abrasive grains within a three-dimensional composite. The preferred vitrified bonded abrasive tools are characterized by an elastic modulus value that is at least 25% lower, preferably at least 40% lower, than the elastic modulus value of an otherwise identical conventional tool having regularly spaced abrasive grains within a three-dimensional composite and a minimum burst speed of 6000 sfpm (30.48 m/s).

The preferred vitrified bonded abrasive tools made with agglomerates of grain in inorganic binding materials include inner diameter grinding wheels containing 40 to 52 vol % abrasive grain and having an elastic modulus value of 25 to 50 GPa. Also included are surface grinding wheels for toolroom applications containing 39 to 52 vol % abrasive grain and an having elastic modulus value of 15 to 36 GPa, and creep feed grinding wheels containing 30 to 40 vol % abrasive grain and having an elastic modulus value of 8 to 25 GPa.

To yield appropriate mechanical strength in the organic bonded abrasive tool during manufacturing of the tool and during use of the tool in grinding operations, at least 10 volume % of the total bond component must consist of added organic bond and cannot be binding material used in the agglomerates.

Abrasive wheels may be molded and pressed by any means known in the art, including hot, warm and cold pressing techniques. Care must be taken in selecting a molding pressure for forming the green wheels either to avoid crushing agglomerates, or to crush a controlled amount of the agglomerates (i.e., 0-75%, by weight, of the agglomerates) and preserve the three-dimensional structure of the remaining agglomerates. The appropriate applied pressure for making the wheels of the invention depends upon the shape, size, thickness and bond component of the abrasive wheel, and upon the molding temperature. In common manufacturing processes, the maximum pressure may range from about 500 to 10,000 lbs/sq. in (35 to 704 Kg/sq. cm). Molding and pressing are preferably carried out at about 53 to 422 Kg/sq. cm, more preferably at 42 to 352 Kg/sq. cm. The agglomerates of the invention have sufficient mechanical strength to withstand the molding and pressing steps carried out in typical commercial manufacturing processes for making abrasive tools.

The abrasive wheels may be cured by methods known to those skilled in the art. The curing conditions are primarily determined by the actual bond and abrasives used, and by the type of binding material contained in the abrasive grain agglomerate. Depending upon the chemical composition of the selected bond, a organic bond may be fired at 150 to 250° C., preferably 160 to 200° C., to provide the necessary mechanical properties for commercial use in grinding operations.

Selection of a suitable organic bond will depend upon which agglomeration process is in use and whether it is desirable to avoid flow of the heated organic bond into the intra-agglomerate pores.

The organic bonded tools may be mixed, molded and cured according to various processing methods, and with various proportions of abrasive grain or agglomerate, bond and porosity components as are known in the art. Suitable manufacturing techniques for making organic bonded abrasive tools are disclosed in U.S. Pat. Nos. 6,015,338; 5,912,216; and 5,611,827.

Suitable manufacturing techniques for making vitrified (or other inorganic bond) bonded abrasive tools of the invention are described in related priority patent application, U.S. Ser. No. 10/120,969, filed Apr. 11, 2002, in the Examples herein and, for example, in U.S. Pat. No. 5,738,696 and U.S. Pat. No. 5, 738,697.

Grinding Applications

The abrasive tools of the invention are particularly effective in grinding applications having large surface area contact or prolonged continuous contact between the abrasive tool arid the workpiece during grinding. Such grinding operations include, but are not limited to, roll and disc grinding, creep feed grinding, inner diameter grinding, tool room grinding and other precision grinding operations.

Fine grinding or polishing operations using micron or submicron sized abrasive grain will benefit from use of tools made with the agglomerates of the invention. Relative to conventional superfinishing or polishing tools and systems, the tools of the invention made with such fine grit abrasive agglomerates will erode at lower grinding forces with little or no surface damage to the workpiece during precision finishing operations (e.g., to yield mirror finishes on glass and ceramic components). Tool life remains satisfactory due to the agglomerated structures within the three-dimensional matrix of the tool body.

Due to the interconnected porosity of the tools, in roll and disc grinding, coolant supply and debris removal are enhanced, resulting in cooler grinding operations, less frequent tool truing, less thermal damage to the workpiece and less grinding machine wear. Because smaller grit size abrasive grains in agglomerated form give the grinding efficiency of a larger grit size grain, but leave a smoother surface finish, the ground work part quality often improves significantly.

In a preferred method for disc grinding, the organic bonded abrasive tools comprising agglomerates of grain bonded with organic binding materials are mounted on a surface grinding machine, rotated at, e.g., 4000 to 6500 sfpm (20.32 to 33.02 m/s), and brought into contact with a workpiece for a sufficient period of time to grind the workpiece. With this method the wheel removes workpiece material at an effective material removal rate, the grinding surface of the wheel remains substantially free of grinding debris and, after grinding has been completed, the workpiece is substantially free of thermal damage.

In a preferred method for creep feed grinding, vitrified bonded abrasive wheels comprising agglomerates of grain bonded with inorganic binding materials, having an elastic modulus value that is at least 10% lower than the elastic modulus value of an otherwise identical conventional tool having regularly spaced abrasive grains within a three-dimensional composite, and having a minimum burst speed of 4000 sfpm (20.32 m/s) is mounted on a creep feed grinding machine. The vitrified wheel is wheel is rotated at a speed of 5500 to 8500 sfpm (27.94 to 43.18 m/s) and brought into contact with a workpiece for a sufficient period of time to grind the work piece. By this method the wheel removes workpiece material at an effective material removal rate and, after grinding, the workpiece is substantially free of thermal damage.

The following Examples are provided by way of illustration of the invention, and not by way of limitation.

EXAMPLE 1

A series of agglomerated abrasive grain samples containing inorganic binding materials were prepared in a rotary calcination apparatus (electric fired model #HOU-5D34-RT-28, 1,200° C. maximum temperature, 30 KW input, equipped with a 72" (183 cm) long, 5.5" (14 cm) inner diameter refractory metal tube, manufactured by Harper International, Buffalo, N.Y.). The refractory metal tube was replaced with a silicon carbide tube of the same dimensions, and the apparatus was modified to operate at a maximum temperature of 1,550° C. The process of agglomeration was carried out under atmospheric conditions, at a hot zone temperature control set point of 1,180° C., with an apparatus tube rotation rate of 9 rpm, a tube incline angle of 2.5 to 3 degrees, and a material feedrate of 6-10 kg/hour. The yield of usable free-flowing granules (defined as −12 mesh to pan) was 60 to 90% of the total weight of the feedstock before calcination.

The agglomerate samples were made from a simple mixture of abrasive grain, binding material and water mixtures described in Table 1-1. The vitrified bond binding material compositions used to prepare the samples are listed in Table 2. Samples were prepared from three types of abrasive grains: fused alumina 38A, fused alumina 32A and sintered sol gel alpha-alumina Norton SG grain, obtained from Saint-Gobain Ceramics & Plastics, Inc., Worcester, Mass., USA, in the grit sizes listed in Table 1.

After agglomeration in the rotary calcination apparatus, the agglomerated abrasive grain samples were screened and tested for loose packing density (LPD), size distribution and agglomerate strength. These results are shown in Table 1-1.

TABLE 1-1

Agglomerated Granule Characteristics

| Sample No. grain liquid binding material | Weight lbs (Kg) of mix | Binding material Weight % (on grain basis) | Volume % of binding material[a] | LPD g/cc −12/ pan | Average size distribution microns | Average size distribution mesh size | Average % relative density | pressure at 50% crushed fraction MPa |
|---|---|---|---|---|---|---|---|---|
| 1 60 grit 38A water A binding material | 30.00 (13.6) 0.60 (0.3) 0.64 (0.3) | 2.0 | 3.18 | 1.46 | 334 | −40/+50 | 41.0 | 0.6 ± 0.1 |
| 2 90 grit 38A water E binding material | 30.00 (13.6) 0.90 (0.4) 1.99 (0.9) | 6.0 | 8.94 | 1.21 | 318 | −45/+50 | 37.0 | 0.5 ± 0.1 |
| 3 120 grit 38A water C binding material | 30.00 (13.6) 1.20 (0.5) 3.41 (1.5) | 10.0 | 13.92 | 0.83 | 782 | −20/+25 | 22.3 | 2.6 ± 0.2 |
| 4 120 grit 32A water A binding material | 30.00 (13.6) 0.90 (0.4) 1.91 (0.9) | 6.0 | 8.94 | 1.13 | 259 | −50/+60 | 31.3 | 0.3 ± 0.1 |
| 5 60 grit 32A water E binding material | 30.00 (13.6) 1.20 (0.5) 3.31 (1.5) | 10.0 | 14.04 | 1.33 | 603 | −25/+30 | 37.0 | 3.7 ± 0.2 |
| 6 90 grit 32A water C binding material | 30.00 (13.6) 0.60 (0.3) 0.68 (0.3) | 2.0 | 3.13 | 1.03 | 423 | −40/+45 | 28.4 | 0.7 ± 0.1 |
| 7 90 grit SG water A binding material | 30.00 (13.6) 1.20 (0.5) 3.18 (1.4) | 10.0 | 14.05 | 1.20 | 355 | −45/+50 | 36.7 | 0.5 ± 0.1 |
| 8 120 grit SG water E binding material | 30.00 (13.6) 0.60 (0.3) 0.66 (0.3) | 2.0 | 3.15 | 1.38 | 120 | −120/+140 | 39.1 | — |

TABLE 1-1-continued

Agglomerated Granule Characteristics

| Sample No. grain liquid binding material | Weight lbs (Kg) of mix | Binding material Weight % (on grain basis) | Volume % of binding material[a] | LPD g/cc −12/ pan | Average size distribution microns | Average size distribution mesh size | Average % relative density | pressure at 50% crushed fraction MPa |
|---|---|---|---|---|---|---|---|---|
| 9 60 grit SG water C binding material | 30.00 (13.6) 0.90 (0.4) 2.05 (0.9) | 6.0 | 8.87 | 1.03 | 973 | −18/+20 | 27.6 | — |

[a]The volume % binding material is a percentage of the solid material within the granule (i.e., binding material and grain) after firing, and does not include the volume % porosity.

The volume % binding material of the fired agglomerates was calculated using the average LOI (loss on ignition) of the binding material raw materials.

The sintered agglomerates were sized with U.S. standard testing sieves mounted on a vibrating screening apparatus (Ro-Tap; Model RX-29; W.S. Tyler Inc. Mentor, Ohio). Screen mesh sizes ranged from 18 to 140, as appropriate for different samples. The loose packed density of the sintered agglomerates (LPD) was measured by the American National Standard procedure for Bulk Density of Abrasive Grains.

The initial average relative density, expressed as a percentage, was calculated by dividing the LPD ($\rho$) by a theoretical density of the agglomerates ($\sigma_0$), assuming zero porosity. The theoretical density was calculated according to the volumetric rule of mixtures method from the weight percentage and specific gravity of the binding material and of the abrasive grain contained in the agglomerates.

The strength of the agglomerates was measured by a compaction test. The compaction tests were performed using one inch (2.54 cm) in diameter lubricated steel die on an Instron® universal testing machine (model MTS 1125, 20,000 lbs (9072 Kg)) with a 5 gram sample of agglomerate. The agglomerate sample was poured into the die and slightly leveled by tapping the outside of the die. A top punch was inserted and a crosshead lowered until a force ("initial position") was observed on the recorder. Pressure at a constant rate of increase (2 mm/min) was applied to the sample up to a maximum of 180 MPa of pressure. The volume of the agglomerate sample (the compacted LPD of the sample), observed as a displacement of the crosshead (the strain), was recorded as the relative density as a function of the log of the applied pressure. The residual material was then screened to determine the percent crush fraction. Different pressures were measured to establish a graph of the relationship between the log of the applied pressure and the percent crush fraction. Results are reported in Table 1-1 as the log of the pressure at the point where the crush fraction equates to 50 weight percent of the agglomerate sample. The crush fraction is the ratio of the weight of crushed particles passing through the smaller screen to the weight of the initial weight of the sample.

These agglomerates had LPD, size distribution, and molding strength and granule size retention characteristics suitable for use in the commercial manufacture of abrasive grinding wheels. The finished, sintered agglomerates had three-dimensional shapes varying among triangular, spherical, cubic, rectangular and other geometric shapes. Agglomerates consisted of a plurality of individual abrasive grits (e.g., 2 to 20 grits) bonded together by glass binding material at grit to grit contact points.

Agglomerate granule size increased with an increase in amount of binding material in the agglomerate granule over the range from 3 to 20 weight % of the binding material.

Adequate compaction strength was observed for all samples 1-9, indicating that the glass binding material had matured and flowed to create an effective bond among the abrasive grains within the agglomerate. Agglomerates made with 10 weight % binding material had significantly higher compaction strength than those made with 2 or 6 weight % binding material.

Lower LPD values were an indicator of a higher degree of agglomeration. The LPD of the agglomerates decreased with increasing weight % binding material and with decreasing abrasive grit size. Relatively large differences between 2 and 6 weight % binding material, compared with relatively small differences between 6 and 10 weight % binding material indicate a weight % binding material of less than 2 weight % may be inadequate for formation of agglomerates. At the higher weight percentages, above about 6 weight %, the addition of more binding material may not be beneficial in making significantly larger or stronger agglomerates.

As suggested by agglomerate granule size results, binding material C samples, having the lowest molten glass viscosity at the agglomerating temperature, had the lowest LPD of the three binding materials. The abrasive type did not have a significant effect upon the LPD.

TABLE 1-2

Binding Material used in the Vitrified Agglomerates

| Fired Composition Elements[b] | A Binding material wt % (A-1 binding material)[a] | B Binding material wt % | C Binding material wt % | D Binding material wt % | E Binding material wt % | F Binding material wt % | G Binding material wt % |
|---|---|---|---|---|---|---|---|
| glass formers ($SiO_2 + B_2O_3$) | 69 (72) | 69 | 71 | 73 | 64 | 68 | 69 |
| $Al_2O_3$ | 15 (11) | 10 | 14 | 10 | 18 | 16 | 9 |
| alkaline earth RO (CaO, MgO) | 5-6 (7-8) | <0.5 | <0.5 | 1-2 | 6-7 | 5-6 | <1 |
| Alkali $R_2O$ ($Na_2O$, $K_2O$, $Li_2O$) | 9-10 (10) | 20 | 13 | 15 | 11 | 10 | 7-8 |
| Spec. Gravity g/cc | 2.40 | 2.38 | 2.42 | 2.45 | 2.40 | 2.40 | 2.50 |
| Estimated Viscosity (Poise) at 1180° C. | 25,590 | 30 | 345 | 850 | 55,300 | 7,800 | N/A |

[a]The A-1 binding material variation set forth in parentheses was used for the samples of Example 2.
[b]Impurities (e.g., $Fe_2O_3$ and $TiO_2$) are present at about 0.1-2%.

EXAMPLE 2

Abrasive Grain/Inorganic Binder Material Agglomerates

Vitrified binding materials were used to make agglomerated abrasive grain samples AV2 and AV3. The agglomerates were prepared according to the rotary calcination method described in Example 1, using the materials described below. The AV2 agglomerates were made with 3 wt. % A Binding material (Table 1-2). The calciner temperature was set at 1250° C., the tube angle was 2.5 degrees and the rotation speed was 5 rpm. The AV3 agglomerates were made with 6 wt. % E Binding material (Table 1-2), at a calciner temperature of 1200° C., with a tube angle of 2.5-4° and a rotation speed of 5 rpm. The abrasive grain was a fused alumina 38A abrasive grain, 80 grit size, obtained from Saint-Gobain Ceramics & Plastics, Inc., Worcester, Mass., USA.

The vitrified grain agglomerates were tested for loose packing density, relative density and size. Test results are listed in Table 2-1 below. Agglomerates consisted of a plurality of individual abrasive grits (e.g., 2 to 40 grits) bonded together by vitrified binding material at grit to grit contact points, together with visible void areas. The majority of the agglomerates were sufficiently resistant to compaction to retain a three dimensional character after being subjected to abrasive wheel mixing and molding operations.

TABLE 2-1

Abrasive Grain/Vitrified Binder Agglomerates

| Sample No. Mix: grain, binding material | Weight lbs (kg) of mix | Wt % Abrasive Grain | Binding material Wt % | Volume % binding material[a] | LPD g/cc −20/+45 mesh fraction | Average size microns (mesh) | Average % relative density |
|---|---|---|---|---|---|---|---|
| AV2 80 grit 38A, A Binding Material | 84.94 (38.53) | 94.18 | 2.99 | 4.81 | 1.036 | 500μ (−20/+45) | 26.67 |
| AV3 80 grit 38A E Binding Material | 338.54 (153.56) | 88.62 | 6.36 | 9.44 | 1.055 | 500μ −20/+45 | 27.75 |

[a]The percentages are on a total solids basis, only include the vitrified binder material and abrasive grain, and exclude any porosity within the agglomerates. Temporary organic binder materials were used to adhere the vitrified bond to the abrasive grain (for AV2, 2.83 wt % AR30 liquid protein binder was used, and for AV3, 3.77 wt % AR30 liquid protein binder was used). The temporary organic binder materials were burned out during the sintering of the agglomerates in the rotary calciner and the final wt % binding material does not include them.

Abrasive Wheels

Agglomerate samples AV2 and AV3 were used to make experimental abrasive grinding wheels (type 1) (finished size 5.0×0.5×1.250 inch) (12.7 ×1.27×3.18 cm). The experimental wheels were made by adding the agglomerates to a rotating paddle mixer (a Foote-Jones mixer, obtained from Illinois Gear, Chicago, Ill.), and blending with the agglomerates a liquid phenolic resin (V-1181 resin from Honeywell International Inc., Friction Division, Troy N.Y.) (22 wt % of resin mixture). A powdered phenolic resin (Durez Varcum® resin 29-717 obtained from Durez Corporation, Dallas Tex.) (78 wt % of resin mixture) was added to the wet agglomerates. The weight percent quantities of abrasive agglomerate and resin bond used to make these wheels and the composition of the finished wheels (including volume % abrasive, bond and porosity in the cured wheels) are listed in Table 2-2, below.

The materials were blended for a sufficient period of time to get a uniform blend and minimize the amount of loose bond. After blending, the agglomerates were screened through a 24 mesh screen to break up any large clumps of resin. The uniform agglomerate and bond mixture was placed into molds and pressure was applied to form green stage (uncured) wheels. These green wheels were removed from the molds, wrapped in coated paper and cured by heating to a maximum temperature of 160° C., graded, finished, and inspected according to commercial grinding wheel manufacturing techniques known in the art. Finished wheel elastic modulus was measured and results are shown in Table 2-2 below.

Elastic modulus was measured using a Grindosonic machine, by the method described in J. Peters, "Sonic Testing of Grinding Wheels" *Advances in Machine Tool Design and Research*, Pergamon Press, 1968.

TABLE 2-2

| | Wheel Compositions | | | | | | |
|---|---|---|---|---|---|---|---|
| Wheel Sample (Agglomerate) | | | Wheel Composition Volume % | | | | |
| Grade Experimental Wheels | Elastic Modulus G-pascal | Cured Density g/cc | Abrasive Grain | Bond Total[c] (organic) | Porosity | Weight % Agglomerate | Weight % Bond |
| 1-1 (AV3) A | 3.5 | 1.437 | 30 | 18 (14.8) | 52 | 86.9 | 13.1 |
| 1-2 (AV3) C | 4.5 | 1.482 | 30 | 22 (18.8) | 48 | 84.0 | 16.0 |
| 1-3 (AV3) E | 5.0 | 1.540 | 30 | 26 (22.8) | 44 | 81.2 | 18.8 |
| 1-4 (AV2) A | 5.5 | 1.451 | 30 | 18 (16.7) | 52 | 85.1 | 14.9 |
| 1-5 (AV2) E | 7.0 | 1.542 | 30 | 26 (24.7) | 44 | 79.4 | 20.6 |
| Comparative Wheels[a] commercial designation | Elastic Modulus | Cured Density g/cc | Grain Vol % | Bond Vol % | Porosity vol % | Weight % Abrasive | Weight % Bond |
| C-1 38A80-G8 B24 | 13 | 2.059 | 48 | 17 | 35 | 89.7 | 10.3 |
| C-2 38A80-K8 B24 | 15 | 2.154 | 48 | 22 | 30 | 87.2 | 12.8 |
| C-3 38A80-O8 B24 | 17 | 2.229 | 48 | 27 | 25 | 84.4 | 15.6 |
| C-4 53A80J7 Shellac Blend | 10.8 | 1.969 | 50 | 20 | 30 | 89.2 | 10.8 |
| C-5 53A80L7 Shellac Blend | 12.0 | 2.008 | 50 | 24 | 26 | 87.3 | 12.7 |
| C-6[b] National Shellac Bond A80-Q6ES | 9.21 | 2.203 | 48.8 | 24.0 | 27.2 | 86.9 | 13.1 |

TABLE 2-2-continued

| Wheel Compositions | | | | | | | |
|---|---|---|---|---|---|---|---|
| C-7[b] Tyrolit Shellac Bond FA80-11E15SS | 8.75 | 2.177 | 47.2 | 27.4 | 25.4 | 84.9 | 15.1 |

[a]The C-1, C-2 and C-3 wheels are made with a phenolic resin bond and these wheel specifications are commercially available from Saint-Gobain Abrasives, Inc. The C-4 and C-5 wheels are made from a shellac resin blended with a minor amount of phenolic resin bond. These wheel specifications are commercially available from Saint-Gobain Abrasives, Inc., Worcester, MA. These samples C-4 and C-5 were prepared in the laboratory according to these commercial specifications, and were cured to a final wheel hardness grade of J and L, respectively.
[b]The C-6 and C-7 wheels were not tested in the grinding tests. These comparative wheel specifications are commercially available from National Grinding Wheel Company/Radiac, Salem, IL, and from Tyrolit N.A., Inc., Westboro, MA.
[c]The "Total" volume % of bond is the sum of the amount of vitrified binder material used to agglomerate the grain and the amount of organic resin bond used to make the grinding wheel. The "(organic)" volume % of bond is the portion of the Total volume % bond consisting of the organic resin added to the agglomerates to make the grinding wheel.

EXAMPLE 3

The experimental wheels of Example 2 were tested in a simulated roll grinding test in comparison with commercially available wheels bonded with phenolic resin (C-1-C-3, obtained from Saint-Gobain Abrasives, Inc., Worcester, Mass.). Shellac bonded wheels prepared in the laboratory (C-4 and C-5) from a shellac resin blend also were tested as comparative wheels. Comparative wheels were selected because they had compositions, structures and physical properties equivalent to those wheels used in commercial roll grinding operations.

To simulate roll grinding in a laboratory setting, a continuous contact slot grinding operation was conducted on a surface grinding machine. The following grinding conditions were employed in the tests.
Grinding machine: Brown & Sharpe surface grinder
Mode: two continuous contact slot grinds, reversal at end of stroke prior to loss of contact with workpiece
Coolant: Trim Clear 1:40 ratio coolant:deionized water
Workpiece: 16×4 inch 4340 steel, hardness Rc50
Workpiece speed: 25 feet/min.
Wheel speed: 5730 rpm
Downfeed: 0.100 inch total
Depth of cut: 0.0005 inch at each end
Contact time: 10.7 minutes
Dressing: Single point diamond, at 10 inch/min crossfeed, 0.001 inch comp.

Wheel vibration during grinding was measured with IRD Mechanalysis equipment (Analyzer Model 855 Analyzer/Balancer, obtained from Entek Corporation, North Westerville, Ohio). In an initial grinding run, vibration levels at various frequencies (as velocity in inches/second units) were recorded, using a fast Fourier transform (FFT) procedure, at two and eight minutes after dressing the wheel. After the initial grinding run, a second grinding run was made and time-related growth in vibration level was recorded at a selected, target frequency (57000 cpm, the frequency observed during the initial run) during the entire 10.7 minutes the wheel remained in contact with the workpiece. Wheel wear rates (WWR). material removal rates (MRR) and other grinding variables were recorded as the grinding runs were made. These data, together with the vibration amplitude for each wheel after 9-10 minutes of continuous contact grinding, are shown in Table 3-1, below.

TABLE 3-1

Grinding Test Results

| Wheel Sample (Agglomerate) Grade | Vibration Amplitude 9-10 min. in/sec | WWR in³/min | Power 9-10 min. hp | SGE J/mm³ | G-ratio MRR/WWR |
|---|---|---|---|---|---|
| Experimental Wheels | | | | | |
| 1-1 (AV3) A | 0.010 | 0.00215 | 10.00 | 22.70 | 34.5 |
| 1-2 (AV3) C | 0.011 | 0.00118 | 15.00 | 29.31 | 63.3 |
| 1-3 (AV3) E | 0.021 | 0.00105 | 22.00 | 43.82 | 71.4 |
| 1-4 (AV2) A | 0.011 | 0.00119 | 10.50 | 23.67 | 62.7 |
| 1-5 (AV2) E | 0.013 | 0.00131 | 21.00 | 40.59 | 56.6 |
| Comparative Wheels (commercial designation) | | | | | |
| C-1 38A80-G8 B24 | 0.033 | 0.00275 | 10.00 | 33.07 | 26.5 |
| C-2 38A80-K8 B24 | 0.055 | 0.00204 | 11.00 | 25.33 | 36.8 |
| C-3 38A80-O8 B24 | 0.130 | 0.00163 | 12.50 | 22.16 | 46.2 |
| C-4 53A80J7 Shellac Blend | 0.022 | 0.00347 | 10.00 | 25.46 | 20.8 |
| C-5 53A80L7 Shellac Blend | 0.052 | 0.00419 | 11.50 | 26.93 | 17.1 |

It can be seen that the experimental wheels displayed the lowest wheel wear rate and the lowest vibration amplitude values. The comparative, commercial wheels made with phenolic resin bonds (38A80-G8 B24, -K8 B24 and -O8 B24) had low wheel wear rates, but had unacceptably high vibration amplitude values. These wheels would be predicted to create vibration chatter in an actual roll grinding operation. The comparative wheels made with shellac resin bonds (53A80J7 Shellac Blend and 53A80L7 Shellac Blend), had high wheel wear rates but acceptably low vibration amplitude values. The experimental wheels were superior to all comparative wheels over a range of power levels (nearly constant vibration amplitude at 10-23 hp and consistently lower WWR) and the experimental wheels displayed superior G-ratios (material removal rate/wheel wear rate), evidencing excellent efficiency and wheel life.

It is believed that the relatively low elastic modulus and relatively high porosity of the experimental wheels creates a chatter resistant wheel without sacrifice of wheel life and grinding efficiency. Quite unexpectedly, the experimental wheels were observed to grind more efficiently than wheels containing higher volume percentages of grain and having a harder wheel grade. Although the experimental wheels were constructed to yield a relatively soft grade of hardness (i.e., grade A-E on the Norton Company grinding wheel hardness scale), they ground more aggressively, with less wheel wear, yielding a higher G-ratio than the comparative wheels having a significantly harder grade value (i.e., grades G-O on the Norton Company grinding wheel hardness scale). These results were significant and unexpected.

EXAMPLE 4

Experimental wheels containing agglomerated grain were prepared in a commercial manufacturing operation and tested in a commercial roll grinding operation where shellac bonded wheels have been used in the past.

Abrasive Grain/Inorganic Binding Material Agglomerates

Vitrified binding materials (A Binding Material from Table 1-2) were used to make agglomerated abrasive grain sample AV4. Sample AV4 was similar to sample AV2, except that a commercial batch size was manufactured for sample AV4. The agglomerates were prepared according to the rotary calcination method described in Example 1. The abrasive grain was a fused alumina 38A abrasive grain, 80 grit size, obtained from Saint-Gobain Ceramics & Plastics, Inc., Worcester, Mass., USA, and 3 wt. % A Binding material (Table 1-2) was used. The calciner temperature was set at 1250° C., the tube angle was 2.5 degrees and the rotation speed was 5 rpm. The agglomerates were treated with 2% silane solution (obtained from Crompton Corporation, South Charleston, W. Va.).

Abrasive Wheels

Agglomerate sample AV4 was used to make grinding wheels (finished size 36" diameter ×4" width ×20" center hole (type 1) (91.4×10.2×50.8 cm). The experimental abrasive wheels were made with commercial manufacturing equipment by mixing the agglomerates with liquid phenolic resin (V-1181 resin from Honeywell International Inc., Friction Division, Troy N.Y.) (22 wt % of resin mixture) and powdered phenolic resin (Durez Varcum® resin 29-717 obtained from Durez Corporation, Dallas Tex.) (78 wt % of resin mixture). The weight percent quantities of abrasive agglomerate and resin bond used in these wheels are listed in Table 4-1, below. The materials were blended for a sufficient period of time to get a uniform blend. The uniform agglomerate and bond mixture was placed into molds and pressure was applied to form green stage (uncured) wheels. These green wheels were removed from the molds, wrapped in coated paper and cured by heating to a maximum temperature of 160° C., graded, finished, and inspected according to commercial grinding wheel manufacturing techniques known in the art. Finished wheel elastic modulus and fired density were measured and results are shown in Table 4-1, below. Wheel burst speed was measured and the maximum operational speed was determined to be 9500 sfpm.

The composition of the wheels (including volume % abrasive, bond and porosity in the cured wheels) are described in Table 4-1. These wheels had a visibly open, continuous, relatively uniform, porosity structure unknown in organic bonded grinding wheels previously made in a commercial operation.

TABLE 4-1

| Wheel Sample (Agglomerate) Grade, Structure Experimental Wheels | Elastic Modulus G-pascal | Cured Density g/cc | Wheel Composition Volume % | | | Weight % Agglomerate | Weight % Bond |
|---|---|---|---|---|---|---|---|
| | | | Abrasive Grain | Bond Total[a] (organic) | Porosity | | |
| 2-1 (AV4) B14 | 4.7 | 1.596 | 36 | 14 (12.4) | 50 | 90.2 | 9.8 |
| 2-2 (AV4) C14 | 5.3 | 1.626 | 36 | 16 (14.4) | 48 | 88.8 | 11.2 |
| 2-3 (AV4) D14 | 5.7 | 1.646 | 36 | 18 (16.4) | 46 | 87.4 | 12.6 |

[a]The "Total" volume % of bond is the sum of the amount of vitrified binder material used to agglomerate the grain and the amount of organic resin bond used to make the grinding wheel. The "(organic)" volume % of bond is the portion of the Total volume % bond consisting of the organic resin added to the agglomerates to make the grinding wheel.

Grinding Tests

These experimental abrasive wheels were tested in two commercial grinding operations for the finishing of cold mill rolls. After being ground, these forged steel rolls will be used to roll and finish the surface of sheets of metal (e.g., steel). Commercial operations traditionally use shellac bonded commercial wheels (80 grit alumina abrasive grain is common) and these wheels normally are operated at 6500 sfpm, with a maximum speed of about 8000 sfpm. Grinding conditions are listed below and test results are shown in Tables 4-2 and 4-3.

Grinding Conditions A:
Grinding machine: Farrell Roll Grinder, 40 hp
Coolant: Stuart Synthetic w/water
Wheel speed: 780 rpm
Workpiece: Forged steel, tandem mill work rolls, hardness 842 Equotip, 82×25 inches (208×64 cm)
Workpiece (Roll) speed: 32 rpm
Traverse: 100 inch/min.
Continuous feed: 0.0009 inch/min.
End feed: 0.0008 inch/min.
Surface finish required: 18-30 Ra roughness, 160 peaks maximum Grinding Conditions B:
Grinding machine: Pomini Roll Grinder, 150 hp
Coolant: Stuart Synthetic w/water
Wheel Speed: 880 rpm
Workpiece: Forged steel, tandem mill work rolls, hardness 842 Equotip, 82×25 inches (208×64 cm)
Workpiece (Roll) speed: 32 rpm
Traverse: 100 inch/min.

Continuous feed: 0.00011 inch/min.
End feed: 0.002 inch/min.
Surface finish required: 18-30 Ra roughness, approx. 160-180 peaks

TABLE 4-2

Grinding Test Results/Grinding Conditions A

| Sample Test Parameter | Change in Diameter Inches | G-ratio | Wheel RPMs | Wheel Amps | # of grinding Passes | Roll Roughness Ra | # of Peaks on Roll |
|---|---|---|---|---|---|---|---|
| Experimental Wheel 2-1 | | | | | | | |
| Wheel Wear Material Removed | 0.12 0.007 | 0.860 | 780 | 75 | 10 | 28 | 171 |
| Experimental Wheel 2-2 | | | | | | | |
| Wheel Wear Material Removed | 0.098 0.0075 | 1.120 | 780 | 90-100 | 10 | 22 | 130 |
| Experimental Wheel 2-3 | | | | | | | |
| Wheel Wear Material Removed | 0.096 0.0105 | 1.603 | 780 | 120-150 | 10 | 23 | 144 |

Under grinding conditions A, the experimental grinding wheels displayed excellent grinding performance, achieving significantly higher G-ratios than observed in past commercial operations under these grinding conditions with shellac bonded wheels. Based on past experience in roll grinding under grinding conditions A, experimental wheels 2-1, 2-2 and 2-3 would have been considered too soft (at Norton Company hardness grade values of B-D) to yield commercially acceptable grinding efficiency, thus these results showing excellent G-ratios were highly unusual. Moreover, roll surface finish was free of chatter marks and within the specifications for surface roughness (18-30 Ra) and number of surface peaks (approx. 160). The experimental wheels delivered a surface finish quality previously observed only with shellac bonded wheels.

A second grinding test of experimental wheel 3-3, under grinding conditions B, confirmed the surprising benefits of using the wheels of the invention in a commercial finishing roll cold grinding operation over an extended test period. Test results are shown below in Table 4-3.

TABLE 4-3

Grinding Test Results/Grinding Conditions B

| Experimental Wheel 2-4 | Change in Diameter inches | Wheel Speed sfpm | Wheel Amps | Continuous Feed inches/min. | End Feed inches | Roll Roughness Ra | # of Peaks On Roll |
|---|---|---|---|---|---|---|---|
| Roll 1 | | | | | | | |
| WW[a] MR[b] | 0.258 0.028 | 5667 | 90 | 0.0009 | 0.0008 | 24 | 166 |
| Roll 2 | | | | | | | |
| WW MR | 0.339 0.032 | 8270 | 105 | 0.0016 | 0.002 | 20 | 136 |
| Roll 3 | | | | | | | |
| WW MR | 0.165 0.03 | 8300 | 110 | 0.0011 | 0.002 | 28 | 187 |
| Roll 4 | | | | | | | |
| WW MR | 0.279 0.036 | 8300 | 115 | 0.0011 | 0.002 | 29 | 179 |
| Roll 5 | | | | | | | |
| WW MR | 0.098 0.018 | 8300 | 115 | 0.0011 | 0.002 | 25 | 151 |

TABLE 4-3-continued

Grinding Test Results/Grinding Conditions B

| Experimental Wheel 2-4 | Change in Diameter inches | Wheel Speed sfpm | Wheel Amps | Continuous Feed inches/min. | End Feed inches | Roll Roughness Ra | # of Peaks On Roll |
|---|---|---|---|---|---|---|---|
| Roll 6 | | | | | | | |
| WW | 0.097 | 8300 | 115 | 0.0011 | 0.002 | | |
| MR | 0.016 | | | | | | |
| Roll 7 | | | | | | | |
| WW | 0.072 | 8300 | 115 | 0.0011 | 0.002 | | |
| MR | 0.048 | | | | | | |
| Roll 8 | | | | | | | |
| WW | 0.094 | 8300 | 115 | 0.0011 | 0.002 | | |
| MR | 0.011 | | | | | | |
| Roll 9 | | | | | | | |
| WW | 0.045 | 8300 | 115 | 0.0011 | 0.002 | | |
| MR | 0.021 | | | | | | |
| Roll 10 | | | | | | | |
| WW | 0.128 | 8300 | 115 | 0.0011 | 0.002 | | |
| MR | 0.017 | | | | | | |
| Roll 11 | | | | | | | |
| WW | 0.214 | 8300 | 115 | 0.0011 | 0.002 | | |
| MR | 0.018 | | | | | | |
| Roll 12 | | | | | | | |
| WW | 0.12 | 8300 | 115 | 0.0011 | 0.002 | | |
| MR | 0.018 | | | | | | |
| Roll 13 | | | | | | | |
| WW | 0.118 | 8300 | 115 | 0.0011 | 0.002 | | |
| MR | 0.026 | | | | | | |
| Roll 14 | | | | | | | |
| WW | 1.233 | 8300 | 115 | 0.0011 | 0.002 | | |
| MR | 0.03 | | | | | | |
| Roll 15 | | | | | | | |
| WW | 0.215 | 8300 | 115 | 0.0011 | 0.002 | | |
| MR | 0.03 | | | | | | |
| Roll 16 | | | | | | | |
| WW | 0.116 | 8300 | 115 | 0.0011 | 0.002 | xxx | xxx |
| MR | 0.018 | | | | | | |
| Roll 17 | | | | | | | |
| WW | 0.141 | 8300 | 115 | 0.0011 | 0.002 | xxx | xxx |
| MR | 0.021 | | | | | | |
| Roll 18 | | | | | | | |
| WW | 0.116 | 8300 | 115 | 0.0011 | 0.002 | xxx | xxx |
| MR | 0.01 | | | | | | |
| Roll 19 | | | | | | | |
| WW | 0.118 | 8300 | 115 | 0.0011 | 0.002 | | |
| MR | 0.018 | | | | | | |

[a]Wheel Wear measurement.
[b]Material Removed measurement.

The cumulative G-ratio for experimental wheel 2-4 was 2.093 after grinding 19 rolls and undergoing wear of approximately three inches from the wheel diameter. This G-ratio represents an improvement of 2 to 3 times the G-ratios observed for commercial grinding wheels (e.g., the shellac bonded wheels, C-6 and C-7 described in Example 2) used to grind rolls under Grinding Conditions A or B. The wheel rotational speed and rate of material removal exceeded that of comparative commercial wheels used in this roll grinding operation, thus further demonstrating the unexpected grinding efficiency possible with the grinding method of the invention. Roll surface finish achieved by the experimental wheel was acceptable under commercial production standards. Cumulative results observed after grinding 19 rolls confirm the steady state operation of the experimental wheel and the beneficial resistance of the wheel to development of wheel lobes, vibration and chatter as the wheel is consumed by the grinding operation.

EXAMPLE 5

Abrasive Grain/Inorganic Binder Agglomerates

The agglomerate samples were made from a simple mixture of abrasive grain, binding material and water mixtures described in Table 5-1. The vitrified binding material composition used to prepare the samples was binding material C listed in Table 1-2. The abrasive grain was a fused alumina 38A abrasive grain, 80 grit size, obtained from Saint-Gobain Ceramics & Plastics, Inc., Worcester, Mass., USA.

Agglomerated abrasive grain samples were formed at 1,150° C., utilizing a rotary calcination apparatus (model #HOU-6D60-RTA-28, Harper International, Buffalo, N.Y.), equipped with a 120 inch (305 cm) long, 5.75 inch (15.6 cm) inner diameter, 3/8 inch (0.95 cm) thick, metal tube (Hastelloy), having a 60 inch (152 cm) heated length with three temperature control zones. A Brabender® feeder unit with adjustable control volumetric feed-rate was used to meter the abrasive grain and binding material mixture into the heating tube of the rotary calcination apparatus. The process of agglomeration was carried under atmospheric conditions, with an apparatus tube rotation rate of 3.5 to 4 rpm, a tube incline angle of 2.5 to 3 degrees, and a material feedrate of 6-10 kg/hour.

After agglomeration in the rotary calcination apparatus, the agglomerated abrasive grain samples were screened and tested for loose packing density (LPD) and size distribution. These results are shown in Table 5-1.

Agglomerated grain sample V1 was used to make grinding wheels (type 1) (finished size: 20×1×8 inch) (50.8×2.54× 20.3 cm). The composition of the wheels (including volume % abrasive, bond and porosity in the fired wheels), density, and mechanical properties of the wheels are described in Table 5-2. Compositions for experimental wheels 1 to 4 were selected to yield hardness grade F wheels and compositions for experimental wheels 5 to 8 were selected to yield hardness grade G wheels.

To make the abrasive wheels, the agglomerates were added to a mixer along with a liquid binder and a powdered vitrified bond composition corresponding to Binding material C from Table 1-2. The structures of the agglomerates were sufficiently resistant to compaction to retain an effective amount of agglomerates having a three dimensional character after being subjected to abrasive wheel mixing and molding operations. The wheels were then molded, dried, fired to a maximum temperature of 900° C., graded, finished, balanced and inspected according to commercial grinding wheel manufacturing techniques known in the art.

The finished wheels were safety tested according to a commercially practiced speed test to insure the wheels had sufficient mechanical strength for rotational movement when mounted on a grinding machine and sufficient mechanical strength for the grinding operation. All experimental wheels survived the maximum speed test for the testing equipment (85.1 m/s) and, thus, had sufficient mechanical strength for creep feed grinding operations.

The composition of the wheels (including volume % abrasive, bond and porosity in the fired wheels), density and mechanical properties of the wheels are described in Table 5-2.

TABLE 5-1

Agglomerated Granule V1 Characteristics

| Sample No. grain liquid binding material | Weight lbs (Kg) of mix | Binding material Weight % (on grain basis) | Volume % of binding material[a] | LPD −12/pan g/cc | Average size Microns (mesh size) | Yield (−20/+50) % | Average relative density % |
|---|---|---|---|---|---|---|---|
| V1 80 grit 38A water C binding material | 93.9 (42.6) 2.8 (1.3) 3.3 (1.5) | 3.0 | 4.77 | 1.09 | 425 (−35/+40) | 85 | 28.3 |

[a]The volume % binding material is a percentage of the solid material within the granule (i.e., binding material and grain) after firing, and does not include the volume % porosity.

TABLE 5-2

Abrasive Wheel Characteristics

| | Wheel Composition Volume % | | | | Fired Density g/cc | Mod. of Elasticity (GPa) | Mod. of Rupture[c] (MPa) | Speed test[d] (m/s) |
|---|---|---|---|---|---|---|---|---|
| | Agglomerates | Abrasives | Bond[b] | Porosity | | | | |
| Wheel V1 | | | | | | | | |
| (1) | 42.5 | 40.5 | 6.2 | 53.3 | 1.67 | 13.3 | 22.6 | 85.1 |
| (2) | 40.4 | 38.5 | 6.5 | 55.0 | 1.61 | 11.6 | 18.5 | 85.1 |
| (3) | 40.4 | 38.5 | 7.2 | 54.3 | 1.64 | 12.4 | 23.0 | 85.1 |
| (4) | 39.4 | 37.5 | 8.2 | 54.3 | 1.63 | 12.8 | 22.8 | 85.1 |
| (5) | 42.5 | 40.5 | 7.3 | 52.2 | 1.68 | 14.3 | 25.8 | 85.1 |

TABLE 5-2-continued

Abrasive Wheel Characteristics

| | Wheel Composition Volume % | | | | Fired Density | Mod. of Elasticity | Mod. of Rupture[c] | Speed test[d] |
|---|---|---|---|---|---|---|---|---|
| | Agglomerates | Abrasives | Bond[b] | Porosity | g/cc | (GPa) | (MPa) | (m/s) |
| (6) | 40.4 | 38.5 | 9.3 | 52.2 | 1.68 | 15.8 | 26.7 | 85.1 |
| (7) | 40.4 | 38.5 | 8.3 | 53.2 | 1.65 | 13.5 | 25.5 | 85.1 |
| (8) | 39.4 | 37.5 | 9.3 | 53.2 | 1.65 | 14.6 | 24.0 | 85.1 |
| Comparative samples[a] non-agglomerated grain | | | | | | | | |
| 38A80-F19VCF2 | N/A | 40.5 | 6.2 | 53.3 | 1.73 | 20.3 | 24.4 | 69.4 |
| 38A80-G19VCF2 | N/A | 40.5 | 7.3 | 52.2 | 1.88 | 29.2 | 26.6 | 69.4 |

[a]Comparative wheel samples were commercial products obtained from Saint-Gobain Abrasives, Inc., Worcester, MA, and marked with the commercial wheel designations indicated for each in Table 5-2.
[b]Values for volume % bond of the experimental wheels include the volume % vitrified binding material used on the grains to make the agglomerates.
[c]The wheels were tested for modulus of rupture on an Instron Model 1125 mechanical testing machine with a 4-point bending jig with a support span of 3", a load span of 1", and at a loading rate of 0.050" per minute cross head speed.
[d]Wheels did not break down when rotated at the maximum speed achieved with the burst test machine.

The elastic modulus values of the experimental wheels 1-4 ranged from 34 to 43% lower than the value for the F grade comparative wheel, and the elastic modulus values of the experimental wheels 5-8 ranged from 45 to 54% lower than the value for the G grade comparative wheel. Wheels having identical volume % compositions of grain, bond and porosity quite unexpectedly had significantly different elastic modulus values. Experimental wheel 1 had an elastic modulus value 34% lower than the value for the F grade comparative wheel, and experimental wheel 5 had an elastic modulus value 51% lower than the value for the G grade comparative wheel. In a separate experiment, comparative wheels made at softer grades so as to be characterized by equivalent, relatively low elastic modulus values lacked sufficient mechanical strength to pass the 85.1 m/s speed test.

The speed test values for the experimental wheels were fully acceptable. Furthermore, at identical volume % compositions of grain, bond and porosity, experimental wheel 1 exhibited a modulus of rupture only 7% lower than that of the F grade comparative wheel, while experimental wheel 5 exhibited a modulus of rupture only 3% lower than that of the G grade comparative wheel. This slight drop in modulus of rupture was expected, given the slight drop in density of the experimental wheels relative to the comparative wheels. The drop in density also suggests that the experimental wheels had resisted shrinkage during thermal processing, relative to the comparative wheels having an identical volume % composition, and this represents significant potential savings in manufacturing costs, both in material costs and in finishing operations.

The wheels were tested in a creep feed grinding operation against comparative commercial wheels recommended for use in creep feed grinding operations. The comparative wheels had the same size dimensions, identical or similar volume % compositions, equivalent hardness grades (grade was determined on the basis of volume % contents of grain, bond and porosity) and functionally equivalent bond chemistries, and they were otherwise suitable comparative wheels for a creepfeed grinding study. But, the comparative wheels were made without agglomerated grain and sacrificial pore inducers were needed to achieve the intended volume % porosity and wheel density. The commercial wheel designations and the compositions of the comparative wheels are described in Table 5-2 (commercial wheels 38A80F19VCF2 and 38A80G19VCF2).

A 'wedge' grinding test was performed, the workpiece being inclined at a small angle relative to the machine slide upon which it is mounted. This geometry results in increasing depth of cut, increasing material removal rate and increasing chip thickness as the grind progresses from start to finish. Thus, grinding data is gathered over a range of conditions in a single run. The evaluation of wheel performance in the wedge test is further aided through the measurement and recordal of spindle power and grinding forces. The precise determination of conditions (MRR, chip thickness, etc.) that produce unacceptable results, such as grinding burn or wheel breakdown, facilitates the characterization of wheel behavior and the ranking of relative product performance.

Grinding Conditions:
Machine: Hauni-Blohm Profimat 410
Mode: Wedge creepfeed grind
Wheel speed: 5500 surface feet per minute (28 m/sec)
Table speed: Varied from 5 to 17.5inches/minute (12.7-44.4 cm/minute)
Coolant: Master Chemical Trim E210 200, at 10% concentration with deionized well water, 72 gal/min (272 L/min)
Workpiece material: Inconel 718 (42 HRc)
Dress mode: rotary diamond, continuous
Dress compensation: 20 micro-inch/rev (0.5 micrometer/rev)
Speed ratio: +0.8

In these grinding runs, the continuous increase of depth of cut provided a continuous increase in material removal rate over the block length (8 inches (20.3 cm)). Failure was denoted by workpiece burn, wheel breakdown, rough surface finish and/or loss of corner form. Wheel wear from grinding was less than the loss from continuous dressing compensation carried out during the grinding test. The specific grinding energy and the material removal rate at which failure occurred (maximum MRR) are noted in Table 5-3.

TABLE 5-3

Grinding Test Results

| Wheel | Wheel Composition Volume % | | | | Maximum MRR | Improvement | Specific Grinding Energy | Improvement | Average Surface Roughness |
|---|---|---|---|---|---|---|---|---|---|
| | Agglo. | Abrasives | Bond | Pores | mm³/s/mm | %[a] | J/mm³ | %[a] | um |
| (1) | 42.5 | 40.5 | 6.2 | 53.3 | 10.3 | 20 | 57.6 | −17 | 0.77 |
| (2) | 40.4 | 38.5 | 6.5 | 55.0 | 10.2 | 18 | 55.1 | −20 | 0.75 |
| (3) | 40.4 | 38.5 | 7.2 | 54.3 | 10.9 | 26 | 59.2 | −15 | 0.72 |
| (4) | 39.4 | 37.5 | 8.2 | 54.3 | 10.1 | 18 | 59.2 | −15 | 0.76 |
| (5) | 42.5 | 40.5 | 7.3 | 52.2 | 10.4 | 58 | 60.5 | −23 | 0.77 |
| (6) | 40.4 | 38.5 | 9.3 | 52.2 | 9.4 | 42 | 65.2 | −17 | 0.77 |
| (7) | 40.4 | 38.5 | 8.3 | 53.2 | 9.5 | 44 | 63.4 | −19 | 0.75 |
| (8) | 39.4 | 37.5 | 9.3 | 53.2 | 9.2 | 39 | 64.4 | −18 | 0.77 |

| Comparative samples non-agglomerated grain | Wheel Composition Volume % | | | | Maximum MRR | | Specific Grinding Energy | | Average Surface Roughness |
|---|---|---|---|---|---|---|---|---|---|
| | Agglo. | Abrasives | Bond | Pores | mm³/s/mm | | J/mm³ | | um |
| 38A80-F19VCF2 | N/A | 40.5 | 6.2 | 53.3 | 8.6 | N/A | 69.6 | N/A | 0.79 |
| 38A80-G19VCF2 | N/A | 40.5 | 7.3 | 52.2 | 6.6 | N/A | 78.2 | N/A | 0.76 |

[a]To calculate percent improvement values, experimental wheels were compared to the nearest equivalent grade in a comparative wheel. Experimental wheels 1-4 were compared to the F grade wheel; and experimental wheels 5-8 were compared to the G grade wheel.

As can be seen from the grinding test results in Table 5-3, before failure occurred, the experimental wheels exhibit from 20 to 58% higher MRR values relative to those of comparative wheels having identical volume % compositions. At identical compositions, experimental wheels exhibited at least a 17% reduction in power needed to grind (specific grinding energy). These grinding operation efficiencies were achieved without any significant loss of surface quality of the workpiece being ground. The result suggest the experimental wheels could be operated in commercial creep feed grinding operations at a lower dressing rate with a constant MRR thereby achieving at least a doubling of wheel life.

EXAMPLE 6

Abrasive Grain/Inorganic Binder Agglomerates

The agglomerated grain samples were made from a simple mixture of the abrasive grain, binding material and water described in Table 6-1. The vitrified bond binding material compositions used to prepare the samples was binding material C listed in Table 1-2. The abrasive grain was a fused alumina 38A abrasive grain, 60 grit size, obtained from Saint-Gobain Ceramics & Plastics, Inc., Worcester, Mass., USA.

Agglomerated abrasive grain samples were prepared in an industrial rotary calcination apparatus (manufactured by Bartlett Inc. Stow, Ohio; direct fire gas model) at 1,250° C. maximum temperature, equipped with a 35 ft (10.7 m) long, 31 inch (0.78 m) inner diameter refractory tube, 23 inch (0.58 m) thick. The process of agglomeration was carried out under atmospheric conditions, at a hot zone temperature control set point of 1,250° C., with an apparatus tube rotation rate of 2.5 rpm, a tube incline angle of 3 degrees, and a material feedrate of 450 kg/hour.

After agglomeration in the rotary calcination apparatus, the agglomerated abrasive grain samples were screened and tested for loose packing density (LPD) and size distribution. These results are shown in Table 6-1.

TABLE 6-1

Agglomerated Granule V2 Characteristics

| Sample No. grain liquid binding material | Weight lbs (Kg) of mix | Binding material Weight % (on grain basis) | Volume % of binding material[a] | LPD −12/pan g/cc | Average size Microns (mesh size) | Yield (−20/+45) % | Average relative density % |
|---|---|---|---|---|---|---|---|
| V2 60 grit 38A water | 92.9 (42.1) 2.8 (1.3) | 4.2 | 6.7 | 1.39 | 520 (−30/+35) | 84 | 36.4 |

TABLE 6-1-continued

Agglomerated Granule V2 Characteristics

| Sample No. grain liquid binding material | Weight lbs (Kg) of mix | Binding material Weight % (on grain basis) | Volume % of binding material[a] | LPD −12/pan g/cc | Average size Microns (mesh size) | Yield (−20/+45) % | Average relative density % |
|---|---|---|---|---|---|---|---|
| C binding material | 4.3 (2) | | | | | | |

[a]The volume % binding material is a percentage of the solid material within the granule (i.e., binding material and grain) after firing, and does not include the volume % porosity.

Agglomerate samples were used to make grinding wheels (type 1) (finished size: 20×1×8 inch) (50.8×2.54×20.3 cm). To make the abrasive wheels, the agglomerates were added to a mixer along with a liquid binder and a powdered vitrified bond composition corresponding to Binding material C from Table 1-2. The structures of the agglomerates were sufficiently resistant to compaction to retain an effective amount of agglomerates having a three dimensional character after being subjected to abrasive wheel mixing and molding operations. Compositions for experimental wheels 9 to 11 were selected to yield hardness grade I wheels, compositions for experimental wheels 12 to 16 were selected to yield hardness grade K wheels and compositions for experimental wheels 17 to 19 were selected to yield hardness grade J wheels. The wheels were then molded, dried, fired to a maximum temperature of 1030° C., graded, finished, balanced and inspected according to commercial grinding wheel manufacturing techniques known in the art.

The finished wheels were safety tested according to a commercially practiced speed test to insure the wheels had sufficient mechanical strength for rotational movement when mounted on a grinding machine and sufficient mechanical strength for the grinding operation. Results of the burst test are given in Table 6-2. All experimental wheels had sufficient mechanical strength for creepfeed grinding operations. Commercial creep feed grinding operations traditionally operate these grinding wheels at 6500 sfpm (33m/s) with a maximum operating speed of about 8500 sfpm (43.2m/s) The composition of the wheels (including volume % abrasive, bond and porosity in the fired wheels), density, and material properties of the wheels are described in Table 6-2.

TABLE 6-2

Abrasive Wheel Characteristics

| Wheel (V2 agglomerate) | Wheel Composition Volume % | | | | Fired Density g/cc | Mod. of Elasticity (GPa) | Mod. of Rupture (MPa) | Actual Burst Speed (m/s) |
|---|---|---|---|---|---|---|---|---|
| | Agglo. | Abr. | Bond[b] | Porosity | | | | |
| (9) | 36.5 | 34.1 | 7.5 | 58.4 | 1.53 | 8.1 | 9.6 | 66.5 |
| (10) | 34.4 | 32.1 | 10.5 | 57.4 | 1.59 | 12.7 | | 76.6 |
| (11) | 36.5 | 34.1 | 8.5 | 57.4 | 1.56 | 10.1 | | 78.6 |
| (12) | 41.2 | 38.4 | 7.7 | 53.9 | 1.69 | 13.6 | 12.1 | 76.4 |
| (13) | 39.0 | 36.4 | 9.7 | 53.9 | 1.68 | 15.2 | | 80.8 |
| (14) | 39.0 | 36.4 | 8.7 | 54.9 | 1.63 | 13.0 | | 80.2 |
| (15) | 37.9 | 35.4 | 9.7 | 54.9 | 1.64 | 13.6 | | 78.9 |
| (16) | 39.0 | 36.4 | 10.7 | 52.9 | 1.69 | 16.4 | | 88.6 |
| (17) | 44.2 | 41.2 | 5.6 | 53.2 | 1.74 | 13.2 | 12.2 | 61.3 |
| (18) | 42.1 | 39.2 | 6.6 | 54.2 | 1.69 | 12.9 | | 77.1 |
| (19) | 42.1 | 39.2 | 8.6 | 52.2 | 1.79 | 17.9 | | 83.5 |

| Comparative samples[a] non-agglomerated grain | Wheel Composition Volume % | | | | Fired Density g/cc | Mod. of Elasticity (GPa) | Mod. of Rupture (MPa) | Actual Burst Speed (m/s) |
|---|---|---|---|---|---|---|---|---|
| | Agglom. | Abrasives | Bond | Porosity | | | | |
| 38A60-I96 LCNN | N/A | 34.1 | 7.5 | 58.4 | 1.58 | 18.1 | 10.25 | 69.4 |
| 38A60-K75 LCNN | N/A | 38.4 | 7.7 | 53.9 | 1.75 | 23.5 | N/A | 73.2 |
| 38A60-J64 LCNN | N/A | 41.2 | 5.6 | 53.2 | 1.78 | 23 | N/A | 73.6 |

TABLE 6-2-continued

Abrasive Wheel Characteristics

| | | | | | | | | |
|---|---|---|---|---|---|---|---|---|
| TG2-80 E13 VCF5[c] | N/A | 38.0 | 6.4 | 55.6 | 1.68 | 23.3 | 23.0 | N/A |

[a]Comparative wheel samples were commercial products obtained from Saint-Gobain Abrasives, Ltd., Stafford, UK, and marked with the wheel designations indicated for each in Table 6-2.
[b]Values for volume % bond of the experimental wheels include the volume % vitrified binding material used on the grains to make the agglomerates.
[c]This wheel resembles comparative wheel 38A60-K75 LCNN in volume % composition, but has been made with an elongated, sintered sol gel, alpha-alumina abrasive grain having an aspect ratio greater than 4:1, according to US-A-5,738,696 and US-A-5,738,697 to Wu. Note that it has lower density, but exhibits a very similar elastic modulus value relative to 38A60K75 LCNN.

Wheels having identical volume % compositions of grain, bond and porosity quite unexpectedly had significantly different elastic modulus values. Notably, the elastic modulus value of a comparative wheel (TG2-80 E13 VCF5) made to the desired relatively high volume % porosity and relatively low density by means of added elongated particles (abrasive grain) rather than with sacrificial pore inducers, did not display a drop in elastic modulus value. In fact, the elastic modulus value was higher than the nearest equivalent comparative wheel and much higher than the experimental wheels having equivalent volume % compositions.

In spite of the lowered elastic modulus properties, the speed test values for the experimental wheels were fully acceptable. At identical volume % compositions of grain, bond and porosity, experimental wheel 1 exhibited only slightly lower modulus of rupture and burst speed values. The densities of the experimental wheels were slightly lower than those of comparative wheels that had been formulated at an identical volume % composition. Thus, a small drop in modulus of rupture was expected. The drop in density also suggests the experimental wheels had resisted shrinkage during thermal processing relative to the comparative wheels having an identical volume % composition, and this represents significant potential savings in manufacturing costs, both in material costs and in finishing operations.

The wheels were tested in a creep feed grinding operation using the wedge test grinding conditions described in Example 5. The wheels were tested against comparative commercial wheels recommended for use in creep feed grinding operations. The comparative wheels had the same size dimensions, identical or similar volume % compositions, equivalent hardness grades (grade was determined on the basis of volume % contents of grain, bond and porosity) and functionally equivalent bond chemistries, and they were otherwise suitable comparative wheels for a creep feed grinding study. But, the comparative wheels were made without agglomerated grain and sacrificial pore inducers were used to achieve the intended volume % porosity and wheel density. The commercial wheel designations and the compositions of the comparative wheels are described in Table 6-2 (commercial wheels 38A60-I96 LCNN, 38A60-K75 LCNN and 38A60-J64 LCNN). Results are given below in Table 6-3.

TABLE 6-3

Grinding Test Results

| Wheel V2 | Wheel Composition Volume % | | | | Maximum MRR mm³/s/mm | Improvement %[a] | Specific Grinding Energy J/mm³ | Improvement %[a] | Average Surface Roughness um |
|---|---|---|---|---|---|---|---|---|---|
| | Agglo. | Abrasives | Bond | Porosity | | | | | |
| (9) | 36.5 | 34.1 | 7.5 | 58.4 | 12.6 | 31 | 39.0 | −31 | N/A |
| (10) | 34.4 | 32.1 | 10.5 | 57.4 | 10.6 | 10 | 54.7 | −3 | N/A |
| (11) | 36.5 | 34.1 | 8.5 | 57.4 | 16.2 | 68 | 43.1 | −24 | N/A |
| (12) | 41.2 | 38.4 | 7.7 | 53.9 | 12.4 | 53 | 41.9 | −24 | 0.76 |
| (13) | 39.0 | 36.4 | 9.7 | 53.9 | 11.2 | 38 | 44.8 | −19 | 0.80 |
| (14) | 39.0 | 36.4 | 8.7 | 54.9 | 12.1 | 43 | 40.7 | −28 | 0.90 |
| (15) | 37.9 | 35.4 | 9.7 | 54.9 | 11.3 | 40 | 42.7 | −22 | 0.80 |
| (16) | 39.0 | 36.4 | 10.7 | 52.9 | 10.2 | 25 | 46.5 | −16 | 0.74 |
| (17) | 44.2 | 41.2 | 5.6 | 53.2 | 13.7 | 61 | 40.2 | −29 | N/A |
| (18) | 42.1 | 39.2 | 6.6 | 54.2 | 12.8 | 51 | 41.3 | −27 | N/A |
| (19) | 42.1 | 39.2 | 8.6 | 52.2 | 10.2 | 20 | 49.0 | −13 | N/A |

| Comparative samples non-agglomerated grain | Wheel Composition Volume % | | | | Maximum MRR mm³/s/mm | | Specific Grinding Energy J/mm³ | | Average Surface Roughness um |
|---|---|---|---|---|---|---|---|---|---|
| | Agglo. | Abrasives | Bond | Porosity | | | | | |
| 38A60-I96 LCNN | N/A | 34.1 | 7.5 | 58.4 | 9.7 | N/A | 56.5 | N/A | N/A |
| 38A60-K75 LCNN | N/A | 38.4 | 7.7 | 53.9 | 8.1 | N/A | 55.1 | N/A | 0.94 |

TABLE 6-3-continued

| | | | Grinding Test Results | | | | | |
|---|---|---|---|---|---|---|---|---|
| 38A60-J64 LCNN | N/A | 41.2 | 5.6 | 53.2 | 8.5 | N/A | 56.4 | N/A | N/A |

[a]To calculate percent improvement values, experimental wheels were compared to the nearest equivalent grade in a comparative wheel. Experimental wheels 9-11 were compared to the I grade wheel; experimental wheels 12-16 were compared to the K grade wheel; and experimental wheels 17-19 were compared to the J grade wheel.

As can be seen from the grinding test results in Table 6-3, the experimental wheels exhibited higher MRR (10 to 68%) before failure occurred, relative to comparative wheels having identical volume % compositions. At identical compositions, experimental wheels exhibited a reduction in power (3 to 31%) needed to grind (specific grinding energy). These grinding operation efficiencies were achieved without any significant loss of surface quality of the workpiece being ground. The results suggest the experimental wheels could be operated in commercial creep feed grinding operations at a lower dressing rate with a constant MRR thereby achieving at least a doubling of wheel life.

EXAMPLE 7

Abrasive Grain/Organic Binder Agglomerates

A series of agglomerated abrasive grain samples (A1-A8) were prepared from a mixture of abrasive grain and phenolic resin binding material (Durez Varcum® resin 29-717, specific gravity 1.28 g/cc, obtained from Durez Corporation, Dallas Tex.) in the quantities described in Table 7-1. All samples were prepared with silane-treated, fused alumina 38A abrasive grain obtained from Saint-Gobain Ceramics & Plastics, Inc., Worcester, Mass., USA, in the grit sizes (80 or 46 grit) listed in Table 7-1.

The grain and the resin binding material were placed into the bowl of a mixer (samples A5-A8 in a model number RV-02 high shear Erich Mixer manufactured by the Erich Company, Gurnee, Ill.; sample A1 in a pan mixer made by Foote-Jones/Illinois Gear in Chicago, Ill.; and samples A2, A3 and A4 in a pan mixer custom made by Boniface Tool and Die in Southbridge Mass.). Mixing was initiated at a bowl speed set at 64 rpm and a paddle speed set at 720 rpm (samples A5-A8 in the Eirich mixer); or a 35 rpm bowl speed and stationary paddle (sample A1 in the Foote/Jones mixer); or a 35 rpm bowl speed and 75 rpm paddle speed (samples A2-A4 in the Boniface mixer). While mixing, sufficient solvent (furfural) was sprayed in a mist onto the mixture of grain and the binding material in order to cause grains and binding material to agglomerate together. Solvent spraying onto the mixture was continued only until grains and binding material had formed agglomerates. In preparing sample A1, the solvent was hand sprayed onto the dry components with a plastic bottle. In preparing samples A2-A8, the solvent was sprayed onto the dry components as a continuous mist in measured quantities using a Tool Mist Coolant Generator, obtained from Wesco Company, Chatsworth, Calif. The process of agglomeration was carried out under atmospheric conditions, at room temperature.

After agglomeration in the mixer, the wet agglomerated abrasive grain samples were screened through a US sieve 3.5 mesh screen and dried overnight under ambient conditions. The samples were re-screened on a coarse sieve (U.S. standard sieve #8 screen for 46 grit agglomerates, #20 screen for 80 grit agglomerates) and spread in a single layer on a fluoropolymer lined baking tray (about 45×30 cm). Agglomerates were then cured in a laboratory oven (Despatch model number VRD-1-90-1E from Despatch Industries, Minneapolis Minn.) under atmospheric conditions, heated to a maximum temperature of 160° C., and held at that temperature for 30 minutes. The cured agglomerates were rolled under a 1.5 inch steel bar operated manually to partially crush and separate larger agglomerates into smaller agglomerates.

The cured agglomerates were sized with U.S. standard testing sieves mounted on a vibrating screening apparatus (Ro-Tap; Model RX-29; W.S. Tyler Inc. Mentor, Ohio). Screen mesh sizes ranged from 10 to 45 for agglomerates made with 46 grit and 20 to 45 for agglomerates made with 80 grit size abrasive grit.

The yield of usable free-flowing agglomerates of Samples A1-A8, defined as agglomerates having a size distribution of the indicated mesh size (U.S. Standard Sieve size) as a wt % of the total weight of the grain mixture before agglomeration is show below in Table 7-1.

Agglomerates were tested for loose packing density (LPD), relative density and size distribution and they were visually characterized, before and after being used to make abrasive grinding tools. The loose packed density of the cured agglomerates (LPD) was measured by the American National Standard procedure for Bulk Density of Abrasive Grains. The initial average relative density, expressed as a percentage, was calculated by dividing the LPD ($\rho$) by a theoretical density of the agglomerates ($\rho_o$), assuming zero porosity. The theoretical density was calculated according to the volumetric rule of mixtures method from the weight percentage and specific gravity of the binding material and of the abrasive grain contained in the agglomerates.

These agglomerates had LPD, relative density and size distribution characteristics suitable for use in the commercial manufacture of abrasive grinding wheels. The results of agglomerate tests are shown in Table 7-1.

The finished, cured agglomerates had three-dimensional shapes varying among triangular, spherical, cubic, rectangular, cylindrical, and other geometric shapes. Agglomerates consisted of a plurality of individual abrasive grits (e.g., 2 to 40 grits) bonded together by resin binding material at grit to grit contact points. Based upon material density and volumetric calculations, the porosity of the agglomerates in bulk was about 18 volume %. The structures of the agglomerates were sufficiently resistant to compaction to retain an effective amount of agglomerates retaining a initial three dimensional character after being subjected to abrasive wheel mixing and molding operations.

TABLE 7-1

Agglomerated Granule Characteristics

| Sample No. Mix: grain, solvent, binding material | Weight (kg) of mix | Weight % solvent in mix | Binding material Wt % (total solids basis) | Volume % binding material[a] | LPD g/cc −20/+45 mesh fraction | Average size microns (mesh) −25/+45 screen size | % Yield wt % (mesh size range) | Average % relative density |
|---|---|---|---|---|---|---|---|---|
| Example 1 A1 80 grit 38A, furfural, phenolic resin | 12 mixes @ 1 kg each | 3.5 | 10 | 25.5 | 1.11 | 500 (36) | 70 (−20 to +45) | 34 |
| A2 80 grit 38A, furfural phenolic resin | 5 kg | 2.5 | 10 | 25.5 | 1.17 | 500 (36) | 70 (−20 to +45) | 35.8 |
| A3 80 grit 38A, furfural, phenolic resin | 5 kg | 2.5 | 10 | 25.5 | 1.2 | 500 (36) | 70 (−20 to +45) | 36.7 |
| Example 2 A4 80 grit 38A, furfural, phenolic resin | 5 kg | 2.5 | 9.1 | 23.6 | 1.20 | 500 (36) | 70 (−20 to +45) | 36.1 |
| A5 80 grit 38A, furfural phenolic resin | 6 mixes @ 2.5 kg each | 2.0 | 10 | 25.5 | 0.97 | 500 (36) | 80 (−20 to +45) | 29.7 |
| Example 3 A6 80 grit 38A, furfural, phenolic resin | 25 mixes @ 5 kg each | 1.9 | 10 | 25.5 | 1.10 | 500 (36) | 80-85 (−20 to +45) | 33.7 |
| Example 4 A7 46 grit 38A, furfural, phenolic resin | 2.5 kg | 2.0 | 10 | 25.5 | 1.07 | 1400 (14) | 66 (−10 to +20) | 32.7 |
| A8 46 grit 38A, furfural phenolic resin | 2.5 kg | 2.0 | 10 | 25.5 | 0.94 | 1400 (14) | 64 (−10 to +20) or (−14 to +20) | 28.7 |
| Example 5 A9 80 grit 38A, furfural, binding material A | 2.5 kg | 2.0 | 10 | 25.5 | 1.09 | 500 (36) | >90 (−20 to +45) | 33.4 |
| A10 80 grit 38A, furfural binding material B | 2.54 kg | 2.0 | 11.3 | 25.5 | 1.10 | 500 (36) | >90 (−20 to +45) | 33.2 |
| A11 80 grit 38A, furfural binding material C | 2.57 kg | 1.9 | 12.6 | 25.5 | 1.15 | 500 (36) | >90 (−20 to +45) | 32.7 |
| A12 80 grit 38A, furfural binding material D | 2.61 kg | 1.5 | 13.8 | 25.5 | 1.10 | 500 (36) | >90 (−20 to +45) | 32.2 |

TABLE 7-1-continued

Agglomerated Granule Characteristics

| Sample No. Mix: grain, solvent, binding material | Weight (kg) of mix | Weight % solvent in mix | Binding material Wt % (total solids basis) | Volume % binding material[a] | LPD g/cc −20/+45 mesh fraction | Average size microns (mesh) −25/+45 screen size | % Yield wt % (mesh size range) | Average % relative density |
|---|---|---|---|---|---|---|---|---|
| A13 80 grit 38A, furfural binding material E | 2.65 kg | 1.5 | 15.0 | 25.5 | 1.08 | 500 (36) | >90 (−20 to +45) | 31.2 |

[a]The volume % binding material is a percentage of the solid material within the granule (i.e., binding material and grain) after curing, and does not include the volume % porosity.
The volume % binding material of the cured agglomerates was calculated by assuming no internal porosity and no mix losses.

Abrasive Wheels

Agglomerate samples A1, A2 and A3 were used to make Type 6 cup abrasive grinding wheels (finished size: 3.5× 3.75×0.88–0.50 inch rim) (8.9 ×9.5×2.2–1.3 cm rim). To make the experimental abrasive wheels, the agglomerates were mixed by hand in 250 gram batches with a phenolic resin bond composition until a uniform mixture was obtained. The resin bond composition was a mixture of 22 wt % liquid phenolic resin (V-1 181 from Honeywell International Inc., Friction Division, Troy N.Y.) and 78 wt % powdered phenolic resin (Durez Varcum® resin 29-717 from Durez Corporation, Dallas Tex.). The uniform agglomerate and bond mixture was placed into molds and pressure was applied to form green stage (uncured) wheels. These green wheels were removed from the molds, wrapped in coated paper and cured by heating to a maximum temperature of 160° C., graded, finished, and inspected according to commercial grinding wheel manufacturing techniques known in the art.

The finished wheels were safety tested according to a commercially practiced speed test to insure the wheels had sufficient mechanical strength for rotational movement when mounted on a grinding machine and sufficient mechanical strength for the grinding operation. All experimental wheels survived a 7200 rpm speed test and, thus, had sufficient mechanical strength for surface grinding operations.

The compositions of the wheels (including volume % abrasive, bond and porosity of the cured wheels) are described in Table 7-2.

TABLE 7-2

Abrasive Wheel Characteristics

| Experimental Wheel (agglomerate samples Ex. 7, Table 7-1) | Wheel Composition Volume % | | | Weight % | Weight | Wheel |
|---|---|---|---|---|---|---|
| | Abrasive[a] | Bond[b] | Porosity | Agglomerate | % Bond | Density g/cc |
| All are D grade | | | | | | |
| W1 (A1) | 30 | 24 | 46 | 88.3 | 11.7 | 1.492 |
| W2 (A2) | 30 | 24 | 46 | 88.3 | 11.7 | 1.492 |
| W3 (A3) | 30 | 24 | 46 | 88.3 | 11.7 | 1.492 |
| W4 (A4) | 34 | 20 | 46 | 93.3 | 6.7 | 1.599 |
| Comparative Sample No. (commercial designation)[c] | Grain vol % | Bond Vol % | Porosity vol % | Weight % Abrasive | Weight % Bond | |
| C1L 38A80-L9 B18 No agglomerate | 46 | 25 | 29 | 84.6 | 15.4 | 2.149 |

TABLE 7-2-continued

| Abrasive Wheel Characteristics | | | | | | |
|---|---|---|---|---|---|---|
| C1P 38A80-P9 B18 No agglomerate | 46 | 31 | 23 | 81.6 | 18.4 | 2.228 |

[a]At 46 vol. % abrasive grain, the comparative wheels contained a greater volume % abrasive grain (i.e., 12-16 volume % more) than the experimental wheels made with either 30 or 34 vol. % abrasive grain.
[b]Values for volume % bond of the experimental wheels include the volume % resin binding material used on the grains to make the agglomerates and the bond used to make the wheels. Based upon preliminary testing observations, the experimental wheels were formulated (volume percentage components) to a D grade of hardness on the Norton Company hardness grade scale for commercial wheels.
[c]Comparative wheel samples were commercial product formulations obtained from Saint-Gobain Abrasives, Inc., Worcester, MA, and sold under the alphanumeric wheel designations indicated for each in Table 7-2. The wheels contain phenolic resin bond, $CaF_2$ and hollow mullite spheres, 38A alumina abrasive grain and have a hardness grade (Norton Company hardness grade scale) of either L or P, as indicated.

These experimental wheels were tested in a surface grinding operation and found to be suitable for commercial use. Experimental wheels were tested against the comparative wheels described in Table 7-2 that are recommended for commercial use in surface grinding operations. The comparative wheels had the same size dimensions, same abrasive grain and bond types and were otherwise suitable comparative wheels for evaluating the experimental wheels in a surface grinding study, but they were made without agglomerated grain. Results of these grinding tests are shown in Table 7-3.

Grinding Test

The wheels of the invention and the comparative wheels were tested in a high contact area, surface grinding test designed to mimic commercial disc grinding operations. The following conditions were used.

Grinding Conditions:
Machine: Okuma GI-20N, OD/ID Grinder
Grinding Mode: Surface grind (face); Disc simulation test
Wheel speed: 6,000 rpm; 5,498 surface feet per minute (27.9 m/sec)
Work speed: 10 rpm; 20.9 sfpm/0.106 m/sec
Infeed rate: 0.0105 inch/min (0.0044 mm/s)/0.0210 inch (0.0089 mm/s)
Coolant: Trim VHPE210, 5% ratio with deionized well water
Workpiece material: 52100 Steel 8 inch OD (20.3 cm)×7 inch ID (17.8 cm)×0.50 inch (1.27 cm) rim, Rc-60 hardness
Dress: Cluster diamond; comp. 0.001 inch, 0.01 inch lead

TABLE 7-3

| | Grinding Test Results | | | | | | |
|---|---|---|---|---|---|---|---|
| Sample (Table 7-2) | Infeed mm/rev | WWR (mm³/s) | MRR (mm³/s) | Power W | G-ratio | G-ratio/ Abrasive Vol. Fraction[a] | Specific Energy J/mm³ |
| C1L | 0.0533 | 1.682 | 63.47 | 2160 | 37.7 | 82.0 | 34.03 |
|  | 0.0267 | 0.310 | 32.96 | 1440 | 106.5 | 231.5 | 43.69 |
| C1P |  |  |  |  |  |  |  |
| wheel C | 0.0533 | 0.606 | 65.93 | 2274 | 108.7 | 236.4 | 34.49 |
|  | 0.0267 | 0.133 | 33.43 | 2693 | 251.5 | 546.7 | 80.56 |
| wheel D | 0.0533 | 0.402 | 66.42 | 2713 | 165.1 | 358.8 | 40.84 |
|  | 0.0267 | 0.109 | 33.37 | 2474 | 305.5 | 664.1 | 74.13 |
| W1 | — | — | — | — | — | — | — |
|  | 0.0267 | 0.062 | 33.50 | 1975 | 54.2 | 1804 | 58.95 |
| W2 | 0.0533 | 0.231 | 66.73 | 2792 | 288.6 | 961.9 | 41.84 |
|  | 0.0267 | 0.061 | 33.48 | 2154 | 548.8 | 1829 | 64.35 |
| W3 | 0.0533 | 0.244 | 66.73 | 2892 | 273.5 | 911.7 | 43.34 |
|  | 0.0267 | 0.059 | 33.53 | 2194 | 566.6 | 1889 | 65.43 |
| W4 | 0.0267 | 0.116 | 33.43 | 1915 | 289.1 | 850.4 | 57.28 |

[a]The G-ratio/Abrasive volume % fraction is a measure of the grinding performance the grain in the wheel. The calculation normalizes the grinding performance to account for the significant differences in volume % abrasive grain among the experimental and comparative wheels. It can be readily seen that the abrasive grain in the experimental wheels delivers significantly better grinding efficiency on a volume fraction basis(i.e., less grain is needed to deliver the same level of grinding efficiency).

The results show the grinding wheels made according to the invention were resistant to wheel wear, yet capable of being operated at infeed rates and material removal rates (MRR) equivalent to the closest comparative grinding wheels, with either longer wheel lifetimes (WWR) at equivalent specific grinding energies or lower specific grinding energies at equivalent wheel life. The experimental wheel (W4) having a higher volume percent abrasive grain (34%) unexpectedly exhibited a higher rate of wheel wear than the other experimental wheels containing less abrasive grain (30%). At 0.0267 infeed, all experimental wheels exhibited lower specific energy at a given MRR than the comparative wheels. Since lower specific grinding energy correlates with lower burn potential, the wheels in the invention are anticipated to exhibit less workpiece burn than the comparative wheels. Moreover, relative to the comparative wheels, the experimental wheels delivered significantly better grinding efficiency on an abrasive grain volume fraction basis (i.e., less grain is needed to deliver the same level of grinding efficiency). This result defies the conventional wisdom in bonded abrasives technology that a higher grade wheel containing more grain will resist wear and deliver better wheel life and grinding efficiency than a lower (softer) grade wheel. Thus, the superior performance of the inventive wheels was significant and unexpected.

EXAMPLE 8

Abrasive Wheels

Agglomerate samples A4 and A5 were used to make Type 6 cup grinding wheels (finished size 5.0×2.0×0.625–1.5 inch rim (12.7×5.08×1.59–3.81 cm rim). The experimental abrasive wheels were made according to the method described in Example 7, above.

It was observed during the molding and pressing of green wheels using the agglomerates that some compression of the mix was necessary to arrive at a cured wheel having sufficient mechanical strength for use in surface grinding. If the mold was filled with the mix of bond and agglomerates, and essentially no compression occurred during molding such that the agglomerates retained their original LPD, then the resultant cured experimental wheels showed no benefit in grinding versus comparative wheels. However, if sufficient pressure was applied to the molded mix of agglomerates and bond to compress the mix volume by at least 8 volume %, then the wheels exhibited improved grinding performance in surface grinding tests. It was observed that compression volume values in the range of 8-35 volume % (based on the original LPD of the agglomerate and the volume of mix placed in the mold) produced operative wheels exhibiting the benefits of the invention. It was observed further that crushing from 8 to 15 volume % of the agglomerates did not change the grinding performance of the wheel made with such agglomerates.

The finished wheels were safety tested according to a commercially practiced speed test to insure the wheels had sufficient mechanical strength for rotational movement when mounted on a grinding machine and sufficient mechanical strength for the grinding operation. All experimental wheels survived a 6308 rpm speed test and, thus, had sufficient mechanical strength for surface grinding operations.

The composition of the wheels (including volume % abrasive, bond and porosity in the cured wheels) are described in Table 8-1.

TABLE 8-1

Abrasive Wheel Characteristics

| Wheel (agglomerate samples Ex. 2, Table 7-1) Grade Sample No. | Elastic Modulus GPa | Wheel Composition Volume % | | | Weight % Agglomerate | Weight % Bond | Air Permeability[d] | Wheel Density g/cc |
|---|---|---|---|---|---|---|---|---|
| | | Abrasive[a] | Bond[d] | Porosity | | | | |
| W5 (A4) D | 3.290 | 30 | 24 | 46 | 87.4 | 12.6 | 7.9 | 1.492 |
| W6 (A4) D | 3.305 | 34 | 20 | 46 | 92.4 | 7.6 | 7.5 | 1.599 |
| W7 (A4) A | 1.458 | 30 | 18 | 52 | 92.2 | 7.8 | 10.8 | 1.415 |
| W8 (A5) D | 3.755 | 34 | 20 | 46 | 93.3 | 6.7 | 5.8 | 1.599 |
| W9 (A4) G | 4.615 | 30 | 30 | 40 | 83.1 | 16.9 | 4.4 | 1.569 |
| Comparative Sample No. (commercial designation)[c] | Elastic Modulus GPa | Grain vol % | Bond Vol % | Porosity vol % | Weight % Abrasive | Weight % Bond | Air Permeability[d] | Wheel Density g/cc |
| C2I 38A80 I9 B18 No agglomerate | 14.883 | 46.0 | 21.2 | 32.8 | 86.6 | 13.4 | 1.1 | 2.098 |
| C2L 38A80-L9 B18 No agglomerate | 18.001 | 46.0 | 25.0 | 29.0 | 84.6 | 15.4 | 0.7 | 2.149 |
| C2P 38A80-P9 B18 No agglomerate | 20.313 | 46.0 | 31.0 | 23.0 | 81.6 | 18.4 | 0.3 | 2.228 |
| C2T 38A80-T9 B18 No agglomerate | 25.464 | 46.0 | 38.3 | 15.7 | 78.2 | 21.8 | 0.1 | 2.325 |

[a]At 46 vol. % abrasive grain, the comparative wheels contained a greater volume % abrasive grain (i.e., 12-16 volume % more) than the experimental wheels made with either 30 or 34 vol. % abrasive grain
[b]Values for volume % bond of the experimental wheels include the volume % resin binding material used on the grains to make the agglomerates and the volume % bond used to make the wheels. Wheels W5, W6 and W8 were made to a D grade on the Norton Grade scale. Wheel W7 was made to an A grade and wheel W9 was made to a G grade of hardness on the Norton Company hardness grade scale for commercial wheels.

TABLE 8-1-continued

Abrasive Wheel Characteristics

[c] Comparative wheel samples were commercial product formulations obtained from Saint-Gobain Abrasives, Inc., Worcester, MA, and sold under the alphanumeric wheel designations indicated for each in Table 8-1. The wheels contain phenolic resin bond, $CaF_2$, hollow mullite spheres, 38A alumina abrasive grain and have a hardness grade (Norton Company commercial scale) of I, L, P or T, as indicated.
[d] The fluid (air) permeability is given in units of cc/sec/inch water and is measured with a 1.1 cm nozzle by the method described in U.S. Pat. Nos. 5,738,696 and 5,738,697.

In visual examination of cross-sectional views of the cured, experimental wheels, the phenolic resin used to bond the agglomerates together in the wheels appeared to have been drawn in towards the void areas around the surfaces of the agglomerates, filling some or all of the void areas. This was not observed in green wheels nor in wheels made with a high viscosity wheel resin. These observations suggest the bond was being wicked into the void areas of the agglomerates during the thermal curing operation. This bond migration during the curing step is believed to have effectively decreased the intra-agglomerate porosity and effectively increased the inter-agglomerate porosity, relative to a theoretical distribution of porosity within and between agglomerates. The net result was the creation of a composite structure, containing an abrasive grain/bond matrix within a continuous phase comprising porosity of an interconnected nature.

These experimental wheels were tested in a surface grinding operation and found to be suitable for commercial use. Experimental wheels were tested against the comparative wheels described in Table 8-1 that are used commercially in surface grinding operations. The comparative wheels had the same size dimensions, same abrasive grain and bond types and were otherwise comparable wheels for evaluating the experimental wheels in a surface grinding study, but they were made without agglomerated grain.

Grinding test conditions and results are given below and in Table 8-2.

Grinding Test

The wheels of the invention and the comparative wheels were tested in a high contact area, surface grinding test designed to mimic commercial disc grinding operations. The following conditions were used.

Grinding Conditions:

Machine: Rail Grinder; maximum power: 45 HP

Grinding Mode: Face grinding (disc simulation test)

Wheel speed: 4202 rpm; 5500 surface feet per minute (27.9 m/sec)

Work speed: 3 rpm; 37.7 sfpm/0.192 m/sec

Infeed rate: 0.0027 in/rev (0.0686 mm/rev) and 0.004 in/rev (0.1016 mm/rev)

Grind time: 15 minutes

Sparkout: 10 sec

Coolant: Trim Clear, 2% ratio with deionized well water

Workpiece material: 1070 Steel 48 inch OD (1.22 m)×46.5 inch ID (1.18 m) ×0.75 inch (1.91 cm) rim, HB 300-331 Brinnell hardness; no dress

TABLE 8-2

Grinding Test Results

| Sample (Table 8-1) & Grade | Infeed (mm/rev) | WWR (mm³/s) | MRR (mm³/s) | Power (W) | G-ratio MRR/WWR | G-ratio/ Abrasive Vol. Fraction[a] | Specific Grinding Energy (J/mm³) |
|---|---|---|---|---|---|---|---|
| C2 I | 0.0686 | 18.35 | 125.07 | 5368 | 6.81 | 14.81 | 42.92 |
|  | 0.1016 | 35.65 | 128.51 | 5100 | 3.60 | 7.84 | 39.69 |
| C2 L | 0.0686 | 13.83 | 155.37 | 7242 | 11.24 | 24.43 | 46.61 |
|  | 0.1016 | 28.93 | 173.32 | 7372 | 5.99 | 13.02 | 42.54 |
| C2 P | 0.0686 | 11.96 | 168.04 | 8646 | 14.05 | 30.53 | 51.45 |
|  | 0.1016 | 24.91 | 200.38 | 9406 | 8.04 | 17.49 | 46.94 |
|  | 0.0686 | 11.56 | 171.39 | 8700 | 14.83 | 32.23 | 50.76 |
|  | 0.1016 | 25.29 | 198.16 | 8906 | 7.84 | 17.03 | 44.94 |
| C2 T | 0.0686 | 8.56 | 190.95 | 10430 | 22.31 | 48.51 | 54.62 |
|  | 0.1016 | 21.03 | 226.52 | 11012 | 10.77 | 23.42 | 48.61 |
|  | 0.0686 | 8.33 | 192.48 | 10013 | 23.10 | 50.22 | 52.02 |
|  | 0.1016 | 20.56 | 230.27 | 10857 | 11.20 | 24.35 | 47.15 |
| W5 D | 0.0686 | 9.50 | 184.57 | 7962 | 19.42 | 64.74 | 43.14 |
|  | 0.1016 | 23.87 | 207.37 | 8109 | 8.69 | 28.96 | 39.10 |
|  | 0.0686 | 9.83 | 182.44 | 7731 | 18.56 | 61.85 | 42.38 |
|  | 0.1016 | 24.11 | 206.15 | 7970 | 8.55 | 28.50 | 38.66 |
| W6 D | 0.0686 | 13.57 | 157.10 | 6267 | 11.58 | 34.04 | 39.89 |
|  | 0.1016 | 30.08 | 165.42 | 6096 | 5.50 | 16.17 | 36.85 |
|  | 0.0686 | 13.98 | 154.66 | 6142 | 11.07 | 32.54 | 39.72 |
|  | 0.1016 | 27.93 | 179.91 | 6463 | 6.44 | 18.95 | 35.93 |

TABLE 8-2-continued

Grinding Test Results

| Sample (Table 8-1) & Grade | Infeed (mm/rev) | WWR (mm³/s) | MRR (mm³/s) | Power (W) | G-ratio MRR/WWR | G-ratio/ Abrasive Vol. Fraction[a] | Specific Grinding Energy (J/mm³) |
|---|---|---|---|---|---|---|---|
| W7 A | 0.0686 | 23.25 | 91.73 | 3278 | 3.95 | 13.15 | 35.73 |
|  | 0.1016 | 39.67 | 101.05 | 3330 | 2.55 | 8.49 | 32.95 |
|  | 0.0508 | 15.15 | 82.10 | 3083 | 5.42 | 18.07 | 37.56 |
|  | 0.0686 | 23.14 | 92.44 | 3321 | 3.99 | 13.31 | 35.93 |
|  | 0.1016 | 39.33 | 103.27 | 3434 | 2.63 | 8.75 | 33.26 |
|  | 0.0508 | 14.73 | 84.94 | 3179 | 5.77 | 19.22 | 37.43 |
| W8 D | 0.0686 | 13.48 | 158.01 | 6523 | 11.72 | 34.47 | 41.28 |
|  | 0.1016 | 28.04 | 179.60 | 6810 | 6.41 | 18.84 | 37.92 |
|  | 0.0686 | 12.94 | 161.36 | 6533 | 12.47 | 36.67 | 40.49 |
|  | 0.1016 | 26.04 | 192.77 | 7139 | 7.40 | 21.77 | 37.03 |
| W9 G | 0.0686 | 5.15 | 214.05 | 10317 | 41.57 | 138.6 | 48.20 |
|  | 0.1016 | 16.84 | 254.80 | 10761 | 15.13 | 50.42 | 42.23 |
|  | 0.0686 | 5.39 | 213.34 | 10274 | 39.58 | 131.9 | 48.16 |
|  | 0.1016 | 16.72 | 255.62 | 10677 | 15.28 | 50.95 | 41.77 |

[a]The G-ratio/Abrasive volume % fraction is a measure of the grinding performance the grain in the wheel. The calculation normalizes the grinding performance to account for the significant differences in volume % abrasive grain among the experimental and comparativewheels. It can be readily seen that the abrasive grain in the experimental wheels delivers significantly better grinding efficiency on a volume fraction basis (i.e., less grain is needed to deliver the same level of grinding efficiency).

The results show the grinding wheels made according to the invention either had longer wheel lifetimes (WWR) at equivalent specific grinding energies or lower specific grinding energies at equivalent wheel life. Since lower specific grinding energy correlates with lower burn potential, the wheels in the invention are anticipated to exhibit less workpiece burn than the comparative wheels.

Moreover, relative to the comparative wheels, the experimental wheels delivered significantly better grinding efficiency on an abrasive grain volume fraction basis (i.e., less grain is needed to deliver the same level of grinding efficiency). This result defies the conventional wisdom in bonded abrasives technology that a higher grade wheel having more grain will resist wear and deliver better wheel life and grinding efficiency than a lower (softer) grade wheel.

Thus, experimental grinding wheels having sufficient mechanical strength for commercial acceptance, but comparatively low measurable hardness grades and comparatively high amounts of interconnected porosity, existing as a continuous phase within the abrasive matrix of the wheel, could be manufactured and operated according to the invention.

EXAMPLE 9

Abrasive Wheels

Agglomerate sample A6 was used to make Type 6 cup grinding wheels (finished size 5.0×2.0×0.625–1.5 inch rim (12.7×5.08×1.59–3.81 cm rim). The experimental abrasive wheels were made according to the method described in Example 7, above. The finished wheels were safety tested according to a commercially practiced speed test to insure the wheels had sufficient mechanical strength for rotational movement when mounted on a grinding machine and sufficient mechanical strength for the grinding operation. All experimental wheels survived a 6308 rpm speed test and, thus, had sufficient mechanical strength for surface grinding operations.

The compositions of the wheels (including volume % abrasive, bond and porosity of the cured wheels) are described in Table 9-1.

TABLE 9-1

Abrasive Wheel Characteristics

| Experimental Wheel (agglomerate samples Ex. 3) Grade | Agglomerate sample | Wheel Composition Volume % | | | Weight % Agglomerate | Weight % Bond | Elastic Modulus GPa |
|---|---|---|---|---|---|---|---|
| Sample No. | (Table 7-1) | Abrasive[a] | Bond[b] | Porosity | | | |
| W10 D | A6 | 30 | 24 | 46 | 88.3 | 11.7 | 3.414 |
| W11 A | A6 | 30 | 18 | 52 | 93.1 | 6.9 | 1.906 |

[a]Values for volume % bond of the experimental wheels include the volume % resin binding material used on the grains to make the agglomerates and the volume % bond used to make the wheels.

Visual observation of the cured experimental wheels, as in the previous Example 8, demonstrated migration of the bond into void areas at the surface or within the agglomerates.

Again, the net result was the creation of a composite structure, containing an abrasive grain/bond matrix within a continuous phase comprising porosity of an interconnected nature.

These experimental wheels were tested in the surface grinding operation of Example 8 and found to be suitable for commercial use. Experimental wheel grinding results were compared to results for the four comparative wheels described in Table 8-1. The comparative wheels had the same size dimensions, same abrasive grain type and were otherwise suitable for evaluating the experimental wheels in this surface grinding study, but they were made without agglomerated grain. Results of these grinding tests are shown in Table 9-2.

TABLE 9-2

Grinding Test Results #3.924

| Wheel Sample (Table 9-1) Grade | Infeed (mm/rev) | WWR (mm$^3$/s) | MRR (mm$^3$/s) | Power (W) | G-ratio MRR/WWR | G-ratio/ Abrasive Vol. Fraction[a] | Specific Grinding Energy (J/mm$^3$) |
|---|---|---|---|---|---|---|---|
| W10 D | 0.0686 | 6.15 | 206.97 | 9397 | 33.63 | 112.1 | 45.40 |
|  | 0.1016 | 18.72 | 241.93 | 9697 | 12.93 | 43.1 | 40.08 |
|  | 0.0508 | 6.80 | 202.82 | 9147 | 29.82 | 99.4 | 45.10 |
|  | 0.0686 | 17.69 | 248.92 | 10143 | 14.07 | 46.9 | 40.75 |
| W11 A | 0.0686 | 18.48 | 124.05 | 4733 | 6.71 | 22.4 | 38.16 |
|  | 0.1016 | 34.70 | 133.99 | 4777 | 3.86 | 12.9 | 35.65 |
|  | 0.0508 | 12.34 | 100.74 | 3979 | 8.16 | 27.2 | 39.50 |
|  | 0.0686 | 18.15 | 125.98 | 4721 | 6.94 | 23.1 | 37.48 |
|  | 0.1016 | 34.78 | 133.59 | 4768 | 3.84 | 12.8 | 35.69 |
|  | 0.0508 | 11.75 | 104.70 | 4083 | 8.91 | 29.7 | 39.00 |
| C2 L | 0.0686 | 13.83 | 155.37 | 7242 | 11.24 | 24.43 | 46.61 |
|  | 0.1016 | 28.93 | 173.32 | 7372 | 5.99 | 13.02 | 42.54 |

[a] The G-ratio/Abrasive volume % fraction is a measure of the grinding performance the grain in the wheel. The calculation normalizes the grinding performance to account for the significant differences in volume % abrasive grain among the experimental and comparative (sample C2L, in Table 8-1) wheels. It can be readily seen that the abrasive grain in the experimental wheels delivers significantly better grinding efficiency on a volume fraction basis(i.e., less grain is needed to deliver the same level of grinding efficiency).

The relatively low hardness grade experimental wheels (A and D) displayed higher WWR but lower power draw than comparable wheels run in the same grinding operation (e.g., sample C2 L, an L grade wheel, in Table 8-1). The comparable wheels in Table 8-1 (L grade to P grade) were more than 8 grades harder (on the Norton Company scale) than the experimental wheels W10 and W11. Unexpectedly, the performance of the experimental wheels (G-ratio, MRR and lower power consumption) exceeded that of the comparable wheels in most of the test grinding runs.

Moreover, relative to the comparative wheels, the experimental wheels delivered significantly better grinding efficiency on an abrasive grain volume fraction basis (i.e., less grain is needed to deliver the same level of grinding efficiency). This result defies the conventional wisdom in bonded abrasives technology that a higher grade wheel having more grain will resist wear and deliver better wheel life and grinding efficiency than a softer grade wheel.

Thus, experimental grinding wheels having sufficient mechanical strength for commercial acceptance, but comparatively low measurable hardness grades and comparatively high interconnected porosity could be manufactured and operated according to the invention.

EXAMPLE 10

Abrasive Wheels

Agglomerate samples A7 and A8 were used to make grinding wheels (finished size 5.0×2.0×0.625–1.5 inch rim (12.7×5.08×1.59–3.81 cm rim). For wheels W12 and W13, an agglomerate sample screened to a size distribution range of −10/+20 mesh was used. For wheel W14, an agglomerate sample screened to a size distribution range of −14/+20 mesh was used. The experimental abrasive wheels were made according to the method described in Example 7, above. The finished wheels were safety tested according to a commercially practiced speed test to insure the wheels had sufficient mechanical strength for rotational movement when mounted on a grinding machine and sufficient mechanical strength for the grinding operation. All experimental wheels survived a 6308 rpm speed test and, thus, had sufficient mechanical strength for surface grinding operations. The composition of the wheels (including volume % abrasive, bond and porosity in the cured wheels) are described in Table 10-1.

TABLE 10-1

Abrasive Wheel Characteristics

| Experimental Wheel, Grade Agglomerate (Table 7-1) size | Elastic Modulus GPa | Wheel Composition Volume % | | | Weight % Agglomerate | Weight % Bond | Air permeability[d] |
|---|---|---|---|---|---|---|---|
| | | Abrasive.[a] | Bond[b] | Porosity | | | |
| W12 D A7 −10/+20 | 3.535 | 30 | 24 | 46 | 88.3 | 11.7 | 13.3 |

TABLE 10-1-continued

| Abrasive Wheel Characteristics | | | | | | | |
|---|---|---|---|---|---|---|---|
| W13 D A8 −10/+20 | 3.469 | 30 | 24 | 46 | 88.3 | 11.7 | 12.0 |
| W14 D A8 −14/+20 | 3.689 | 30 | 24 | 46 | 88.3 | 11.7 | 11.2 |

| Comparative Sample No. commercial designation[c] | Elastic Modulus GPa | Grain Vol % | Bond Vol % | Porosity vol % | Weight % Abrasive | Weight % Bond | |
|---|---|---|---|---|---|---|---|
| C4L 38A46-L9 B18 No agglomerate | 14.411 | 46.0 | 25.0 | 29.0 | 84.6 | 15.4 | N/A |

[a]At 46 vol. % abrasive grain, the comparative wheels contained a greater volume % abrasive grain (i.e., 16 volume % more) than the experimental wheels made with 30 vol. % abrasive grain.
[b]Values for volume % bond of the experimental wheels include the volume % resin binding material used on the grains to make the agglomerates and the volume % bond used to make the wheels.
[c]Comparative wheel samples were commercial product formulations obtained from Saint-Gobain Abrasives, Inc., Worcester, MA, and sold under the alphanumeric wheel designations indicated for each in Table 10-2. The wheels contain phenolic resin bond, $CaF_2$, hollow mullite spheres, 38A alumina abrasive grain and have a hardness grade (Norton Company commercial scale) of L, as indicated.
[d]The fluid (air) permeability is given in units of cc/sec/inch water and is measured with a 1.1 cm nozzle by the method described in U.S. Pat. Nos. 5,738,696 and 5,738,697.

Visual observation of the cured experimental wheels, as in the previous Examples 8 and 9, demonstrated migration of the bond into void areas at the surface or into the agglomerates. The net result was the creation of a composite structure, containing an abrasive grain/bond matrix within a continuous phase consisting of porosity of an interconnected nature.

These experimental wheels were tested in a surface grinding operation and found to be suitable for commercial use. Experimental wheels were tested against the comparative wheel described in Table 10-1 that is used commercially in surface grinding operations. The comparative wheel had the same size dimensions, same abrasive grain and bond types and was otherwise suitable for evaluating the experimental wheels in a surface grinding study, but it was made without agglomerates.

Grinding test conditions and results are given below and in Table 10-2.

Grinding Conditions:
Machine: Rail Grinder; maximum power 45 HP
Grinding Mode: Face grinding (disc simulation test)
Wheel speed: 4202 rpm; 5500 surface feet per minute (27.9 m/sec)
Work speed: 6 RPM (75.4 sfpm/0.383 m/sec)
Infeed rate: 0.0010 in/rev (0.0254 mm/rev), 0.0014 in/rev (0.0356 mm/rev), 0.0020 in/rev (0.0508 mm/s) and 0.0027 in/rev (0.0686 mm/rev)
Grind time: 15 minutes at each feed rate; 45 hp
Sparkout: 10 sec
Coolant: Trim Clear, 2% ratio with deionized well water
Workpiece material: AISI 1070 Steel 48 inch OD (1.22 m) x 46.5 inch ID (1.18 m)x0.75 inch (1.91 cm) rim, HB 302 Brinnell hardness
Dress: none

TABLE 10-2

| | | | Grinding Test Results | | | | |
|---|---|---|---|---|---|---|---|
| Sample (Table 10-1) Grade | Infeed (mm/rev) | WWR (mm³/s) | MRR (mm³/s) | Power (W) | G-ratio | G-ratio/ Abrasive Vol. Fraction[a] | Specific Grinding Energy (J/mm³) |
| C4 L | 0.0686 | 49.58 | 169.46 | 6119 | 3.42 | 7.43 | 36.11 |
| | 0.0508 | 28.77 | 179.20 | 7423 | 6.23 | 13.5 | 41.42 |
| | 0.0356 | 17.52 | 143.00 | 6214 | 8.16 | 17.7 | 43.46 |
| W12 D | 0.0686 | 28.84 | 309.44 | 12249 | 10.73 | 35.8 | 39.58 |
| | 0.0508 | 18.54 | 248.32 | 10887 | 13.40 | 44.6 | 43.84 |
| | 0.0356 | 9.66 | 196.12 | 9831 | 20.31 | 67.7 | 50.13 |
| | 0.0254 | 4.54 | 156.08 | 8876 | 34.41 | 114.7 | 56.87 |
| W13 D | 0.0686 | 30.41 | 299.50 | 11613 | 9.85 | 32.8 | 38.78 |
| | 0.0508 | 19.35 | 242.75 | 10320 | 12.54 | 41.8 | 42.51 |
| | 0.0356 | 10.39 | 191.15 | 9386 | 18.39 | 61.3 | 49.10 |

TABLE 10-2-continued

Grinding Test Results

| Sample (Table 10-1) Grade | Infeed (mm/rev) | WWR (mm³/s) | MRR (mm³/s) | Power (W) | G-ratio | G-ratio/ Abrasive Vol. Fraction[a] | Specific Grinding Energy (J/mm³) |
|---|---|---|---|---|---|---|---|
| W14 D | 0.0686 | 24.82 | 336.59 | 13467 | 13.56 | 45.2 | 40.01 |
|  | 0.0508 | 19.92 | 238.89 | 10099 | 11.99 | 40.0 | 42.27 |
|  | 0.0356 | 8.93 | 200.98 | 9892 | 22.49 | 75.0 | 49.22 |

[a]The G-ratio/Abrasive volume % fraction is a measure of the grinding performance the grain in the wheel. The calculation normalizes the grinding performance to account for the significant differences in volume % abrasive grain among the experimental and comparative wheels. It can be readily seen that the abrasive grain in the experimental wheels delivers significantly better grinding efficiency on a volume fraction basis (i.e., less grain is needed to deliver the same level of grinding efficiency).

For the experimental wheels, the power consumed was slightly higher, but the WWR was significantly lower than for comparative wheels. It is believed that if the experimental wheels had been operated at the lower MRR used for the comparative wheels, the experimental wheels would have drawn less power.

Once again, relative to the comparative wheels, the experimental wheels delivered significantly better grinding efficiency on an abrasive grain volume fraction basis (i.e., less grain is needed to deliver the same level of grinding efficiency). This result defies the conventional wisdom in bonded abrasives technology that a higher grade wheel will resist wear and deliver better wheel life and grinding efficiency than a lower (softer) grade wheel.

EXAMPLE 11

Abrasive Grain/Organic Binder Agglomerates

Various binding materials (as described in Table 11-1, below) were used to make agglomerated abrasive grain samples A9-A13 (Table 7-1). As in the previous Example 7, these agglomerates were prepared from a mixture of abrasive grain, binding material containing phenolic resin (Durez Varcum® resin 29-717, specific gravity 1.28 g/cc, obtained from Durez Corporation, Dallas Tex.), together with the filler listed in Table 11-1. The grain and binding materials were used in the quantities described in Table 11-1. All samples were prepared with fused, silane- treated, alumina 38A abrasive grain, 80 grit size, obtained from Saint-Gobain Ceramics & Plastics, Inc., Worcester, Mass., USA.

The grain and the resin binding material were placed into the bowl of a high shear Eirich Mixer (model number RV-02 manufactured by the Eirich Company, Gurnee, Ill.). Mixing was initiated at a bowl speed set at 64 rpm and a paddle speed set at 720 rpm. While mixing, sufficient solvent (furfural) was sprayed as a mist, at a controlled rate, onto the mixture of grain and the binding material in order to cause grains and binding material to agglomerate together. Solvent spraying onto the mixture was continued only until grains and binding material had formed agglomerates (i.e., spraying at a rate of 15-20 g/min for 7 minutes on a batch including 2.25 kg grain together with the quantity of binding material indicated in Table 11-1). Spraying was carried out with a Tool Mist Coolant Generator, obtained from Wesco Company, Chatsworth, Calif. The process of agglomeration was carried out under atmospheric conditions at room temperature.

After agglomeration in the mixer, the wet agglomerated abrasive grain samples were screened through a 3.5 U.S. standard sieve and dried overnight under ambient conditions. The samples were then re-screened to yield a −20/+45 granule distribution and spread in a single layer on a fluoropolymer lined baking tray (about 45×30 cm). Agglomerates were then placed in an oven under atmospheric conditions, the temperature was increased to a maximum temperature of 160° C., and the agglomerates were held at maximum temperature for 30 minutes to cure the resin binding material. The cured agglomerates were rolled under a 1.5 inch steel bar operated manually to partially crush and separate larger agglomerates into smaller agglomerates and then screened to the desired size distribution.

The yield of usable free-flowing agglomerates, defined as granules having a size distribution of −20 to +45 mesh (U.S. Standard Sieve size), was >90 wt % of the total weight of the grain mixture before agglomeration.

Agglomerates were tested for loose packing density (LPD), relative density and size distribution and they were visually characterized, before and after being used to make abrasive grinding tools. The results are shown in Table 7-1.

These agglomerates had LPD, relative density and size distribution characteristics suitable for use in the commercial manufacture of abrasive grinding wheels. The finished, cured agglomerates had three-dimensional shapes varying among triangular, spherical, cubic, rectangular, cylindrical and other geometric shapes. Agglomerates consisted of a plurality of individual abrasive grits (e.g., 2 to 40 grits) bonded together by resin binding material at grit to grit contact points. The structures of the agglomerates were sufficiently resistant to compaction to retain a three dimensional character after being subjected to abrasive wheel mixing and molding operations (i.e., an insignificant portion (e.g., <20 wt %) of the agglomerates was reduced to individual abrasive grit structures during wheel processing). It was observed that the agglomerates made with a combination of resin and filler materials were less tacky and easier to separate than the agglomerates made with resin and no filler. Furthermore, slightly smaller amounts of solvent were needed when filler was added to the resin.

Thus, with minor modifications, the same methods used to make agglomerates with phenolic resin binding materials also could be used to make abrasive grain agglomerates with organic bond materials when inorganic filler materials (desired for incorporation into the grinding wheel) had been added to the organic bond materials.

TABLE 11-1

Binding Material used in Agglomerates A9-A13

| Binding Material Components | A Binding material wt % | B Binding material wt % | C Binding material wt % | D Binding material wt % | E Binding material wt % Example 12 |
|---|---|---|---|---|---|
| Phenolic resin[a] | 100 | 78.4 | 61.7 | 48.4 | 37.7 |
| Filler[b] CaF$_2$ | none | 21.6 | 38.3 | 51.6 | 62.3 |
| Spec. Gravity g/cc | 1.28 | 1.47 | 1.66 | 1.85 | 2.04 |

[a]The phenolic resin was Durez Varcum ® resin 29-717 from Durez Corporation, Dallas TX.
[b]The filler was obtained from Min-Chem Canada, Inc., Oakville Ontario Canada in a <45 micron particle size (−325 mesh) and blended with the powdered resin component prior to the addition of grain and liquid material.

Abrasive Wheels

Agglomerate samples A9 through A13 were used to make grinding wheels (finished size 5.0×2.0×0.625–1.5 inch rim (12.7×5.08×1.59–3.81 cm rim). The experimental abrasive wheels were made according to the method described in Example 7, above. The finished wheels were safety tested according to a commercially practiced speed test to insure the wheels had sufficient mechanical strength for rotational movement when mounted on a grinding machine and sufficient mechanical strength for the grinding operation. All experimental wheels survived a 6308 rpm speed test and, thus, had sufficient mechanical strength for surface grinding operations. The composition of the wheels (including volume % abrasive, bond and porosity in the cured wheels) are described in Table 11-2.

TABLE 11-2

Abrasive Wheel Characteristics

| Wheel, Grade Agglomerate (Table 7-1) | Elastic Modulus GPa | Wheel Composition Volume % | | | Weight % Agglomerate | Weight % Bond | Wheel Density g/cc |
|---|---|---|---|---|---|---|---|
| | | Abrasive[a] | Bond[b] | Porosity | | | |
| W15 D (A9) | 3.373 | 30 | 24 | 46 | 88.3 | 11.7 | 1.492 |
| W16 D (A10) | 2.263 | 30 | 24 | 46 | 88.4 | 11.6 | 1.496 |
| W17 D (A11) | 3.188 | 30 | 24 | 46 | 88.6 | 11.4 | 1.515 |
| W18 D (A12) | 3.485 | 30 | 24 | 46 | 88.7 | 11.3 | 1.535 |
| W19 D (A13) | 3.644 | 30 | 24 | 46 | 88.9 | 11.1 | 1.554 |

| Comparative Sample No. (commercial designation)[c] | Elastic Modulus GPa | Grain Vol % | Bond Vol % | Porosity vol % | Weight % Abrasive | Weight % Bond | Wheel Density g/cc |
|---|---|---|---|---|---|---|---|
| C5L 38A80-L9 B18 No agglomerate | 17.006 | 46.0 | 25.0 | 29.0 | 84.6 | 15.4 | 2.149 |
| C5P 38A80-P9 B18 No agglomerate | 21.111 | 46.0 | 31.0 | 23.0 | 81.6 | 18.4 | 2.228 |
| C5T 38A80-T9 B18 No agglomerate | 24.545 | 46.0 | 38.3 | 15.7 | 78.2 | 21.8 | 2.325 |
| C5D[e] No agglomerate | 9.183 | 48 | 6 | 46 | 96.1 | 3.9 | 1.973 |
| C5J No agglomerate | 15.796 | 48 | 18 | 34 | 89.2 | 10.8 | 2.126 |

[a]At 46 volume % abrasive grain, the comparative wheels contained a greater volume % abrasive grain (i.e., 16 volume % more) than the experimental wheels made 30 volume % abrasive grain.
[b]Values for volume % bond of the experimental wheels include the volume % resin binding material used on the grains to make the agglomerates and the volume % bond used to make the wheels.
[c]Comparative wheel samples C5L, C5P and C5T were commercial product formulations obtained from Saint-Gobain Abrasives, Inc., Worcester, MA, and sold under the alphanumeric wheel designations indicated for each in Table 11-2. The wheels contained phenolic resin bond, CaF$_2$, hollow mullite spheres, 38A alumina abrasive grain and had a hardness grade (Norton Company commercial scale) of L, P or T, as indicated.
[d]The fluid (air) permeability is given in units of cc/sec/inch water and is measured with a 1.1 cm nozzle by the method described in U.S. Pat. Nos. 5,738,696 and 5,738,697.
[e]Wheel sample C5D lacked the mechanical strength to pass commercial safety tests.

These experimental wheels were tested in a surface grinding operation and found to be suitable for commercial use. Experimental wheels were tested against the comparative, wheels C5L, C5P and C5T described in Table 11-2, that are commercial products sold for use in surface grinding operations. The comparative wheels had the same size dimensions, same abrasive grain and bond types and were otherwise suitable for evaluating the experimental wheels in a surface grinding study, but they were made without agglomerates. Also included in this grinding test were experimental wheel W5 and comparative wheel CLP from Table 8-1.

In a later test under identical grinding conditions, two additional comparative wheels (C5D and C5J) were tested. Comparative wheels C5D and C5J were made according to the method described for the experimental wheels of Example 7, except the compositions shown in Table 11-2 were used in place of those recited in Example 7. These wheels were made in softer wheel grades (D and J) and tested in order to compare the experimental wheel performance against a conventional wheel having a matching grade (i.e., the same or similar volume % grain, bond and porosity). Grade assignments were made based on the composition of the bond selected for the wheel, together with the volume percentages of abrasive grain, bond and porosity in the finished wheel. Grinding test conditions and results are given below and in Table 11-2.

Grinding Conditions:
Machine: Rail Grinder; maximum power 45 HP
Grinding Mode: Face grinding (disc simulation test)
Wheel speed: 4202 rpm; 5500 surface feet per minute (27.9 m/sec)
Work speed: 3 rpm; 37.7 sfpm/0.192 m/sec
Infeed rate: 0.0020 in/rev (0.0508 mm/s), 0.0027 in/rev (0.0686 mm/rev) and 0.004 in/rev (0.1016 mm/rev)
Grind time: 15 minutes at each feed rate
Sparkout: 10 sec
Coolant: Trim Clear, 2% ratio with deionized well water
Workpiece material: AISI 1070 Steel 48 inch OD (1.22 m)×46.5 inch ID (1.18 m)×0.75 inch (1.91 cm) rim, HB 302 Brinnell hardness
Dress: none

TABLE 11-2

Grinding Test Results

| Wheel Sample (Table 11-1) Grade | Infeed (mm/rev) | WWR (mm$^3$/s) | MRR (mm$^3$/s) | Power (W) | G-ratio | G-ratio/ Abrasive Vol. Fraction[a] | Specific Grinding Energy (J/mm$^3$) |
|---|---|---|---|---|---|---|---|
| C5 L | 0.1016 | 34.56 | 135.01 | 4772 | 3.91 | 8.49 | 35.35 |
|  | 0.0686 | 19.48 | 116.97 | 4247 | 6.00 | 13.05 | 36.31 |
| C5 P | 0.1016 | 29.44 | 169.57 | 6373 | 5.76 | 12.52 | 37.59 |
|  | 0.0686 | 17.04 | 133.48 | 5033 | 7.83 | 17.02 | 37.71 |
|  | 0.1016 | 31.90 | 152.95 | 5716 | 4.79 | 10.42 | 37.37 |
|  | 0.0686 | 17.84 | 128.11 | 4888 | 7.18 | 15.61 | 38.15 |
|  | 0.0508 | 12.63 | 98.81 | 3796 | 7.83 | 17.01 | 38.41 |
| C5 T | 0.1016 | 25.56 | 195.72 | 7963 | 7.66 | 16.64 | 40.69 |
|  | 0.0686 | 15.18 | 146.05 | 5920 | 9.62 | 20.9 | 40.54 |
|  | 0.1016 | 23.20 | 211.72 | 8554 | 9.13 | 19.8 | 40.40 |
|  | 0.0686 | 11.92 | 168.04 | 7168 | 14.09 | 30.6 | 42.66 |
|  | 0.0508 | 11.16 | 108.76 | 4577 | 9.75 | 21.2 | 42.08 |
| C2 P | 0.1016 | 26.09 | 192.17 | 7664 | 7.36 | 16.01 | 39.88 |
|  | 0.0686 | 13.21 | 159.34 | 6678 | 12.06 | 26.2 | 41.91 |
|  | 0.0508 | 6.83 | 137.94 | 6004 | 20.19 | 43.9 | 43.53 |
| W15 D | 0.1016 | 21.89 | 220.73 | 7706 | 10.09 | 33.6 | 34.91 |
|  | 0.0686 | 10.78 | 175.74 | 6570 | 16.30 | 54.3 | 37.38 |
| W16 D | 0.1016 | 34.81 | 133.39 | 4088 | 3.83 | 12.77 | 30.65 |
|  | 0.0686 | 18.43 | 124.16 | 4014 | 6.74 | 22.5 | 32.33 |
|  | 0.1016 | 31.65 | 154.66 | 5072 | 4.89 | 16.3 | 32.80 |
|  | 0.0686 | 21.98 | 99.63 | 3319 | 4.53 | 15.11 | 33.31 |
| W17 D | 0.1016 | 27.88 | 180.11 | 5942 | 6.46 | 21.5 | 32.99 |
|  | 0.0686 | 15.05 | 146.86 | 5186 | 9.76 | 32.5 | 35.31 |
| W18 D | 0.1016 | 28.62 | 175.14 | 5550 | 6.12 | 20.4 | 31.69 |
|  | 0.0686 | 15.62 | 143.20 | 4801 | 9.17 | 30.6 | 33.53 |
| W19 D | 0.1016 | 32.16 | 151.22 | 4536 | 4.70 | 15.7 | 29.99 |
|  | 0.0686 | 20.43 | 110.47 | 3577 | 5.41 | 18.02 | 32.38 |
|  | 0.0508 | 11.14 | 108.85 | 3773 | 9.77 | 32.6 | 34.67 |
|  | 0.1016 | 30.83 | 160.25 | 5076 | 5.20 | 17.32 | 31.67 |
|  | 0.0686 | 16.17 | 139.36 | 4446 | 8.62 | 28.72 | 31.90 |
|  | 0.0508 | 8.42 | 127.20 | 4166 | 15.10 | 50.3 | 32.75 |
| W5 D | 0.1016 | 23.45 | 210.01 | 7314 | 8.95 | 29.8 | 34.83 |
|  | 0.0686 | 11.91 | 168.15 | 6163 | 14.12 | 47.1 | 36.65 |
|  | 0.0508 | 5.18 | 149.09 | 5684 | 28.78 | 95.9 | 38.13 |
| C5D[b] | 0.1016 | 48.80 | 59.19 | 1858 | 1.21 | 2.53 | 31.38 |
|  | 0.0686 | 36.78 | 54.51 | 1722 | 1.48 | 3.09 | 31.59 |
|  | 0.0508 | 35.23 | 59.70 | 1993 | 1.69 | 3.53 | 33.39 |
| C5J[b] | 0.1016 | 22.38 | 217.7 | 9033 | 9.73 | 20.3 | 41.49 |
|  | 0.0686 | 11.20 | 173.3 | 7376 | 15.47 | 32.2 | 42.55 |
|  | 0.0508 | 6.67 | 140.5 | 6024 | 21.07 | 43.9 | 42.89 |
|  | 0.1016 | 19.59 | 236.1 | 10260 | 12.05 | 25.1 | 43.47 |

TABLE 11-2-continued

Grinding Test Results

| Wheel Sample (Table 11-1) Grade | Infeed (mm/rev) | WWR (mm³/s) | MRR (mm³/s) | Power (W) | G-ratio | G-ratio/ Abrasive Vol. Fraction[a] | Specific Grinding Energy (J/mm³) |
|---|---|---|---|---|---|---|---|
| | 0.0686 | 9.62 | 183.6 | 8294 | 19.07 | 39.7 | 45.19 |
| | 0.0508 | 4.73 | 151.9 | 7018 | 32.13 | 66.9 | 46.19 |

[a]The G-ratio/Abrasive volume % fraction is a measure of the grinding performance the grain in the wheel. The calculation normalizes the grinding performance to account for the significant differences in volume % abrasive grain among the experimental and comparative wheels. It can be readily seen that the abrasive grain in the experimental wheels delivers significantly better grinding efficiency on a volume fraction basis (i.e., less grain is needed todeliver the same level of grinding efficiency).
[b]Wheels C5D and C5J were tested at a later date than the remaining samples, but under identical grinding test conditions.

The experimental wheels demonstrated slightly lower power but comparable WWR than the comparative wheels. This is a surprise given the grade differential (D versus L-T).

Once again, relative to the comparative wheels, the experimental wheels overall delivered significantly better grinding efficiency on an abrasive grain volume fraction basis (i.e., less grain is needed to deliver the same level of grinding efficiency). The C5J sample was run at higher MRR rates, so data for this wheel is consistent with the general trend. Samples C2P and W5D, tested in a separate grinding test, show better performance than the remaining wheels, but differences between the experimental and comparative wheels are consistent with the general trend. These results are counter to the conventional wisdom in bonded abrasives technology that a higher grade wheel having more grain will resist wear and deliver better wheel life and grinding efficiency than a softer grade wheel.

Thus, experimental grinding wheels having sufficient mechanical strength for commercial acceptance, but comparatively low measurable hardness grades, could be manufactured by the invention and give effective grinding performance for commercial purposes.

EXAMPLE 12

Abrasive Grain/Vitrified Binder Agglomerates

A vitrified binding material (A Binding material from Table 1-2) was used to make agglomerated abrasive grain sample AV1. The agglomerates were prepared from a mixture of abrasive grain and vitrified binding material by the rotary calcination method described in Example 1, except that 2.6 wt % of A Binding material was used to make the AV1 agglomerates and the grain was a fused alumina 38A abrasive grain, 80 grit size, obtained from Saint-Gobain Ceramics & Plastics, Inc., Worcester, Mass., USA. The sintered agglomerates were wetted with a 2 wt % aqueous solution of gamma-amino propyl triethoxy silane (Witco Corporation, Friendly, W. Va.) (9.2 ml/lb on 80 grit size grain agglomerates) to coat the agglomerates with silane, then dried at 120° C., and screened to remove any clumps generated during the silane treatment.

The yield of usable free-flowing agglomerates, defined as granules having a size distribution of −20/+45 mesh (U.S. Standard Sieve size) was 86 wt % of the total weight of the grain mixture before agglomeration. Vitrified grain agglomerates were tested for loose packing density (LPD=1.04), relative density (0.268) and size distribution −20/+45 mesh) and they were visually characterized, before and after being used to make abrasive grinding tools.

These agglomerates had LPD, relative density and size distribution characteristics suitable for use in the commercial manufacture of abrasive grinding wheels. The finished, cured agglomerates had three-dimensional shapes varying among triangular, spherical, cubic, rectangular, cylindrical and other geometric shapes. Agglomerates consisted of a plurality of individual abrasive grits (e.g., 2 to 40 grits) bonded together by vitrified binding material at grit to grit contact points, together with visible void areas. The structures of the agglomerates were sufficiently resistant to compaction to retain a three-dimensional character after being subjected to abrasive wheel mixing and molding operations (i.e., an insignificant portion (e.g., <20 wt %) of the agglomerates was reduced to individual abrasive grits during wheel processing).

Abrasive Grain/Organic Binder Agglomerates

The abrasive grain (38A grain, 80 grit size, obtained from Saint-Gobain Ceramics & Plastics, Inc., Worcester, Mass.) and the resin binding material (Binding material E, from Table 11-1) were placed into the bowl of a high shear Eirich Mixer (model number R07 manufactured by the Eirich Company, Gurnee, Ill.). Mixing was initiated at a bowl speed set at 460 rpm (clockwise) and a paddle speed set at 890 rpm (counterclockwise). While mixing, sufficient solvent (furfural) was sprayed as a mist, at a controlled rate, onto the mixture of grain and the binding material in order to cause grains and binding material to agglomerate together. Solvent spraying onto the mixture was continued only until grains and binding material had formed agglomerates (i.e., spraying at a rate of 380-390 cc/min. for a total of 2.5 min on a batch including 49.5 kg grain together with the quantity of binding material indicated in Table 12-1). Spraying was carried out on a Spraying Systems apparatus (model AutoJet 38660 obtained from Spraying Systems, Wheaton Ill.). The process of agglomeration was carried out under atmospheric conditions, at room temperature.

Agglomerate A14 was run twice through a six foot vibrating conveyor (Eriez Magnetics, model number HS/115, Erie Pa.) to evaporate the solvent. The agglomerate was then bedded with a loose abrasive grain (80 grit, 38A) at 1 part agglomerate and 2 parts loose abrasive and then placed into an oven (model number VRD-1-90-1E from Despatch Industries, Minneapolis Minn.), under atmospheric conditions. The temperature was increased to a maximum temperature of 160° C., and the agglomerates were held at maximum temperature for 30 minutes to cure the resin binding material. After curing, the loose abrasive was detached from the agglomerates by the final sizing procedure.

Abrasive Wheels

Agglomerate samples AV1 and A14 were used to make grinding wheels (finished size 5.0×2.0×0.625–1.5 inch rim (12.7×5.08×1.59–3.81 cm rim). The experimental abrasive wheels were made according to the method described in Example 7. The finished wheels were safety tested according to a commercially practiced speed test to insure the wheels had sufficient mechanical strength for rotational movement when mounted on a grinding machine and sufficient mechanical strength for the grinding operation. All experimental wheels survived a 6308 rpm speed test and, thus, had sufficient mechanical strength for surface grinding operations. The composition of the wheels (including type and ratio of agglomerates, volume % abrasive, bond and porosity in the cured wheels) are described in Table 12-2.

TABLE 12-1

Agglomerated Granule Characteristics

| Sample No. Mix: grain, solvent, binding material | Weight (kg) of mix | Weight % solvent in mix | Binding material Wt % (total solids basis) | Volume % binding material[a] | LPD g/cc −20/+45 mesh fraction | Average size microns (mesh) −25/+45 screen size | % Yield −25/+45 screen size | Average % relative density |
|---|---|---|---|---|---|---|---|---|
| Example 6 A14 80 grit 38A, furfural, Binding material E | 58.2 kg | 1.5% | 15% | 25.5 | 1.05 | 500 (36) | 85% | 30.3 |

[a]The volume % binding material is a percentage of the solid material within the granule (i.e., binding material and grain) after curing, and does not include the volume % porosity. The volume % binding material of the cured agglomerates was calculated by assuming no internal porosity and no mix losses.

TABLE 12-2

Abrasive Wheel Characteristics

| Wheel, Grade (agglomerate Ex. 6, Table 12-1) | Agglomerate Blends Vit. Binder/ Resin Binder | Wheel Composition Volume % | | | Weight % Agglomerate | Weight % Bond | Air Permeability[d] |
|---|---|---|---|---|---|---|---|
| | | Abrasive[a] | Bond[b] | Porosity | | | |
| W20 D resin | 0/100 | 30 | 24 | 46 | 88.9 | 11.1 | 6.3 |
| W21 D | 25/75 | 30 | 24 | 46 | 86.9 | 13.1 | 5.8 |
| W22 D | 50/50 | 30 | 24 | 46 | 84.9 | 15.1 | 5.7 |
| W23 D | 75/25 | 30 | 24 | 46 | 82.8 | 17.2 | 5.2 |
| W24 D vitrified | 100/0 | 30 | 24 | 46 | 80.8 | 19.2 | 4.6 |
| W25 G resin | 0/100 | 30 | 30 | 40 | 84.7 | 15.3 | 3.8 |
| W26 G | 25/75 | 30 | 30 | 40 | 83.6 | 16.4 | 3.7 |
| W27 G | 50/50 | 30 | 30 | 40 | 80.8 | 19.2 | 3.6 |
| W28 G | 75/25 | 30 | 30 | 40 | 78.9 | 21.1 | 3.3 |
| W29 G vitrified | 100/0 | 30 | 30 | 40 | 76.8 | 23.2 | 2.8 |

| Comparative Sample No. (commercial designation)[c] | | Grain Vol % | Bond Vol % | Porosity vol % | Weight % Abrasive | Weight % Bond | Air Permeability[d] |
|---|---|---|---|---|---|---|---|
| C6I 38A80-I9 B18 | none | 46.0 | 21.2 | 32.8 | 86.6 | 13.4 | 1.1 |
| C6L 38A80-L9 B18 | " | 46.0 | 25.0 | 29.0 | 84.6 | 15.4 | 0.7 |
| C6P 38A80-P9 B18 | " | 46.0 | 31.0 | 23.0 | 81.6 | 18.4 | 0.3 |
| C6T 38A80-T9 B18 | " | 46.0 | 38.3 | 15.7 | 78.2 | 21.8 | 0.1 |

[a]At 46 vol. % abrasive grain, the comparative wheels contained a greater volume % abrasive grain (i.e., 16 volume % more) than the experimental wheels made with 30 vol % abrasive grain.

TABLE 12-2-continued

Abrasive Wheel Characteristics

[b]Values for volume % bond of the experimental wheels include the volume % resin binding material used on the grains to make the agglomerates and the volume % bond used in the wheels.
[c]Comparative wheel samples were commercial product formulations obtained from Saint-Gobain Abrasives, Inc., Worcester, MA, and sold under the alphanumeric wheel designations indicated for each in Table 12-2. The wheels contain phenolic resin bond, $CaF_2$, hollow mullite spheres, 38A alumina abrasive grain and have a hardness grade (Norton Company commercial scale) of I, L, P or T, as indicated.
[d]The fluid (air) permeability is given in units of cc/sec/inch water and is measured with a 1.1 cm nozzle by the method described in U.S. Pat. Nos. 5,738,696 and 5,738,697.

Visual observation of the cured experimental wheels, as in the previous Example 7, demonstrated migration of the bond into the intra-agglomerate void areas. Photomicrographs (46× magnification) were taken of the grinding surfaces of comparative wheel C6L and experimental wheel W20D (Table 12-2). These images appear as FIGS. 4 and 5. It can be seen from FIGS. 4 (comparative wheel) and 5 (experimental wheel) that the porosity (darker areas) in the abrasive composite of the invention exists as a continuous phase of interconnected channels. The abrasive grain and bond appear as a reticulated network in which abrasive grain is anchored in the organic bond materials. In contrast the comparative wheel has a substantially uniform structure wherein porosity is hardly visible and appears as a discontinuous phase.

These experimental wheels were tested in a surface grinding operation and found to be suitable for commercial use. Experimental wheels were tested against the comparative wheels, described in Table 12-2, that are used commercially in surface grinding operations. A grade range of I to T Norton Grade hardness was selected for the comparative wheels to confirm an observed grade shift in the experimental wheels (i.e., a lower hardness grade in the experimental wheels could perform as well as a higher hardness grade of conventional wheels). The comparative wheels had the same size dimensions, same abrasive grain type and were otherwise suitable for evaluating the experimental wheels in a surface grinding study, but they were made without agglomerates. Grinding test conditions and results are given below and in Table 12-3.

Grinding Conditions:
Machine: Rail Grinder; maximum power 45 HP
Grinding Mode: Face grinding (disc simulation test)
Wheel speed: 4202 rpm; 5500 surface feet per minute (27.9 M/sec)
Work speed: 3 rpm; 37.7 sfpm/0.192 m/sec
Infeed rate: 0.0027 in/rev (0.0686 mm/rev) and 0.004 in/rev (0.1016 mm/rev)
Grind time: 15 minutes at each feed rate
Sparkout: 10 sec
Coolant: Trim Clear, 2% ratio with deionized well water
Workpiece material: AISI 1070 Steel 48 inch OD (1.22 m)×46.5 inch ID (1.18 m)×0.75 inch (1.91 cm) rim, HB 302 Brinnell hardness
Dress: none

TABLE 12-3

Grinding Test Results

| Wheel Sample (Table 12-2) | Infeed (mm/rev) | WWR (mm³/s) | MRR (mm³/s) | Power (W) | G-ratio | G-ratio/ Abrasive Vol. Fraction[a] | Specific Grinding Energy (J/mm³) |
|---|---|---|---|---|---|---|---|
| C6I | 0.1016 | 37.22 | 117.17 | 3861 | 3.15 | 6.84 | 32.95 |
|  | 0.0686 | 23.14 | 92.44 | 3118 | 3.99 | 8.68 | 33.73 |
| C6L | 0.1016 | 35.98 | 125.89 | 4297 | 3.50 | 7.61 | 34.13 |
|  | 0.0686 | 21.96 | 100.34 | 3358 | 4.57 | 9.93 | 33.46 |
| C6P | 0.1016 | 26.00 | 193.19 | 7951 | 7.43 | 16.15 | 41.16 |
|  | 0.1016 | 27.15 | 185.17 | 7443 | 6.82 | 14.82 | 40.20 |
|  | 0.0686 | 14.48 | 150.82 | 6172 | 10.42 | 22.6 | 40.93 |
| C6T | 0.1016 | 18.08 | 254.91 | 11968 | 14.10 | 30.7 | 46.95 |
|  | 0.0686 | 17.69 | 249.12 | 11187 | 14.08 | 30.6 | 44.90 |
|  | 0.0686 | 8.96 | 188.01 | 8539 | 20.98 | 45.6 | 45.42 |
| W20 | 0.1016 | 26.49 | 190.95 | 6039 | 7.21 | 24.0 | 31.63 |
|  | 0.1016 | 29.08 | 172.10 | 5398 | 5.92 | 19.73 | 31.36 |
|  | 0.0686 | 14.94 | 147.67 | 4744 | 9.88 | 33.0 | 32.13 |
| W21 | 0.1016 | 10.63 | 298.19 | 11048 | 28.05 | 93.5 | 37.05 |
|  | 0.0686 | 2.43 | 232.22 | 9764 | 95.46 | 318 | 42.05 |
|  | 0.0686 | 1.97 | 235.55 | 10527 | 119.79 | 399 | 44.69 |
| W22 | 0.1016 | 18.99 | 241.13 | 8497 | 12.70 | 42.3 | 35.24 |
|  | 0.0686 | 6.16 | 208.19 | 7738 | 33.82 | 112.7 | 37.17 |
| W23 | 0.1016 | 18.92 | 240.82 | 8237 | 12.73 | 42.4 | 34.20 |
|  | 0.0686 | 7.82 | 196.63 | 7073 | 25.13 | 83.8 | 35.97 |
|  | 0.0686 | 6.35 | 206.66 | 7679 | 32.54 | 108.5 | 37.16 |
| W24 | 0.1016 | 7.24 | 319.57 | 12211 | 44.15 | 147.2 | 38.21 |
|  | 0.1016 | 7.37 | 318.56 | 12049 | 43.21 | 144.0 | 37.82 |
|  | 0.0686 | 1.25 | 240.11 | 11043 | 192.65 | 642 | 45.99 |
|  | 0.0686 | 1.64 | 238.89 | 11227 | 145.96 | 487 | 47.00 |

TABLE 12-3-continued

Grinding Test Results

| Wheel Sample (Table 12-2) | Infeed (mm/rev) | WWR (mm³/s) | MRR (mm³/s) | Power (W) | G-ratio | G-ratio/ Abrasive Vol. Fraction[a] | Specific Grinding Energy (J/mm³) |
|---|---|---|---|---|---|---|---|
| W25 | 0.1016 | 22.32 | 217.60 | 7724 | 9.75 | 32.5 | 35.50 |
|  | 0.1016 | 22.36 | 218.31 | 7461 | 9.76 | 32.5 | 34.18 |
|  | 0.0686 | 10.71 | 178.27 | 6392 | 16.65 | 55.5 | 35.86 |
| W26 | 0.1016 | 8.96 | 308.62 | 11654 | 34.43 | 114.8 | 37.76 |
|  | 0.0686 | 1.68 | 237.18 | 11129 | 141.04 | 470 | 46.92 |
|  | 0.0686 | 4.34 | 220.13 | 9294 | 50.73 | 169.1 | 42.22 |
| W27 | 0.1016 | 12.42 | 284.50 | 10673 | 22.91 | 76.4 | 37.52 |
|  | 0.0686 | 3.38 | 226.21 | 9393 | 66.94 | 223 | 41.52 |
| W28 | 0.1016 | 15.44 | 264.23 | 9877 | 17.12 | 57.1 | 37.38 |
|  | 0.0686 | 5.53 | 211.32 | 8450 | 38.24 | 127.5 | 39.99 |
|  | 0.0686 | 5.01 | 214.76 | 8502 | 42.83 | 142.8 | 39.59 |
| W29 | 0.1016 | 7.54 | 318.56 | 13638 | 42.26 | 140.9 | 42.81 |
|  | 0.1016 | 8.27 | 312.97 | 12464 | 37.83 | 126.1 | 39.83 |
|  | 0.0686 | 0.93 | 242.35 | 11664 | 260.32 | 868 | 48.13 |

[a]The G-ratio/Abrasive volume % fraction is a measure of the grinding performance the grain in the wheel. The calculation normalizes the grinding performance to account for the significant differences in volume % abrasive grain among the experimental and comparative wheels. It can be readily seen that the abrasive grain in the experimental wheels delivers significantly better grinding efficiency on a volume fraction basis (i.e., less grain is needed to deliver the same level of grinding efficiency).

The test results demonstrate the experimental wheels having a D or G grade on the Norton Hardness Grade scale perform in an equivalent manner to the comparative wheels having a harder grade of P to T grade. The performance of the experimental wheels was particularly surprising because these wheels contained only 30 volume % abrasive grain, whereas the comparative wheels contained 46 volume % abrasive grain. Thus, the wheels of the invention maximize the grinding performance of the individual grains, boosting the grain performance by a significant amount.

We claim:

1. A bonded abrasive tool, comprising a three-dimensional composite of
    (a) a first phase comprising 24-48 vol % abrasive grains bonded with 10-38 vol % organic bond material and less than 10 vol % porosity; and
    (b) a second phase consisting of 38-54 vol % interconnected porosity;
    wherein the second phase is a continuous phase within the composite thereby making the composite permeable to fluid flow via channels formed with interconnected porosity, and the bonded abrasive tool has an elastic modulus value of 55 GPa or less and a minimum burst speed of 4000 sfpm (20.32 m/s).

2. The bonded abrasive tool of claim 1, wherein the first phase of the composite comprises 26-40 vol % abrasive grains bonded with 10-22 vol % organic bond material and less than 10 vol % porosity, and the second phase consists of 38-50 vol % porosity.

3. The bonded abrasive tool of claim 1, wherein the first phase of the composite comprises 24-42 vol % abrasive grains bonded with 18-38 vol % organic bond material, and the second phase consists of 38-54 vol % porosity.

4. The bonded abrasive tool of claim 1, wherein 10 to 100 vol % of the abrasive grains in the first phase of the composite are in the form of a plurality of grains agglomerated together with an organic binder material.

5. The bonded abrasive tool of claim 1, wherein 10 to 100 vol % of the abrasive grains in the first phase of the composite are in the form of a plurality of grains agglomerated together with an inorganic binder material.

6. The bonded abrasive tool of claim 5, wherein the composite comprises a minimum of 1 vol % inorganic binder material.

7. The bonded abrasive tool of claim 5, wherein the composite comprises 2 to 12 vol % inorganic binder material.

8. The bonded abrasive tool of claim 5, wherein the bonded abrasive tool has a maximum elastic modulus value of 10 GPa and a minimum burst speed of 6000 sfpm (30.48 m/s).

9. The bonded abrasive tool of claim 5, wherein the bonded abrasive tool has a hardness grade between A and H on the Norton Company grade scale.

10. The bonded abrasive tool of claim 5, wherein the inorganic binder material is selected from the group consisting of vitrified bond materials, ceramic bond materials, glass-ceramic bond materials, inorganic salt materials and metallic bond materials, and combinations thereof.

11. The bonded abrasive tool of claim 1, wherein 10 to 100 vol % of the abrasive grains in the first phase of the composite are in the form of a mixture, the mixture including a plurality of grains agglomerated together with an inorganic binder material and a plurality of grains agglomerated together with an organic binder material.

12. The bonded abrasive tool of claim 1, wherein the first phase of the composite is a retIculated network of abrasive grain anchored within the organic bond material.

13. The bonded abrasive tool of claim 1, wherein the organic bond material is selected from the group consisting of phenollc resin materials, epoxy resin materials, polyirnide resin materials, phenol formaldehyde resin materials, urea formaldehyde resin materials, melamine formaldehyde resin materials, acrylic resin materials and combinations thereof.

14. The bonded abrasive tool of claim 1, wherein at least 50 vol % of the abrasive grains in the first phase of the composite are in the form of a plurality of grains agglomerated together with an organic binder material.

15. The bonded abrasive tool of claim 1, wherein the bonded abrasive tool is subjected to thermal processing during its manufacture, and bond migration during the thermal processing has effectively decreased porosity of the first phase to the less than 10 vol % range and effectively increased porosity of the second phase to the 38-54 vol % range.

16. The bonded abrasive tool of claim 1, wherein the bonded abrasive tool is subjected to thermal processing during its manufacture, and the interconnected porosity results at least in part from thermal-induced migration of second phase binder material into irregularly spaced clusters that include the abrasive grains and organic bond material of the first phase.

17. The bonded abrasive tool of claim 1, wherein the interconnected porosity results at least in part from thermal-induced migration of second phase binder material into first phase porosity.

18. A bonded abrasive tool comprising a three-dimensional composite of
(a) 22-52 vol % abrasive grains bonded with 4-20 vol % inorganic bond material, wherein a majority of the abrasive grains are present as irregularly spaced clusters within the three-dimensional composite; and
(b) 40-68 vol % interconnected porosity between the irregularly spaced clusters, thereby making the composite permeable to fluid flow via channels formed with interconnected porosity;
wherein the bonded abrasive tool has an elastic modulus value of 55 GPa or less and a minimum burst speed of 4000 sfpm (20.32 m/s).

19. The bonded abrasive tool of claim 18, wherein the three-dimensional composite comprises 22-40 vol % abrasive grains bonded with 8-14 vol % inorganic bond material, and 40-64 vol % interconnected porosity.

20. The bonded abrasive tool of claim 18, wherein the three-dimensional composite comprises 3442 vol % abrasive grains bonded with 6-12 vol % inorganic bond material, and 46-58 vol % interconnected porosity.

21. The bonded abrasive tool of claim 18, wherein the interconnected porosity has been formed without adding porosity inducing materials during manufacturing and the composite is substantially free of high aspect ratio particles of abrasive grains and fillers.

22. The bonded abrasive tool of claim 18, wherein 10 to 100 vol % of the abrasive grains in the composite are in the form of a plurality of grains agglomerated together with an inorganic binder material.

23. The bonded abrasive tool of claim 18, wherein at least 50 vol % of the abrasive grains in the composite are in the form of a plurality of grains agglomerated together with an inorganic binder material.

24. The bonded abrasive tool of claim 18, wherein the inorganic bond material is selected from the group consisting of vitrified bond materials, ceramic bond materials, glass-ceramic bond materials, inorganic salt materials and metallic bond materials, and combinations thereof.

25. The bonded abrasive tool of claim 18, wherein the bonded abrasive tool has a hardness grade between A and M on the Norton Company grade scale.

26. The bonded abrasive tool of claim 18, wherein the bonded abrasive tool has an elastic modulus value of 41 GPa or less and a minimum burst speed of 6000 sfpm (30.48 m/s).

27. The bonded abrasive tool of claim 18, wherein the bonded abrasive tool has an elastic modulus value of 33 GPa or less and a minimum burst speed of 6000 sfpm (30.48 m/s).

28. The bonded abrasive tool of claim 18, wherein the bonded abrasive tool is an inner diameter grinding wheel and the wheel contains 40 to 52 vol % abrasive grain and has an elastic modulus value of 25 to 50 OPa.

29. The bonded abrasive tool of claim 18, wherein the bonded abrasive tool is a toolroom grinding wheel and the wheel contains 39 to 52 vol % abrasive grain and has an elastic modulus value of 15 to 36 GPa.

30. The bonded abrasive tool of claim 18, wherein the bonded abrasive tool is a creep feed grinding wheel and the wheel contains 30 to 40 vol % abrasive grain and has an elastic modulus value of 8 to 25 GPa.

31. The bonded abrasive tool of claim 18, wherein the bonded abrasive tool is subjected to thermal processing during its manufacture, and the interconnected porosity results at least in part from thermal-induced migration of binder material into the irregularly spaced clusters.

32. A method for disc grinding, comprising the steps of:
(a) providing a bonded abrasive wheel, comprising a three-dimensional composite of
(i) a first phase comprising 24-48 vol % abrasive grains bonded with 10-38 vol % organic bond material and less than 10 vol % porosity; and
(ii) a second phase consisting of 38-54 vol % interconnected porosity;
wherein the second phase Is a continuous phase within the composite thereby making the composite permeable to fluid flow via channels formed with interconnected porosity, and the bonded abrasive tool has an elastic modulus value of 55 GPa or less and a minimum burst speed of 4000 sfpm (20.32 m/s);
(b) grinding a workpiece with the wheel;
whereby the wheel removes workpiece material at an effective material removal rate, the grinding surface of the wheel remains substantially free of grinding debris and, after grinding has been completed, the workpiece is substantially free of thermal damage.

33. The method for disc grinding of claim 32, wherein the bonded abrasive wheel has a minimum burst speed of 6000 sfpm (30.48 m/s).

34. The method for disc grinding of claim 32, wherein the bonded abrasive wheel is rotated at a speed of 4000 to 6500 sfpm (20.32 to 33.02 m/s).

35. The method for disc grinding of claim 32, wherein the bonded abrasive wheel is a fiat disc, having at least one circular face and a radial perimeter and the grinding surface of the wheel is the circular face of the disc.

36. A method (or creep feed grinding, comprising the steps of:
(a) providing a bonded abrasive wheel comprising a three-dimensional composite of
(i) 22-52 vol % abrasive grains bonded with 4-20 vol % inorganic bond material, wherein a majority of the abrasive grains are present as irregularly spaced clusters within the three-dimensional composite; and
(ii) 40-68 vol % interconnected porosity between the irregularly spaced clusters. thereby making the composite permeable to fluid flow via channels formed with interconnected porosity;

wherein the bonded abrasive tool has an elastic modulus value of 55 GPa or less and a minimum burst speed of 4000 sfpm (20.32 m/s);

(b) grinding a workpiece with the wheel;

whereby the wheel removes workpiece material at an effective material removal rate and, after grinding, the workpiece is substantially free of thermal damage.

37. The method of claim 36 for creep feed grinding, wherein the bonded abrasive wheel has a minimum burst speed of 6000 sfpm (30.48 m/s).

38. The method of claim 36 for creep feed grinding, wherein the bonded abrasive wheel is rotated at a speed of 5500 to 8500 sfpm (27.94 to 43.18 m/s).

39. The method of claim 36 for creep feed grinding, wherein the bonded abrasive wheel has two circular faces and a radial perimeter and the grinding surface of the wheel is the radial perimeter.

* * * * *